(12) United States Patent
Kennedy et al.

(10) Patent No.: US 11,580,259 B1
(45) Date of Patent: *Feb. 14, 2023

(54) IDENTITY SECURITY ARCHITECTURE SYSTEMS AND METHODS

(71) Applicant: CSIdentity Corporation, Austin, TX (US)

(72) Inventors: Adam Kennedy, Austin, TX (US); Bryan Hjelm, Austin, TX (US); Jay Jarvinen, Pensacola, FL (US); Tom Stambaugh, Boston, MA (US); Joel Carleton, San Diego, CA (US); Iris Connealy-Seri, Belmont, MA (US)

(73) Assignee: CSIDENTITY CORPORATION, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,909

(22) Filed: Sep. 16, 2021

Related U.S. Application Data

(63) Continuation of application No. 16/880,279, filed on May 21, 2020, now Pat. No. 11,157,650, which is a
(Continued)

(51) Int. Cl.
*G06F 21/62* (2013.01)
*G06F 16/9535* (2019.01)
*G06F 16/2458* (2019.01)

(52) U.S. Cl.
CPC ...... *G06F 21/6245* (2013.01); *G06F 16/2462* (2019.01); *G06F 16/9535* (2019.01)

(58) Field of Classification Search
CPC ............ G06F 21/6245; G06F 16/9535; G06F 16/2462
(Continued)

(56) References Cited

U.S. PATENT DOCUMENTS

| 2,074,513 A | 3/1937 | Mills |
| 3,316,395 A | 4/1967 | Lavin et al. |

(Continued)

FOREIGN PATENT DOCUMENTS

| CA | 3 058 653 | 4/2020 |
| CN | 104877993 | 9/2015 |

(Continued)

OTHER PUBLICATIONS

Trivedi et al., "Parallel Data Stream Anonymization Methods: A Review," 2022 Second International Conference on Artificial Intelligence and Smart Energy (ICAIS), 2022, pp. 887-891, doi: 10.1109/ICAIS53314.2022.9743084. (Year: 2022).*

(Continued)

*Primary Examiner* — Peter C Shaw
(74) *Attorney, Agent, or Firm* — Knobbe Martens Olson & Bear, LLP

(57) ABSTRACT

Embodiments of various systems and methods described herein provide an identity security database analytics system which is configured to provide security alerts to a user. The security alerts can include for personalized metrics related to potential identity theft incidents. The personalized metrics can include user specific information on security breaches of the user's personal information as well as depersonalized statistics generated based on information of other users having one or more similar characteristics of the user.

17 Claims, 13 Drawing Sheets

Related U.S. Application Data continuation of application No. 16/012,681, filed on Jun. 19, 2018, now Pat. No. 10,699,028.

(60) Provisional application No. 62/565,014, filed on Sep. 28, 2017.

(58) Field of Classification Search
USPC .......................................................... 726/26
See application file for complete search history.

(56) References Cited

U.S. PATENT DOCUMENTS

| | | | |
|---|---|---|---|
| 3,752,904 A | 8/1973 | Waterbury |
| 4,163,290 A | 7/1979 | Sutherlin et al. |
| 5,274,547 A | 12/1993 | Zoffel et al. |
| 5,323,315 A | 6/1994 | Highbloom |
| 5,386,104 A | 1/1995 | Sime |
| 5,414,833 A | 5/1995 | Hershey et al. |
| 5,454,030 A | 9/1995 | de Oliveira et al. |
| 5,504,675 A | 4/1996 | Cragun et al. |
| 5,563,783 A | 10/1996 | Stolfo et al. |
| 5,627,886 A | 5/1997 | Bowman |
| 5,679,940 A | 10/1997 | Templeton et al. |
| 5,696,907 A | 12/1997 | Tom |
| 5,696,965 A | 12/1997 | Dedrick |
| 5,739,512 A | 4/1998 | Tognazzini |
| 5,742,775 A | 4/1998 | King |
| 5,745,654 A | 4/1998 | Titan |
| 5,752,242 A | 5/1998 | Havens |
| 5,754,632 A | 5/1998 | Smith |
| 5,774,868 A | 6/1998 | Cragun et al. |
| 5,793,497 A | 8/1998 | Funk |
| 5,809,478 A | 9/1998 | Greco et al. |
| 5,819,226 A | 10/1998 | Gopinathan et al. |
| 5,819,260 A | 10/1998 | Lu et al. |
| 5,822,741 A | 10/1998 | Fischthal |
| 5,832,068 A | 11/1998 | Smith |
| 5,842,178 A | 11/1998 | Giovannoli |
| 5,870,721 A | 2/1999 | Norris |
| 5,872,921 A | 2/1999 | Zahariev et al. |
| 5,878,403 A | 3/1999 | DeFrancesco |
| 5,879,297 A | 3/1999 | Haynor et al. |
| 5,884,289 A | 3/1999 | Anderson et al. |
| 5,912,839 A | 6/1999 | Ovshinsky et al. |
| 5,913,196 A | 6/1999 | Talmor et al. |
| 5,943,666 A | 8/1999 | Kleewein et al. |
| 5,950,179 A | 9/1999 | Buchanan et al. |
| 5,987,440 A | 11/1999 | O'Neil et al. |
| 5,999,907 A | 12/1999 | Donner |
| 5,999,940 A | 12/1999 | Ranger |
| 6,023,694 A | 2/2000 | Kouchi et al. |
| 6,029,139 A | 2/2000 | Cunningham et al. |
| 6,029,149 A | 2/2000 | Dykstra et al. |
| 6,029,154 A | 2/2000 | Pettitt |
| 6,029,194 A | 2/2000 | Tilt |
| 6,044,357 A | 3/2000 | Garg |
| 6,055,570 A | 4/2000 | Nielsen |
| 6,094,643 A | 7/2000 | Anderson et al. |
| 6,119,103 A | 9/2000 | Basch et al. |
| 6,125,985 A | 10/2000 | Amdahl et al. |
| 6,142,283 A | 11/2000 | Amdahl et al. |
| 6,144,988 A | 11/2000 | Kappel |
| 6,157,707 A | 12/2000 | Baulier et al. |
| 6,182,219 B1 | 1/2001 | Feldbau et al. |
| 6,208,720 B1 | 3/2001 | Curtis et al. |
| 6,249,228 B1 | 6/2001 | Shirk et al. |
| 6,253,203 B1 | 6/2001 | O'Flaherty et al. |
| 6,254,000 B1 | 7/2001 | Degen et al. |
| 6,263,447 B1 | 7/2001 | French et al. |
| 6,269,349 B1 | 7/2001 | Aieta et al. |
| 6,282,658 B2 | 8/2001 | French et al. |
| 6,285,983 B1 | 9/2001 | Jenkins |
| 6,285,987 B1 | 9/2001 | Roth et al. |
| 6,292,795 B1 | 9/2001 | Peters et al. |
| 6,311,169 B2 | 10/2001 | Duhon |
| 6,317,783 B1 | 11/2001 | Freishtat et al. |
| 6,321,339 B1 | 11/2001 | French et al. |
| 6,330,546 B1 | 12/2001 | Gopinathan et al. |
| 6,397,197 B1 | 5/2002 | Gindlesperger |
| 6,418,436 B1 | 7/2002 | Degen et al. |
| 6,424,956 B1 | 7/2002 | Werbos |
| 6,448,889 B1 | 9/2002 | Hudson |
| 6,456,984 B1 | 9/2002 | Demoff et al. |
| 6,496,936 B1 | 12/2002 | French et al. |
| 5,870,721 C1 | 1/2003 | Norris |
| 6,505,193 B1 | 1/2003 | Musgrave et al. |
| 6,510,415 B1 | 1/2003 | Talmor et al. |
| 6,513,018 B1 | 1/2003 | Culhane |
| 6,532,459 B1 | 3/2003 | Berson |
| 6,542,894 B1 | 4/2003 | Lee et al. |
| 6,543,683 B2 | 4/2003 | Hoffman |
| 6,553,495 B1 | 4/2003 | Johansson et al. |
| 6,571,334 B1 | 5/2003 | Feldbau et al. |
| 6,597,775 B2 | 7/2003 | Lawyer et al. |
| 6,612,488 B2 | 9/2003 | Suzuki |
| 6,615,193 B1 | 9/2003 | Kingdon et al. |
| 6,658,393 B1 | 12/2003 | Basch et al. |
| 6,662,023 B1 | 12/2003 | Helle |
| 6,696,941 B2 | 2/2004 | Baker |
| 6,700,220 B2 | 3/2004 | Bayeur et al. |
| 6,714,918 B2 | 3/2004 | Hillmer et al. |
| 6,735,572 B2 | 5/2004 | Landesmann |
| 6,740,875 B1 | 5/2004 | Ishikawa et al. |
| 6,748,426 B1 | 6/2004 | Shaffer et al. |
| 6,751,626 B2 | 6/2004 | Brown et al. |
| 6,796,497 B2 | 9/2004 | Benkert et al. |
| 6,811,082 B2 | 11/2004 | Wong |
| 6,829,711 B1 | 12/2004 | Kwok et al. |
| 6,850,606 B2 | 2/2005 | Lawyer et al. |
| 6,857,073 B2 | 2/2005 | French et al. |
| 6,866,586 B2 | 3/2005 | Oberberger et al. |
| 6,871,287 B1 | 3/2005 | Ellingson |
| 6,873,979 B2 | 3/2005 | Fishman et al. |
| 6,898,574 B1 | 5/2005 | Regan |
| 6,907,408 B2 | 6/2005 | Angel |
| 6,908,030 B2 | 6/2005 | Rajasekaran et al. |
| 6,913,194 B2 | 7/2005 | Suzuki |
| 6,918,038 B1 | 7/2005 | Smith et al. |
| 6,920,435 B2 | 7/2005 | Hoffman et al. |
| 6,928,546 B1 | 8/2005 | Nanavati et al. |
| 6,930,707 B2 | 8/2005 | Bates et al. |
| 6,934,849 B2 | 8/2005 | Kramer et al. |
| 6,934,858 B2 | 8/2005 | Woodhill |
| 6,965,881 B1 | 11/2005 | Brickell et al. |
| 6,965,997 B2 | 11/2005 | Dutta |
| 6,973,462 B2 | 12/2005 | Dattero et al. |
| 6,973,575 B2 | 12/2005 | Arnold |
| 6,983,381 B2 | 1/2006 | Jerdonek |
| 6,983,882 B2 | 1/2006 | Cassone |
| 6,991,174 B2 | 1/2006 | Zuili |
| 6,993,659 B2 | 1/2006 | Milgramm et al. |
| 7,007,174 B2 | 2/2006 | Wheeler et al. |
| 7,028,052 B2 | 4/2006 | Chapman et al. |
| 7,035,855 B1 | 4/2006 | Kilger et al. |
| 7,069,240 B2 | 6/2006 | Spero et al. |
| 7,083,090 B2 | 8/2006 | Zuili |
| 7,089,592 B2 | 8/2006 | Adjaoute et al. |
| 7,092,891 B2 | 8/2006 | Maus et al. |
| 7,104,444 B2 | 9/2006 | Suzuki |
| 7,158,622 B2 | 1/2007 | Lawyer et al. |
| 7,162,640 B2 | 1/2007 | Heath et al. |
| 7,174,335 B2 | 2/2007 | Kameda |
| 7,188,078 B2 | 3/2007 | Arnett et al. |
| 7,203,653 B1 | 4/2007 | McIntosh |
| 7,212,995 B2 | 5/2007 | Schulkins |
| 7,222,779 B1 | 5/2007 | Pineda-Sanchez et al. |
| 7,225,977 B2 | 6/2007 | Davis |
| 7,234,156 B2 | 6/2007 | French et al. |
| 7,240,059 B2 | 7/2007 | Bayliss et al. |
| 7,240,363 B1 | 7/2007 | Ellingson |
| 7,246,067 B2 | 7/2007 | Austin et al. |
| 7,246,740 B2 | 7/2007 | Swift et al. |
| 7,254,560 B2 | 8/2007 | Singhal |
| 7,263,506 B2 | 8/2007 | Lee et al. |

(56) References Cited

U.S. PATENT DOCUMENTS

| | | |
|---|---|---|
| 7,272,728 B2 | 9/2007 | Pierson et al. |
| 7,272,857 B1 | 9/2007 | Everhart |
| 7,277,869 B2 | 10/2007 | Starkman |
| 7,277,875 B2 | 10/2007 | Serrano-Morales et al. |
| 7,283,974 B2 | 10/2007 | Katz et al. |
| 7,289,607 B2 | 10/2007 | Bhargava et al. |
| 7,290,704 B1 | 11/2007 | Ball et al. |
| 7,298,873 B2 | 11/2007 | Miller, Jr. et al. |
| 7,310,743 B1 | 12/2007 | Gagne et al. |
| 7,314,162 B2 | 1/2008 | Carr et al. |
| 7,314,167 B1 | 1/2008 | Kiliccote |
| 7,330,871 B2 | 2/2008 | Barber |
| 7,333,635 B2 | 2/2008 | Tsantes et al. |
| 7,340,042 B2 | 3/2008 | Cluff et al. |
| 7,343,149 B2 | 3/2008 | Benco |
| 7,356,516 B2 | 4/2008 | Richey et al. |
| 7,370,044 B2 | 5/2008 | Mulhern et al. |
| 7,370,351 B1 | 5/2008 | Ramachandran et al. |
| 7,376,618 B1 | 5/2008 | Anderson et al. |
| 7,383,227 B2 | 6/2008 | Weinflash et al. |
| 7,386,448 B1 | 6/2008 | Poss et al. |
| 7,386,506 B2 | 6/2008 | Aoki et al. |
| 7,392,534 B2 | 6/2008 | Lu et al. |
| 7,395,273 B2 | 7/2008 | Khan et al. |
| 7,398,915 B1 | 7/2008 | Pineda-Sanchez et al. |
| 7,406,715 B2 | 7/2008 | Clapper |
| 7,412,228 B2 | 8/2008 | Barclay et al. |
| 7,418,431 B1 | 8/2008 | Nies et al. |
| 7,428,509 B2 | 9/2008 | Klebanoff |
| 7,433,855 B2 | 10/2008 | Gavan et al. |
| 7,433,864 B2 | 10/2008 | Malik |
| 7,438,226 B2 | 10/2008 | Helsper et al. |
| 7,444,518 B1 | 10/2008 | Dharmarajan et al. |
| 7,457,401 B2 | 11/2008 | Lawyer et al. |
| 7,458,508 B1 | 12/2008 | Shao et al. |
| 7,466,235 B1 | 12/2008 | Kolb et al. |
| 7,467,401 B2 | 12/2008 | Cicchitto |
| 7,480,631 B1 | 1/2009 | Merced et al. |
| 7,481,363 B2 | 1/2009 | Zuili |
| 7,490,052 B2 | 2/2009 | Kilger et al. |
| 7,490,356 B2 | 2/2009 | Lieblich et al. |
| 7,497,374 B2 | 3/2009 | Helsper et al. |
| 7,509,117 B2 | 3/2009 | Yum |
| 7,512,221 B2 | 3/2009 | Toms |
| 7,519,558 B2 | 4/2009 | Ballard et al. |
| 7,522,060 B1 | 4/2009 | Tumperi et al. |
| 7,533,808 B2 | 5/2009 | Song et al. |
| 7,536,346 B2 | 5/2009 | Aliffi et al. |
| 7,540,021 B2 | 5/2009 | Page |
| 7,542,993 B2 | 6/2009 | Satterfield et al. |
| 7,543,739 B2 | 6/2009 | Brown et al. |
| 7,543,740 B2 | 6/2009 | Greene et al. |
| 7,546,271 B1 | 6/2009 | Chmielewski et al. |
| 7,548,886 B2 | 6/2009 | Kirkland et al. |
| 7,552,467 B2 | 6/2009 | Lindsay |
| 7,562,184 B2 | 7/2009 | Henmi et al. |
| 7,562,814 B1 | 7/2009 | Shao et al. |
| 7,568,616 B2 | 8/2009 | Zuili |
| 7,575,157 B2 | 8/2009 | Barnhardt et al. |
| 7,580,884 B2 | 8/2009 | Cook |
| 7,581,112 B2 | 8/2009 | Brown et al. |
| 7,584,146 B1 | 9/2009 | Duhon |
| 7,587,368 B2 | 9/2009 | Felsher |
| 7,591,425 B1 | 9/2009 | Zuili et al. |
| 7,593,891 B2 | 9/2009 | Kornegay et al. |
| 7,606,401 B2 | 10/2009 | Hoffman et al. |
| 7,606,790 B2 | 10/2009 | Levy |
| 7,610,216 B1 | 10/2009 | May et al. |
| 7,610,229 B1 | 10/2009 | Kornegay |
| 7,610,243 B2 | 10/2009 | Haggerty et al. |
| 7,620,596 B2 | 11/2009 | Knudson et al. |
| 7,623,844 B2 | 11/2009 | Herrmann et al. |
| 7,630,924 B1 | 12/2009 | Collins et al. |
| 7,630,932 B2 | 12/2009 | Danaher et al. |
| 7,636,853 B2 | 12/2009 | Cluts et al. |
| 7,644,868 B2 | 1/2010 | Hare |
| 7,647,344 B2 | 1/2010 | Skurtovich, Jr. et al. |
| 7,647,645 B2 | 1/2010 | Edeki et al. |
| 7,653,593 B2 | 1/2010 | Zarikian et al. |
| 7,657,431 B2 | 2/2010 | Hayakawa |
| 7,668,769 B2 | 2/2010 | Baker et al. |
| 7,668,840 B2 | 2/2010 | Bayliss et al. |
| 7,668,921 B2 | 2/2010 | Proux et al. |
| 7,672,865 B2 | 3/2010 | Kumar et al. |
| 7,673,793 B2 | 3/2010 | Greene et al. |
| 7,676,418 B1 | 3/2010 | Chung et al. |
| 7,676,433 B1 | 3/2010 | Ross et al. |
| 7,685,096 B2 | 3/2010 | Margolus et al. |
| 7,686,214 B1 | 3/2010 | Shao et al. |
| 7,689,007 B2 | 3/2010 | Bous et al. |
| 7,689,505 B2 | 3/2010 | Kasower |
| 7,689,506 B2 | 3/2010 | Fei et al. |
| 7,690,032 B1 | 3/2010 | Peirce |
| 7,701,364 B1 | 4/2010 | Zilberman |
| 7,702,550 B2 | 4/2010 | Perg et al. |
| 7,707,163 B2 | 4/2010 | Anzalone et al. |
| 7,708,190 B2 | 5/2010 | Brandt et al. |
| 7,708,200 B2 | 5/2010 | Helsper et al. |
| 7,711,635 B2 | 5/2010 | Steele et al. |
| 7,711,636 B2 | 5/2010 | Robida et al. |
| 7,720,750 B2 | 5/2010 | Brody |
| 7,725,300 B2 | 5/2010 | Pinto et al. |
| 7,734,523 B1 | 6/2010 | Cui et al. |
| 7,735,125 B1 | 6/2010 | Alvarez et al. |
| 7,742,982 B2 | 6/2010 | Chaudhuri et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,084 B2 | 7/2010 | Pettitt |
| 7,752,236 B2 | 7/2010 | Williams et al. |
| 7,752,554 B2 | 7/2010 | Biggs et al. |
| 7,756,783 B2 | 7/2010 | Crooks |
| 7,761,379 B2 | 7/2010 | Zoldi et al. |
| 7,761,384 B2 | 7/2010 | Madhogarhia |
| 7,774,270 B1 | 8/2010 | MacCloskey |
| 7,778,885 B1 | 8/2010 | Semprevivo et al. |
| 7,779,456 B2 | 8/2010 | Dennis et al. |
| 7,779,457 B2 | 8/2010 | Taylor |
| 7,783,281 B1 | 8/2010 | Cook et al. |
| 7,783,515 B1 | 8/2010 | Kumar et al. |
| 7,788,184 B2 | 8/2010 | Kane |
| 7,792,715 B1 | 9/2010 | Kasower |
| 7,792,864 B1 | 9/2010 | Rice et al. |
| 7,793,835 B1 | 9/2010 | Coggeshall et al. |
| 7,801,811 B1 | 9/2010 | Merrell et al. |
| 7,801,828 B2 | 9/2010 | Candella et al. |
| 7,802,104 B2 | 9/2010 | Dickinson |
| 7,805,362 B1 | 9/2010 | Merrell et al. |
| 7,805,391 B2 | 9/2010 | Friedlander et al. |
| 7,809,797 B2 | 10/2010 | Cooley et al. |
| 7,813,944 B1 | 10/2010 | Luk et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,840,459 B1 | 11/2010 | Loftesness et al. |
| 7,841,004 B1 | 11/2010 | Balducci et al. |
| 7,844,520 B1 | 11/2010 | Franklin |
| 7,848,987 B2 | 12/2010 | Haig |
| 7,849,029 B2 | 12/2010 | Crooks et al. |
| 7,853,518 B2 | 12/2010 | Cagan |
| 7,853,526 B2 | 12/2010 | Milana |
| 7,853,533 B2 | 12/2010 | Eisen |
| 7,853,998 B2 | 12/2010 | Blaisdell et al. |
| 7,856,397 B2 | 12/2010 | Whipple et al. |
| 7,856,494 B2 | 12/2010 | Kulkarni |
| 7,860,769 B2 | 12/2010 | Benson |
| 7,860,783 B2 | 12/2010 | Yang et al. |
| 7,865,427 B2 | 1/2011 | Wright et al. |
| 7,865,439 B2 | 1/2011 | Seifert et al. |
| 7,865,937 B1 | 1/2011 | White et al. |
| 7,870,078 B2 | 1/2011 | Clark et al. |
| 7,870,599 B2 | 1/2011 | Pemmaraju |
| 7,873,382 B2 | 1/2011 | Rydgren et al. |
| 7,873,566 B1 | 1/2011 | Templeton et al. |

(56) References Cited

U.S. PATENT DOCUMENTS

| | | |
|---|---|---|
| 7,874,488 B2 | 1/2011 | Parkinson |
| 7,877,304 B1 | 1/2011 | Coulter |
| 7,877,784 B2 | 1/2011 | Chow et al. |
| 7,882,548 B2 | 2/2011 | Heath et al. |
| 7,890,433 B2 | 2/2011 | Singhal |
| 7,904,360 B2 | 3/2011 | Evans |
| 7,904,367 B2 | 3/2011 | Chung et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,917,715 B2 | 3/2011 | Tallman, Jr. |
| 7,925,582 B1 | 4/2011 | Kornegay et al. |
| 7,929,951 B2 | 4/2011 | Stevens et al. |
| 7,933,835 B2 | 4/2011 | Keane et al. |
| 7,941,363 B2 | 5/2011 | Tanaka et al. |
| 7,945,515 B2 | 5/2011 | Zoldi et al. |
| 7,950,577 B1 | 5/2011 | Daniel |
| 7,958,046 B2 | 6/2011 | Doerner et al. |
| 7,961,857 B2 | 6/2011 | Zoldi et al. |
| 7,962,404 B1 | 6/2011 | Metzger, II et al. |
| 7,962,467 B2 | 6/2011 | Howard et al. |
| 7,970,679 B2 | 6/2011 | Kasower |
| 7,970,698 B2 | 6/2011 | Gupta et al. |
| 7,970,701 B2 | 6/2011 | Lewis et al. |
| 7,971,246 B1 | 6/2011 | Emigh et al. |
| 7,975,299 B1 | 7/2011 | Balducci et al. |
| 7,983,976 B2 | 7/2011 | Nafeh et al. |
| 7,983,979 B2 | 7/2011 | Holland, IV |
| 7,984,849 B2 | 7/2011 | Berghel et al. |
| 7,988,043 B2 | 8/2011 | Davis |
| 7,991,201 B2 | 8/2011 | Bous et al. |
| 7,991,689 B1 | 8/2011 | Brunzell et al. |
| 7,991,716 B2 | 8/2011 | Crooks et al. |
| 7,991,751 B2 | 8/2011 | Peled et al. |
| 7,995,994 B2 | 8/2011 | Khetawat et al. |
| 7,996,521 B2 | 8/2011 | Chamberlain et al. |
| 8,001,034 B2 | 8/2011 | Chung et al. |
| 8,001,042 B1 | 8/2011 | Brunzell et al. |
| 8,001,153 B2 | 8/2011 | Skurtovich, Jr. et al. |
| 8,001,597 B2 | 8/2011 | Crooks |
| 8,005,749 B2 | 8/2011 | Ginsberg |
| 8,006,291 B2 | 8/2011 | Headley et al. |
| 8,009,873 B2 | 8/2011 | Chapman |
| 8,019,678 B2 | 9/2011 | Wright et al. |
| 8,020,763 B1 | 9/2011 | Kowalchyk et al. |
| 8,024,263 B2 | 9/2011 | Zarikian et al. |
| 8,024,271 B2 | 9/2011 | Grant |
| 8,027,439 B2 | 9/2011 | Zoldi et al. |
| 8,027,518 B2 | 9/2011 | Baker et al. |
| 8,027,947 B2 | 9/2011 | Hinsz et al. |
| 8,028,168 B2 | 9/2011 | Smithies et al. |
| 8,028,326 B2 | 9/2011 | Palmer et al. |
| 8,028,329 B2 | 9/2011 | Whitcomb |
| 8,028,896 B2 | 10/2011 | Carter et al. |
| 8,032,448 B2 | 10/2011 | Anderson et al. |
| 8,032,449 B2 | 10/2011 | Hu et al. |
| 8,032,927 B2 | 10/2011 | Ross |
| 8,037,097 B2 | 10/2011 | Guo et al. |
| 8,037,512 B2 | 10/2011 | Wright et al. |
| 8,041,597 B2 | 10/2011 | Li et al. |
| 8,042,159 B2 | 10/2011 | Basner et al. |
| 8,042,193 B1 | 10/2011 | Piliouras |
| 8,049,596 B2 | 11/2011 | Sato |
| 8,055,667 B2 | 11/2011 | Levy |
| 8,056,128 B1 | 11/2011 | Dingle et al. |
| 8,058,972 B2 | 11/2011 | Mohanty |
| 8,060,424 B2 | 11/2011 | Kasower |
| 8,060,915 B2 | 11/2011 | Voice et al. |
| 8,060,916 B2 | 11/2011 | Bajaj et al. |
| 8,065,233 B2 | 11/2011 | Lee et al. |
| 8,065,525 B2 | 11/2011 | Zilberman |
| 8,069,053 B2 | 11/2011 | Gervais et al. |
| 8,069,084 B2 | 11/2011 | Mackouse |
| 8,069,256 B2 | 11/2011 | Rasti |
| 8,069,485 B2 | 11/2011 | Carter |
| 8,073,785 B1 | 12/2011 | Candella et al. |
| 8,078,569 B2 | 12/2011 | Kennel |
| 8,090,648 B2 | 1/2012 | Zoldi et al. |
| 8,104,679 B2 | 1/2012 | Brown |
| 8,116,731 B2 | 2/2012 | Buhrmann et al. |
| 8,121,962 B2 | 2/2012 | Vaiciulis et al. |
| 8,131,615 B2 | 3/2012 | Diev et al. |
| 8,151,327 B2 * | 4/2012 | Eisen ............... G06Q 20/3825 726/22 |
| 8,195,549 B2 | 6/2012 | Kasower |
| 8,201,257 B1 | 6/2012 | Andres et al. |
| 8,204,774 B2 | 6/2012 | Chwast et al. |
| 8,204,982 B2 | 6/2012 | Casado et al. |
| 8,214,262 B1 | 7/2012 | Semprevivo et al. |
| 8,214,285 B2 | 7/2012 | Hu et al. |
| 8,224,723 B2 | 7/2012 | Bosch et al. |
| 8,225,395 B2 | 7/2012 | Atwood et al. |
| 8,239,677 B2 | 8/2012 | Colson |
| 8,244,629 B2 | 8/2012 | Lewis et al. |
| 8,255,978 B2 | 8/2012 | Dick |
| 8,260,914 B1 | 9/2012 | Ranjan |
| 8,280,805 B1 | 10/2012 | Abrahams et al. |
| 8,280,833 B2 | 10/2012 | Miltonberger |
| 8,285,613 B1 | 10/2012 | Coulter |
| 8,285,636 B2 | 10/2012 | Curry et al. |
| 8,296,225 B2 | 10/2012 | Maddipati et al. |
| 8,296,229 B1 | 10/2012 | Yellin et al. |
| 8,296,250 B2 | 10/2012 | Crooks et al. |
| 8,332,338 B2 | 12/2012 | Vaiciulis et al. |
| 8,346,593 B2 | 1/2013 | Fanelli |
| 8,355,896 B2 | 1/2013 | Kumar et al. |
| 8,359,278 B2 | 1/2013 | Domenikos et al. |
| 8,364,588 B2 | 1/2013 | Celka et al. |
| 8,374,973 B2 | 2/2013 | Herbrich et al. |
| 8,386,377 B1 | 2/2013 | Xiong et al. |
| 8,429,070 B2 | 4/2013 | Hu et al. |
| 8,463,904 B2 | 6/2013 | Casado et al. |
| 8,468,090 B2 | 6/2013 | Lesandro et al. |
| 8,489,479 B2 | 7/2013 | Slater et al. |
| 8,510,329 B2 | 8/2013 | Balkir et al. |
| 8,515,844 B2 | 8/2013 | Kasower |
| 8,516,439 B2 | 8/2013 | Brass et al. |
| 8,543,499 B2 | 9/2013 | Haggerty et al. |
| 8,548,137 B2 | 10/2013 | Zoldi et al. |
| 8,548,903 B2 | 10/2013 | Becker |
| 8,549,590 B1 | 10/2013 | de Villiers Prichard et al. |
| 8,559,607 B2 | 10/2013 | Zoldi et al. |
| 8,567,669 B2 | 10/2013 | Griegel et al. |
| 8,578,496 B1 | 11/2013 | Krishnappa |
| 8,626,671 B2 | 1/2014 | Federgreen |
| 8,630,938 B2 | 1/2014 | Cheng et al. |
| 8,639,920 B2 | 1/2014 | Stack et al. |
| 8,645,301 B2 | 2/2014 | Vaiciulis et al. |
| 8,671,115 B2 | 3/2014 | Skurtovich, Jr. et al. |
| 8,676,684 B2 | 3/2014 | Newman et al. |
| 8,676,726 B2 | 3/2014 | Hore et al. |
| 8,682,755 B2 | 3/2014 | Bucholz et al. |
| 8,683,586 B2 | 3/2014 | Crooks |
| 8,694,427 B2 | 4/2014 | Maddipati et al. |
| 8,707,445 B2 | 4/2014 | Sher-Jan et al. |
| 8,725,613 B1 | 5/2014 | Celka et al. |
| 8,763,133 B2 | 6/2014 | Sher-Jan et al. |
| 8,776,225 B2 | 7/2014 | Pierson et al. |
| 8,781,953 B2 | 7/2014 | Kasower |
| 8,781,975 B2 | 7/2014 | Bennett et al. |
| 8,793,777 B2 | 7/2014 | Colson |
| 8,805,836 B2 | 8/2014 | Hore et al. |
| 8,812,387 B1 | 8/2014 | Samler et al. |
| 8,819,793 B2 | 8/2014 | Gottschalk, Jr. |
| 8,824,648 B2 | 9/2014 | Zoldi et al. |
| 8,826,393 B2 | 9/2014 | Eisen |
| 8,862,514 B2 | 10/2014 | Eisen |
| 8,862,526 B2 | 10/2014 | Miltonberger |
| 8,909,664 B2 | 12/2014 | Hopkins |
| 8,918,891 B2 | 12/2014 | Coggeshall et al. |
| 8,949,981 B1 | 2/2015 | Trollope et al. |
| 9,118,646 B2 | 8/2015 | Pierson et al. |
| 9,147,117 B1 | 9/2015 | Madhu et al. |
| 9,191,403 B2 | 11/2015 | Zoldi et al. |

(56) References Cited

U.S. PATENT DOCUMENTS

| | | |
|---|---|---|
| 9,194,899 B2 | 11/2015 | Zoldi et al. |
| 9,196,004 B2 | 11/2015 | Eisen |
| 9,210,156 B1 | 12/2015 | Little et al. |
| 9,235,728 B2 | 1/2016 | Gottschalk, Jr. et al. |
| 9,251,541 B2 | 2/2016 | Celka et al. |
| 9,256,624 B2 | 2/2016 | Skurtovich, Jr. et al. |
| 9,280,658 B2 | 3/2016 | Coggeshall et al. |
| 9,361,597 B2 | 6/2016 | Britton et al. |
| 9,367,520 B2 | 6/2016 | Zhao et al. |
| 9,390,384 B2 | 7/2016 | Eisen |
| 9,412,141 B2 | 8/2016 | Prichard et al. |
| 9,483,650 B2 | 11/2016 | Sher-Jan et al. |
| 9,489,497 B2 | 11/2016 | MaGill et al. |
| 9,531,738 B2 | 12/2016 | Zoldi et al. |
| 9,558,368 B2 | 1/2017 | Gottschalk, Jr. et al. |
| 9,595,066 B2 | 3/2017 | Samler et al. |
| 9,652,802 B1 | 5/2017 | Kasower |
| 9,704,195 B2 | 7/2017 | Zoldi |
| 9,710,523 B2 | 7/2017 | Skurtovich, Jr. et al. |
| 9,710,868 B2 | 7/2017 | Gottschalk, Jr. et al. |
| 9,754,256 B2 | 9/2017 | Britton et al. |
| 9,754,311 B2 | 9/2017 | Eisen |
| 9,760,885 B1 | 9/2017 | Ramalingam et al. |
| 9,773,227 B2 | 9/2017 | Zoldi et al. |
| 9,781,147 B2 | 10/2017 | Sher-Jan et al. |
| 9,805,216 B2 * | 10/2017 | Kraska ............... G06F 21/602 |
| 9,953,321 B2 | 4/2018 | Zoldi et al. |
| 10,043,213 B2 | 8/2018 | Straub et al. |
| 10,089,411 B2 | 10/2018 | Kassa |
| 10,089,679 B2 | 10/2018 | Eisen |
| 10,089,686 B2 | 10/2018 | Straub et al. |
| 10,102,530 B2 | 10/2018 | Zoldi et al. |
| 10,115,153 B2 | 10/2018 | Zoldi et al. |
| 10,152,736 B2 | 12/2018 | Yang et al. |
| 10,217,163 B2 | 2/2019 | Straub et al. |
| 10,242,540 B2 | 3/2019 | Chen et al. |
| 10,339,527 B1 | 7/2019 | Coleman et al. |
| 10,373,061 B2 | 8/2019 | Kennel et al. |
| 10,404,472 B2 | 9/2019 | Knopf |
| 10,430,604 B2 | 10/2019 | Spinelli et al. |
| 10,438,308 B2 | 10/2019 | Prichard et al. |
| 10,482,542 B1 | 11/2019 | Jain |
| 10,497,034 B2 | 12/2019 | Yang et al. |
| 10,510,025 B2 | 12/2019 | Zoldi et al. |
| 10,528,948 B2 | 1/2020 | Zoldi et al. |
| 10,579,938 B2 | 3/2020 | Zoldi et al. |
| 10,592,982 B2 | 3/2020 | Samler et al. |
| 10,593,004 B2 | 3/2020 | Gottschalk, Jr. et al. |
| 10,616,196 B1 | 4/2020 | Khitrenovich et al. |
| 10,692,058 B2 | 6/2020 | Zoldi et al. |
| 10,699,028 B1 * | 6/2020 | Kennedy ............ G06F 21/6245 |
| 10,713,711 B2 | 7/2020 | Zoldi |
| 10,769,290 B2 | 9/2020 | Crawford et al. |
| 10,791,136 B2 | 9/2020 | Zoldi et al. |
| 10,896,381 B2 | 1/2021 | Zoldi et al. |
| 10,896,472 B1 | 1/2021 | Stack et al. |
| 10,902,426 B2 | 1/2021 | Zoldi et al. |
| 10,909,617 B2 | 2/2021 | Kasower |
| 10,958,725 B2 | 3/2021 | Knopf |
| 10,977,363 B2 | 4/2021 | Leitner et al. |
| 10,990,979 B1 | 4/2021 | Coleman et al. |
| 10,999,298 B2 | 5/2021 | Eisen |
| 11,023,963 B2 | 6/2021 | Zoldi et al. |
| 11,025,428 B2 | 6/2021 | Knopf |
| 11,030,562 B1 | 6/2021 | Dean et al. |
| 11,037,229 B2 | 6/2021 | Zoldi et al. |
| 11,080,740 B2 | 8/2021 | Billman et al. |
| 11,087,334 B1 | 8/2021 | McEachern et al. |
| 11,093,845 B2 | 8/2021 | Zoldi et al. |
| 11,093,988 B2 | 8/2021 | Zoldi et al. |
| 11,100,506 B2 | 8/2021 | Zoldi et al. |
| 11,108,562 B2 | 8/2021 | Knopf et al. |
| 11,151,468 B1 | 10/2021 | Chen et al. |
| 11,157,650 B1 | 10/2021 | Kennedy et al. |
| 11,256,825 B2 | 2/2022 | Spinelli et al. |
| 11,354,670 B2 | 6/2022 | Phelan et al. |
| 11,367,074 B2 | 6/2022 | Zoldi et al. |
| 11,373,190 B2 | 6/2022 | Zoldi et al. |
| 11,380,171 B2 | 7/2022 | Chen et al. |
| 11,436,606 B1 | 9/2022 | Coleman et al. |
| 2001/0014868 A1 | 8/2001 | Herz et al. |
| 2001/0014878 A1 | 8/2001 | Mitra et al. |
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0039523 A1 | 11/2001 | Iwamoto |
| 2002/0010684 A1 | 1/2002 | Moskowitz |
| 2002/0013899 A1 | 1/2002 | Faul |
| 2002/0019804 A1 | 2/2002 | Sutton |
| 2002/0019938 A1 | 2/2002 | Aarons |
| 2002/0032635 A1 | 3/2002 | Harris et al. |
| 2002/0040344 A1 | 4/2002 | Preiser et al. |
| 2002/0042879 A1 | 4/2002 | Gould et al. |
| 2002/0052841 A1 | 5/2002 | Guthrie et al. |
| 2002/0059521 A1 | 5/2002 | Tasler |
| 2002/0062185 A1 | 5/2002 | Runge et al. |
| 2002/0062281 A1 | 5/2002 | Singhal |
| 2002/0073044 A1 | 6/2002 | Singhal |
| 2002/0077178 A1 | 6/2002 | Oberberger et al. |
| 2002/0077964 A1 | 6/2002 | Brody et al. |
| 2002/0080256 A1 | 6/2002 | Bates et al. |
| 2002/0087460 A1 | 7/2002 | Hornung |
| 2002/0099649 A1 | 7/2002 | Lee et al. |
| 2002/0119824 A1 | 8/2002 | Allen |
| 2002/0130176 A1 | 9/2002 | Suzuki |
| 2002/0138417 A1 | 9/2002 | Lawrence |
| 2002/0138751 A1 | 9/2002 | Dutta |
| 2002/0147695 A1 | 10/2002 | Khedkar et al. |
| 2002/0156676 A1 | 10/2002 | Ahrens et al. |
| 2002/0161664 A1 | 10/2002 | Shaya et al. |
| 2002/0161711 A1 | 10/2002 | Sartor et al. |
| 2002/0173994 A1 | 11/2002 | Ferguson, III |
| 2002/0178112 A1 | 11/2002 | Goeller et al. |
| 2002/0184509 A1 | 12/2002 | Scheidt et al. |
| 2002/0188544 A1 | 12/2002 | Wizon et al. |
| 2003/0004879 A1 | 1/2003 | Demoff et al. |
| 2003/0009426 A1 | 1/2003 | Ruiz-Sanchez |
| 2003/0018549 A1 | 1/2003 | Fei et al. |
| 2003/0033261 A1 | 2/2003 | Knegendorf |
| 2003/0046554 A1 | 3/2003 | Leydier et al. |
| 2003/0048904 A1 | 3/2003 | Wang et al. |
| 2003/0050882 A1 | 3/2003 | Degen et al. |
| 2003/0057278 A1 | 3/2003 | Wong |
| 2003/0061163 A1 | 3/2003 | Durfield |
| 2003/0065563 A1 | 4/2003 | Elliott et al. |
| 2003/0070101 A1 | 4/2003 | Buscemi |
| 2003/0078877 A1 | 4/2003 | Beirne et al. |
| 2003/0093366 A1 | 5/2003 | Halper et al. |
| 2003/0097320 A1 | 5/2003 | Gordon |
| 2003/0105696 A1 | 6/2003 | Kalotay et al. |
| 2003/0115133 A1 | 6/2003 | Bian |
| 2003/0143980 A1 | 7/2003 | Choi et al. |
| 2003/0149744 A1 | 8/2003 | Bierre et al. |
| 2003/0153299 A1 | 8/2003 | Perfit et al. |
| 2003/0158751 A1 | 8/2003 | Suresh et al. |
| 2003/0158960 A1 | 8/2003 | Engberg |
| 2003/0182214 A1 | 9/2003 | Taylor |
| 2003/0195859 A1 | 10/2003 | Lawrence |
| 2003/0200447 A1 | 10/2003 | Sjoblom |
| 2003/0208428 A1 | 11/2003 | Raynes et al. |
| 2003/0222500 A1 | 12/2003 | Bayeur et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0233278 A1 | 12/2003 | Marshall |
| 2004/0004117 A1 | 1/2004 | Suzuki |
| 2004/0005912 A1 | 1/2004 | Hubbe et al. |
| 2004/0010698 A1 | 1/2004 | Rolfe |
| 2004/0024709 A1 | 2/2004 | Yu et al. |
| 2004/0026496 A1 | 2/2004 | Zuili |
| 2004/0030649 A1 | 2/2004 | Nelson et al. |
| 2004/0039586 A1 | 2/2004 | Garvey et al. |
| 2004/0054619 A1 | 3/2004 | Watson et al. |
| 2004/0059653 A1 | 3/2004 | Verkuylen et al. |

(56) References Cited

U.S. PATENT DOCUMENTS

| | | |
|---|---|---|
| 2004/0064401 A1 | 4/2004 | Palaghita et al. |
| 2004/0078324 A1 | 4/2004 | Lonnberg et al. |
| 2004/0103147 A1 | 5/2004 | Flesher et al. |
| 2004/0107363 A1 | 6/2004 | Monteverde |
| 2004/0110119 A1 | 6/2004 | Riconda et al. |
| 2004/0111305 A1 | 6/2004 | Gavan et al. |
| 2004/0111335 A1 | 6/2004 | Black et al. |
| 2004/0117235 A1 | 6/2004 | Shacham |
| 2004/0128227 A1 | 7/2004 | Whipple et al. |
| 2004/0128232 A1 | 7/2004 | Descloux |
| 2004/0133440 A1 | 7/2004 | Carolan et al. |
| 2004/0143526 A1 | 7/2004 | Monasterio et al. |
| 2004/0149820 A1 | 8/2004 | Zuili |
| 2004/0149827 A1 | 8/2004 | Zuili |
| 2004/0153330 A1 | 8/2004 | Miller et al. |
| 2004/0153656 A1 | 8/2004 | Cluts et al. |
| 2004/0158520 A1 | 8/2004 | Noh |
| 2004/0158523 A1 | 8/2004 | Dort |
| 2004/0158723 A1 | 8/2004 | Root |
| 2004/0167793 A1 | 8/2004 | Masuoka et al. |
| 2004/0177046 A1 | 9/2004 | Ogram |
| 2004/0193538 A1 | 9/2004 | Raines |
| 2004/0199456 A1 | 10/2004 | Flint et al. |
| 2004/0199462 A1 | 10/2004 | Starrs |
| 2004/0204948 A1 | 10/2004 | Singletary et al. |
| 2004/0205008 A1 | 10/2004 | Haynie et al. |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230538 A1 | 11/2004 | Clifton et al. |
| 2004/0234117 A1 | 11/2004 | Tibor |
| 2004/0243514 A1 | 12/2004 | Wankmueller |
| 2004/0243518 A1 | 12/2004 | Clifton et al. |
| 2004/0243567 A1 | 12/2004 | Levy |
| 2004/0250085 A1 | 12/2004 | Tattan et al. |
| 2004/0255127 A1 | 12/2004 | Arnouse |
| 2004/0260922 A1 | 12/2004 | Goodman et al. |
| 2005/0001028 A1 | 1/2005 | Zuili |
| 2005/0005168 A1 | 1/2005 | Dick |
| 2005/0010513 A1 | 1/2005 | Duckworth et al. |
| 2005/0010780 A1 | 1/2005 | Kane et al. |
| 2005/0021476 A1 | 1/2005 | Candella et al. |
| 2005/0021519 A1 | 1/2005 | Ghouri |
| 2005/0027983 A1 | 2/2005 | Klawon |
| 2005/0038726 A1 | 2/2005 | Salomon et al. |
| 2005/0038737 A1 | 2/2005 | Norris |
| 2005/0039086 A1 | 2/2005 | Krishnamurthy et al. |
| 2005/0050577 A1 | 3/2005 | Westbrook et al. |
| 2005/0058262 A1 | 3/2005 | Timmins et al. |
| 2005/0065950 A1 | 3/2005 | Chaganti et al. |
| 2005/0071282 A1 | 3/2005 | Lu et al. |
| 2005/0075985 A1 | 4/2005 | Cartmell |
| 2005/0081052 A1 | 4/2005 | Washington |
| 2005/0086161 A1 | 4/2005 | Gallant |
| 2005/0091164 A1 | 4/2005 | Varble |
| 2005/0097039 A1 | 5/2005 | Kulcsar et al. |
| 2005/0097051 A1 | 5/2005 | Madill, Jr. et al. |
| 2005/0097364 A1 | 5/2005 | Edeki et al. |
| 2005/0102206 A1 | 5/2005 | Savasoglu et al. |
| 2005/0105719 A1 | 5/2005 | Huda |
| 2005/0125226 A1 | 6/2005 | Magee |
| 2005/0125686 A1 | 6/2005 | Brandt |
| 2005/0138391 A1 | 6/2005 | Mandalia et al. |
| 2005/0144143 A1 | 6/2005 | Freiberg |
| 2005/0154664 A1 | 7/2005 | Guy et al. |
| 2005/0154665 A1 | 7/2005 | Kerr |
| 2005/0154671 A1 | 7/2005 | Doan et al. |
| 2005/0165667 A1 | 7/2005 | Cox |
| 2005/0197953 A1 | 9/2005 | Broadbent et al. |
| 2005/0203885 A1 | 9/2005 | Chenevich et al. |
| 2005/0216953 A1 | 9/2005 | Ellingson |
| 2005/0229007 A1 | 10/2005 | Bolle et al. |
| 2005/0240578 A1 | 10/2005 | Biederman et al. |
| 2005/0242173 A1 | 11/2005 | Suzuki |
| 2005/0251474 A1 | 11/2005 | Shinn et al. |
| 2005/0256809 A1 | 11/2005 | Sadri |
| 2005/0262014 A1 | 11/2005 | Fickes |
| 2005/0273333 A1 | 12/2005 | Morin et al. |
| 2005/0278542 A1 | 12/2005 | Pierson et al. |
| 2005/0279827 A1 | 12/2005 | Mascavage et al. |
| 2005/0279869 A1 | 12/2005 | Barklage |
| 2006/0004663 A1 | 1/2006 | Singhal |
| 2006/0014129 A1 | 1/2006 | Coleman et al. |
| 2006/0032909 A1 | 2/2006 | Seegar |
| 2006/0041464 A1 | 2/2006 | Powers et al. |
| 2006/0045105 A1 | 3/2006 | Dobosz et al. |
| 2006/0047605 A1 | 3/2006 | Ahmad |
| 2006/0059073 A1 | 3/2006 | Walzak |
| 2006/0059110 A1 | 3/2006 | Madhok et al. |
| 2006/0064374 A1 | 3/2006 | Helsper et al. |
| 2006/0074798 A1 | 4/2006 | Din et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0089905 A1 | 4/2006 | Song et al. |
| 2006/0101508 A1 | 5/2006 | Taylor |
| 2006/0106605 A1 | 5/2006 | Saunders et al. |
| 2006/0112279 A1 | 5/2006 | Cohen et al. |
| 2006/0112280 A1 | 5/2006 | Cohen et al. |
| 2006/0129428 A1 | 6/2006 | Wennberg |
| 2006/0129481 A1 | 6/2006 | Bhatt et al. |
| 2006/0129840 A1 | 6/2006 | Milgramm et al. |
| 2006/0131390 A1 | 6/2006 | Kim |
| 2006/0136332 A1 | 6/2006 | Ziegler |
| 2006/0140460 A1 | 6/2006 | Coutts |
| 2006/0143073 A1 | 6/2006 | Engel et al. |
| 2006/0144924 A1 | 7/2006 | Stover |
| 2006/0149580 A1 | 7/2006 | Helsper et al. |
| 2006/0149674 A1 | 7/2006 | Cook et al. |
| 2006/0161435 A1 | 7/2006 | Atef et al. |
| 2006/0161592 A1 | 7/2006 | Ertoz et al. |
| 2006/0173776 A1 | 8/2006 | Shalley et al. |
| 2006/0173792 A1 | 8/2006 | Glass |
| 2006/0177226 A1 | 8/2006 | Ellis, III |
| 2006/0178971 A1 | 8/2006 | Owen et al. |
| 2006/0179004 A1 | 8/2006 | Fuchs |
| 2006/0195351 A1 | 8/2006 | Bayburtian |
| 2006/0200855 A1 | 9/2006 | Willis |
| 2006/0202012 A1 | 9/2006 | Grano et al. |
| 2006/0204051 A1 | 9/2006 | Holland, IV |
| 2006/0206725 A1 | 9/2006 | Milgramm et al. |
| 2006/0212386 A1 | 9/2006 | Willey et al. |
| 2006/0218069 A1 | 9/2006 | Aberman et al. |
| 2006/0229961 A1 | 10/2006 | Lyftogt et al. |
| 2006/0239512 A1 | 10/2006 | Petrillo |
| 2006/0239513 A1 | 10/2006 | Song et al. |
| 2006/0242046 A1 | 10/2006 | Haggerty et al. |
| 2006/0242047 A1 | 10/2006 | Haggerty et al. |
| 2006/0253358 A1 | 11/2006 | Delgrosso et al. |
| 2006/0253583 A1 | 11/2006 | Dixon et al. |
| 2006/0255914 A1 | 11/2006 | Westman |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0273158 A1 | 12/2006 | Suzuki |
| 2006/0277043 A1 | 12/2006 | Tomes et al. |
| 2006/0282285 A1 | 12/2006 | Helsper et al. |
| 2006/0282372 A1 | 12/2006 | Endres et al. |
| 2006/0282395 A1 | 12/2006 | Leibowitz |
| 2006/0287765 A1 | 12/2006 | Kraft |
| 2006/0288090 A1 | 12/2006 | Kraft |
| 2006/0294023 A1 | 12/2006 | Lu |
| 2007/0005508 A1 | 1/2007 | Chiang |
| 2007/0011100 A1 | 1/2007 | Libin et al. |
| 2007/0016500 A1 | 1/2007 | Chatterji et al. |
| 2007/0016521 A1 | 1/2007 | Wang |
| 2007/0016522 A1 | 1/2007 | Wang |
| 2007/0022141 A1 | 1/2007 | Singleton et al. |
| 2007/0038483 A1 | 2/2007 | Wood |
| 2007/0038568 A1 | 2/2007 | Greene et al. |
| 2007/0040017 A1 | 2/2007 | Kozlay |
| 2007/0040019 A1 | 2/2007 | Berghel et al. |

(56) References Cited

U.S. PATENT DOCUMENTS

| | | |
|---|---|---|
| 2007/0043577 A1 | 2/2007 | Kasower |
| 2007/0047770 A1 | 3/2007 | Swope et al. |
| 2007/0048765 A1 | 3/2007 | Abramson |
| 2007/0050638 A1 | 3/2007 | Rasti |
| 2007/0059442 A1 | 3/2007 | Sabeta |
| 2007/0061273 A1 | 3/2007 | Greene et al. |
| 2007/0067207 A1 | 3/2007 | Haggerty et al. |
| 2007/0067297 A1 | 3/2007 | Kublickis |
| 2007/0072190 A1 | 3/2007 | Aggarwal |
| 2007/0073622 A1 | 3/2007 | Kane |
| 2007/0073630 A1 | 3/2007 | Greene et al. |
| 2007/0078786 A1 | 4/2007 | Bous et al. |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0087795 A1 | 4/2007 | Aletto et al. |
| 2007/0093234 A1 | 4/2007 | Willis et al. |
| 2007/0094137 A1 | 4/2007 | Phillips et al. |
| 2007/0094264 A1 | 4/2007 | Nair |
| 2007/0100774 A1 | 5/2007 | Abdon |
| 2007/0106517 A1 | 5/2007 | Cluff et al. |
| 2007/0106582 A1 | 5/2007 | Baker et al. |
| 2007/0106611 A1 | 5/2007 | Larsen |
| 2007/0107050 A1 | 5/2007 | Selvarajan |
| 2007/0109103 A1 | 5/2007 | Jedrey et al. |
| 2007/0110282 A1 | 5/2007 | Millsapp |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0155411 A1 | 7/2007 | Morrison |
| 2007/0157299 A1 | 7/2007 | Hare |
| 2007/0168246 A1 | 7/2007 | Haggerty et al. |
| 2007/0168480 A1 | 7/2007 | Biggs et al. |
| 2007/0174208 A1 | 7/2007 | Black et al. |
| 2007/0179903 A1 | 8/2007 | Seinfeld et al. |
| 2007/0180209 A1 | 8/2007 | Tallman |
| 2007/0180263 A1 | 8/2007 | Delgrosso et al. |
| 2007/0186276 A1 | 8/2007 | McRae et al. |
| 2007/0192248 A1 | 8/2007 | West |
| 2007/0192853 A1 | 8/2007 | Shraim et al. |
| 2007/0198410 A1 | 8/2007 | Labgold et al. |
| 2007/0205266 A1 | 9/2007 | Carr et al. |
| 2007/0208669 A1 | 9/2007 | Rivette et al. |
| 2007/0214037 A1 | 9/2007 | Shubert et al. |
| 2007/0214365 A1 | 9/2007 | Cornett et al. |
| 2007/0219928 A1 | 9/2007 | Madhogarhia |
| 2007/0220594 A1 | 9/2007 | Tulsyan |
| 2007/0226093 A1 | 9/2007 | Chan et al. |
| 2007/0226129 A1 | 9/2007 | Liao et al. |
| 2007/0233614 A1 | 10/2007 | McNelley et al. |
| 2007/0234427 A1 | 10/2007 | Gardner et al. |
| 2007/0244782 A1 | 10/2007 | Chimento |
| 2007/0244807 A1 | 10/2007 | Andringa et al. |
| 2007/0250704 A1 | 10/2007 | Hallam-Baker |
| 2007/0250920 A1 | 10/2007 | Lindsay |
| 2007/0266439 A1 | 11/2007 | Kraft |
| 2007/0282730 A1 | 12/2007 | Carpenter et al. |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0291995 A1 | 12/2007 | Rivera |
| 2007/0292006 A1 | 12/2007 | Johnson |
| 2007/0294104 A1 | 12/2007 | Boaz et al. |
| 2007/0299759 A1 | 12/2007 | Kelly |
| 2008/0010203 A1 | 1/2008 | Grant |
| 2008/0010683 A1 | 1/2008 | Baddour et al. |
| 2008/0010687 A1 | 1/2008 | Gonen et al. |
| 2008/0015887 A1 | 1/2008 | Drabek et al. |
| 2008/0021804 A1 | 1/2008 | Deckoff |
| 2008/0027857 A1 | 1/2008 | Benson |
| 2008/0027858 A1 | 1/2008 | Benson |
| 2008/0052182 A1 | 2/2008 | Marshall |
| 2008/0059236 A1 | 3/2008 | Cartier |
| 2008/0059352 A1 | 3/2008 | Chandran |
| 2008/0059364 A1 | 3/2008 | Tidwell et al. |
| 2008/0059366 A1 | 3/2008 | Fou |
| 2008/0063172 A1 | 3/2008 | Ahuja et al. |
| 2008/0066188 A1 | 3/2008 | Kwak |
| 2008/0071882 A1 | 3/2008 | Hering et al. |
| 2008/0076386 A1 | 3/2008 | Khetawat et al. |
| 2008/0077526 A1 | 3/2008 | Arumugam |
| 2008/0098222 A1 | 4/2008 | Zilberman |
| 2008/0103798 A1 | 5/2008 | Domenikos et al. |
| 2008/0103799 A1 | 5/2008 | Domenikos et al. |
| 2008/0103800 A1 | 5/2008 | Domenikos et al. |
| 2008/0103811 A1 | 5/2008 | Sosa |
| 2008/0103972 A1 | 5/2008 | Lanc |
| 2008/0104021 A1 | 5/2008 | Cai et al. |
| 2008/0104672 A1 | 5/2008 | Lunde et al. |
| 2008/0109444 A1 | 5/2008 | Williams et al. |
| 2008/0114837 A1 | 5/2008 | Biggs et al. |
| 2008/0120237 A1 | 5/2008 | Lin |
| 2008/0126116 A1 | 5/2008 | Singhai |
| 2008/0126233 A1 | 5/2008 | Hogan |
| 2008/0147454 A1 | 6/2008 | Walker et al. |
| 2008/0154758 A1 | 6/2008 | Schattmaier et al. |
| 2008/0162202 A1 | 7/2008 | Khanna et al. |
| 2008/0162259 A1 | 7/2008 | Patil et al. |
| 2008/0162383 A1 | 7/2008 | Kraft |
| 2008/0167883 A1 | 7/2008 | Thavildar Khazaneh |
| 2008/0175360 A1 | 7/2008 | Schwarz et al. |
| 2008/0177655 A1 | 7/2008 | Zalik |
| 2008/0177841 A1 | 7/2008 | Sinn et al. |
| 2008/0189789 A1 | 8/2008 | Lamontagne |
| 2008/0208548 A1 | 8/2008 | Metzger et al. |
| 2008/0208610 A1 | 8/2008 | Thomas et al. |
| 2008/0208726 A1 | 8/2008 | Tsantes et al. |
| 2008/0217400 A1 | 9/2008 | Portano |
| 2008/0228635 A1 | 9/2008 | Megdal et al. |
| 2008/0243680 A1 | 10/2008 | Megdal et al. |
| 2008/0244717 A1 | 10/2008 | Jelatis et al. |
| 2008/0255922 A1 | 10/2008 | Feldman et al. |
| 2008/0255992 A1 | 10/2008 | Lin |
| 2008/0256613 A1 | 10/2008 | Grover |
| 2008/0281737 A1 | 11/2008 | Fajardo |
| 2008/0281743 A1 | 11/2008 | Pettit |
| 2008/0288382 A1 | 11/2008 | Smith et al. |
| 2008/0288430 A1 | 11/2008 | Friedlander et al. |
| 2008/0288790 A1 | 11/2008 | Wilson |
| 2008/0294540 A1 | 11/2008 | Celka et al. |
| 2008/0294689 A1 | 11/2008 | Metzger et al. |
| 2008/0296367 A1 | 12/2008 | Parkinson |
| 2008/0296382 A1 | 12/2008 | Connell, II et al. |
| 2008/0300877 A1 | 12/2008 | Gilbert et al. |
| 2008/0319889 A1 | 12/2008 | Hammad |
| 2009/0007220 A1 | 1/2009 | Ormazabal et al. |
| 2009/0018934 A1 | 1/2009 | Peng et al. |
| 2009/0021349 A1 | 1/2009 | Errico et al. |
| 2009/0024417 A1 | 1/2009 | Marks et al. |
| 2009/0024505 A1 | 1/2009 | Patel et al. |
| 2009/0024636 A1 | 1/2009 | Shiloh |
| 2009/0024663 A1 | 1/2009 | McGovern |
| 2009/0026270 A1 | 1/2009 | Connell, II et al. |
| 2009/0043637 A1 | 2/2009 | Eder |
| 2009/0044279 A1 | 2/2009 | Crawford et al. |
| 2009/0048957 A1 | 2/2009 | Celano |
| 2009/0079539 A1 | 3/2009 | Johnson |
| 2009/0094311 A1 | 4/2009 | Awadallah et al. |
| 2009/0099960 A1 | 4/2009 | Robida et al. |
| 2009/0106153 A1 | 4/2009 | Ezra |
| 2009/0106846 A1* | 4/2009 | Dupray .......... G06Q 40/02 726/26 |
| 2009/0112650 A1 | 4/2009 | Iwane |
| 2009/0119106 A1 | 5/2009 | Rajakumar et al. |
| 2009/0119299 A1 | 5/2009 | Rhodes |
| 2009/0125369 A1 | 5/2009 | Kloostra et al. |
| 2009/0125439 A1 | 5/2009 | Zarikian et al. |
| 2009/0125463 A1 | 5/2009 | Hido |
| 2009/0138391 A1 | 5/2009 | Dudley et al. |
| 2009/0141318 A1 | 6/2009 | Hughes |
| 2009/0151005 A1 | 6/2009 | Bell et al. |
| 2009/0158404 A1 | 6/2009 | Hahn et al. |
| 2009/0164380 A1 | 6/2009 | Brown |
| 2009/0172815 A1 | 7/2009 | Gu et al. |

(56) References Cited

U.S. PATENT DOCUMENTS

| | | |
|---|---|---|
| 2009/0182653 A1 | 7/2009 | Zimiles |
| 2009/0199264 A1 | 8/2009 | Lang |
| 2009/0205032 A1 | 8/2009 | Hinton et al. |
| 2009/0206993 A1 | 8/2009 | Di Mambro et al. |
| 2009/0216560 A1 | 8/2009 | Siegel |
| 2009/0216747 A1* | 8/2009 | Li .................. G06Q 10/067 707/999.005 |
| 2009/0222308 A1 | 9/2009 | Zoldi et al. |
| 2009/0222362 A1 | 9/2009 | Stood et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0222897 A1 | 9/2009 | Carow et al. |
| 2009/0224875 A1 | 9/2009 | Rabinowitz et al. |
| 2009/0224889 A1 | 9/2009 | Aggarwal et al. |
| 2009/0226056 A1 | 9/2009 | Vlachos et al. |
| 2009/0234738 A1 | 9/2009 | Britton et al. |
| 2009/0240609 A1 | 9/2009 | Cho et al. |
| 2009/0241168 A1 | 9/2009 | Readshaw |
| 2009/0241173 A1 | 9/2009 | Troyansky |
| 2009/0248198 A1 | 10/2009 | Siegel et al. |
| 2009/0248497 A1 | 10/2009 | Hueter |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0254476 A1 | 10/2009 | Sharma et al. |
| 2009/0254484 A1 | 10/2009 | Forero et al. |
| 2009/0257595 A1 | 10/2009 | de Cesare et al. |
| 2009/0259470 A1 | 10/2009 | Chang |
| 2009/0259560 A1 | 10/2009 | Bachenheimer |
| 2009/0259588 A1 | 10/2009 | Lindsay |
| 2009/0259855 A1 | 10/2009 | de Cesare et al. |
| 2009/0261189 A1 | 10/2009 | Ellis, Jr. |
| 2009/0270126 A1 | 10/2009 | Liu |
| 2009/0271265 A1 | 10/2009 | Lay et al. |
| 2009/0271617 A1 | 10/2009 | Song et al. |
| 2009/0272801 A1 | 11/2009 | Connell, II et al. |
| 2009/0276244 A1 | 11/2009 | Baldwin, Jr. et al. |
| 2009/0281945 A1 | 11/2009 | Shakkarwar |
| 2009/0281951 A1 | 11/2009 | Shakkarwar |
| 2009/0289110 A1 | 11/2009 | Regen et al. |
| 2009/0300066 A1 | 12/2009 | Guo et al. |
| 2009/0307778 A1 | 12/2009 | Mardikar |
| 2009/0326972 A1 | 12/2009 | Washington |
| 2009/0328173 A1 | 12/2009 | Jakobson et al. |
| 2010/0024037 A1 | 1/2010 | Grzymala-Busse et al. |
| 2010/0030677 A1 | 2/2010 | Melik-Aslanian et al. |
| 2010/0031030 A1 | 2/2010 | Kao et al. |
| 2010/0037147 A1 | 2/2010 | Champion et al. |
| 2010/0037308 A1 | 2/2010 | Lin et al. |
| 2010/0042526 A1 | 2/2010 | Martinov |
| 2010/0043055 A1 | 2/2010 | Baumgart |
| 2010/0070620 A1 | 3/2010 | Awadallah et al. |
| 2010/0077006 A1 | 3/2010 | El Emam et al. |
| 2010/0085146 A1 | 4/2010 | Johnson |
| 2010/0088233 A1 | 4/2010 | Tattan et al. |
| 2010/0088338 A1 | 4/2010 | Pavoni, Jr. et al. |
| 2010/0094664 A1 | 4/2010 | Bush et al. |
| 2010/0094767 A1 | 4/2010 | Miltonberger |
| 2010/0094768 A1 | 4/2010 | Miltonberger |
| 2010/0094910 A1 | 4/2010 | Bayliss |
| 2010/0095357 A1 | 4/2010 | Willis et al. |
| 2010/0100406 A1 | 4/2010 | Lim |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0131273 A1 | 5/2010 | Aley-Raz et al. |
| 2010/0132043 A1 | 5/2010 | Bjorn et al. |
| 2010/0145836 A1 | 6/2010 | Baker et al. |
| 2010/0158207 A1 | 6/2010 | Dhawan et al. |
| 2010/0169210 A1 | 7/2010 | Bous et al. |
| 2010/0169947 A1 | 7/2010 | Sarmah et al. |
| 2010/0188684 A1 | 7/2010 | Kumara |
| 2010/0205662 A1 | 8/2010 | Ibrahim et al. |
| 2010/0217837 A1 | 8/2010 | Ansari et al. |
| 2010/0218255 A1 | 8/2010 | Ritman et al. |
| 2010/0228649 A1 | 9/2010 | Pettitt |
| 2010/0228657 A1 | 9/2010 | Kagarlis |
| 2010/0229225 A1 | 9/2010 | Sarmah et al. |
| 2010/0229230 A1 | 9/2010 | Edeki et al. |
| 2010/0229245 A1 | 9/2010 | Singhal |
| 2010/0241501 A1 | 9/2010 | Marshall |
| 2010/0250364 A1 | 9/2010 | Song et al. |
| 2010/0250411 A1 | 9/2010 | Ogrodski |
| 2010/0250509 A1 | 9/2010 | Andersen |
| 2010/0250955 A1 | 9/2010 | Trevithick et al. |
| 2010/0268557 A1 | 10/2010 | Faith et al. |
| 2010/0274679 A1 | 10/2010 | Hammad |
| 2010/0275265 A1 | 10/2010 | Fiske et al. |
| 2010/0280882 A1 | 11/2010 | Faith et al. |
| 2010/0293090 A1 | 11/2010 | Domenikos et al. |
| 2010/0293114 A1 | 11/2010 | Khan et al. |
| 2010/0302157 A1 | 12/2010 | Zilberman |
| 2010/0306101 A1 | 12/2010 | Lefner et al. |
| 2010/0313273 A1 | 12/2010 | Freas |
| 2010/0325035 A1 | 12/2010 | Hilgers et al. |
| 2010/0325442 A1 | 12/2010 | Petrone et al. |
| 2010/0332292 A1 | 12/2010 | Anderson |
| 2010/0332362 A1 | 12/2010 | Ramsey et al. |
| 2011/0004498 A1 | 1/2011 | Readshaw |
| 2011/0016042 A1 | 1/2011 | Cho et al. |
| 2011/0040983 A1 | 2/2011 | Grzymala-Busse et al. |
| 2011/0047071 A1 | 2/2011 | Choudhuri et al. |
| 2011/0066547 A1 | 3/2011 | Clark et al. |
| 2011/0082768 A1 | 4/2011 | Eisen |
| 2011/0093383 A1 | 4/2011 | Haggerty et al. |
| 2011/0112958 A1 | 5/2011 | Haggerty et al. |
| 2011/0119291 A1 | 5/2011 | Rice |
| 2011/0126024 A1 | 5/2011 | Beatson et al. |
| 2011/0126275 A1 | 5/2011 | Anderson et al. |
| 2011/0131123 A1 | 6/2011 | Griffin et al. |
| 2011/0145899 A1 | 6/2011 | Cao et al. |
| 2011/0166988 A1 | 7/2011 | Coulter |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0238566 A1 | 9/2011 | Santos |
| 2011/0260832 A1 | 10/2011 | Ross et al. |
| 2011/0276496 A1 | 11/2011 | Neville et al. |
| 2011/0282778 A1 | 11/2011 | Wright et al. |
| 2011/0289032 A1 | 11/2011 | Crooks et al. |
| 2011/0289322 A1 | 11/2011 | Rasti |
| 2011/0295721 A1 | 12/2011 | MacDonald |
| 2011/0295750 A1 | 12/2011 | Rammal |
| 2011/0296529 A1 | 12/2011 | Bhanoo et al. |
| 2011/0302412 A1 | 12/2011 | Deng et al. |
| 2011/0302641 A1 | 12/2011 | Hald et al. |
| 2012/0030080 A1 | 2/2012 | Slater et al. |
| 2012/0030083 A1 | 2/2012 | Newman et al. |
| 2012/0030771 A1 | 2/2012 | Pierson et al. |
| 2012/0036352 A1* | 2/2012 | Tovar .................. H04L 61/2539 713/153 |
| 2012/0066073 A1 | 3/2012 | Dilip et al. |
| 2012/0101939 A1 | 4/2012 | Kasower |
| 2012/0158574 A1 | 6/2012 | Brunzell et al. |
| 2012/0158654 A1 | 6/2012 | Behren et al. |
| 2012/0198556 A1 | 8/2012 | Patel et al. |
| 2012/0215682 A1 | 8/2012 | Lent et al. |
| 2012/0278227 A1 | 11/2012 | Kolo et al. |
| 2012/0278249 A1 | 11/2012 | Duggal et al. |
| 2012/0290660 A1 | 11/2012 | Rao et al. |
| 2013/0004033 A1 | 1/2013 | Trugenberger et al. |

(56) References Cited

U.S. PATENT DOCUMENTS

| | | | |
|---|---|---|---|
| 2013/0132060 A1 | 5/2013 | Badhe et al. | |
| 2013/0185293 A1 | 7/2013 | Boback | |
| 2013/0218797 A1 | 8/2013 | Prichard et al. | |
| 2014/0007238 A1 | 1/2014 | Magee et al. | |
| 2014/0058910 A1 | 2/2014 | Abeles | |
| 2014/0149304 A1 | 5/2014 | Bucholz et al. | |
| 2014/0214636 A1 | 7/2014 | Rajsky | |
| 2014/0283097 A1* | 9/2014 | Allen | G06F 21/6254 726/26 |
| 2014/0304822 A1 | 10/2014 | Sher-Jan et al. | |
| 2015/0106260 A1 | 4/2015 | Andrews et al. | |
| 2015/0142595 A1 | 5/2015 | Acuña-Rohter | |
| 2015/0161529 A1 | 6/2015 | Kondaji et al. | |
| 2015/0186901 A1 | 7/2015 | Miltonberger | |
| 2015/0199784 A1 | 7/2015 | Straub et al. | |
| 2015/0295924 A1 | 10/2015 | Gottschalk, Jr. | |
| 2016/0012561 A1 | 1/2016 | Lappenbusch et al. | |
| 2016/0063278 A1 | 3/2016 | Kraska et al. | |
| 2016/0063645 A1 | 3/2016 | Houseworth et al. | |
| 2016/0071208 A1 | 3/2016 | Straub et al. | |
| 2016/0086262 A1 | 3/2016 | Straub et al. | |
| 2016/0142532 A1 | 5/2016 | Bostick | |
| 2016/0210450 A1 | 7/2016 | Su | |
| 2016/0328814 A1 | 11/2016 | Prichard et al. | |
| 2016/0344758 A1 | 11/2016 | Cohen et al. | |
| 2016/0379011 A1* | 12/2016 | Koike | G06F 16/285 726/26 |
| 2017/0053369 A1 | 2/2017 | Gottschalk, Jr. et al. | |
| 2017/0099314 A1 | 4/2017 | Klatt et al. | |
| 2017/0177683 A1* | 6/2017 | Koike | G06F 21/6254 |
| 2017/0206376 A1 | 7/2017 | Sher-Jan | |
| 2017/0270629 A1 | 9/2017 | Fitzgerald | |
| 2017/0278182 A1 | 9/2017 | Kasower | |
| 2017/0287065 A1 | 10/2017 | Samler et al. | |
| 2017/0357971 A1 | 12/2017 | Pitz et al. | |
| 2017/0374076 A1 | 12/2017 | Pierson et al. | |
| 2018/0004978 A1* | 1/2018 | Hebert | G06F 16/2457 |
| 2018/0013786 A1 | 1/2018 | Knopf | |
| 2018/0101890 A1 | 4/2018 | Eisen | |
| 2018/0130157 A1 | 5/2018 | Gottschalk, Jr. et al. | |
| 2018/0322572 A1 | 11/2018 | Straub et al. | |
| 2019/0073676 A1 | 3/2019 | Wang | |
| 2019/0164173 A1 | 5/2019 | Liu et al. | |
| 2019/0228178 A1 | 7/2019 | Sharma et al. | |
| 2019/0266609 A1 | 8/2019 | Phelan et al. | |
| 2019/0294786 A1 | 9/2019 | Villavicencio et al. | |
| 2019/0311366 A1 | 10/2019 | Zoldi et al. | |
| 2019/0333101 A1 | 10/2019 | Sohum et al. | |
| 2019/0377896 A1 | 12/2019 | Spinelli et al. | |
| 2020/0134629 A1 | 4/2020 | Zoldi et al. | |
| 2020/0143465 A1 | 5/2020 | Chilaka et al. | |
| 2020/0145436 A1 | 5/2020 | Brown et al. | |
| 2020/0151628 A1 | 5/2020 | Zoldi et al. | |
| 2020/0193018 A1 | 6/2020 | Van Dyke | |
| 2020/0242425 A1 | 7/2020 | Chandra et al. | |
| 2020/0293684 A1 | 9/2020 | Harris et al. | |
| 2020/0380112 A1 | 12/2020 | Allen | |
| 2020/0396246 A1 | 12/2020 | Zoldi et al. | |
| 2021/0021631 A1 | 1/2021 | Okutan et al. | |
| 2021/0150532 A1 | 5/2021 | Zhang et al. | |
| 2021/0209230 A1 | 7/2021 | Leitner et al. | |
| 2021/0326785 A1 | 10/2021 | McBurnett et al. | |
| 2022/0038481 A1 | 2/2022 | Jones | |
| 2022/0046088 A1 | 2/2022 | Knopf | |
| 2022/0084032 A1 | 3/2022 | Koehler et al. | |
| 2022/0103589 A1 | 3/2022 | Shen et al. | |
| 2022/0123946 A1 | 4/2022 | Knopf | |
| 2022/0147817 A1 | 5/2022 | Boardman et al. | |

FOREIGN PATENT DOCUMENTS

| | | |
|---|---|---|
| CN | 113011973 | 6/2021 |
| DE | 91 08 341 | 10/1991 |
| EP | 0 554 083 | 8/1993 |
| EP | 2 939 361 | 10/2019 |
| EP | 3 929 849 | 12/2021 |
| GB | 2 392 748 | 3/2004 |
| GB | 2 518 099 | 3/2015 |
| JP | 2011-134252 | 7/2011 |
| JP | 5191376 | 5/2013 |
| KR | 10-2004-0034063 | 4/2004 |
| TW | I256569 | 6/2006 |
| WO | WO 94/006103 | 3/1994 |
| WO | WO 96/041488 | 12/1996 |
| WO | WO 00/055778 | 9/2000 |
| WO | WO 00/055789 | 9/2000 |
| WO | WO 00/055790 | 9/2000 |
| WO | WO 01/011522 | 2/2001 |
| WO | WO 02/027610 | 4/2002 |
| WO | WO 02/097563 | 12/2002 |
| WO | WO 03/071388 | 8/2003 |
| WO | WO 02/037219 A9 | 5/2004 |
| WO | WO 2004/046882 | 6/2004 |
| WO | WO 2006/069199 | 6/2006 |
| WO | WO 2007/001394 | 1/2007 |
| WO | WO 2007/106393 | 9/2007 |
| WO | WO 2008/054403 | 5/2008 |
| WO | WO 2008/054849 | 5/2008 |
| WO | WO 2008/147918 | 12/2008 |
| WO | WO 2009/062111 | 5/2009 |
| WO | WO 2009/117518 | 9/2009 |
| WO | WO 2011/044036 | 4/2011 |
| WO | WO 2012/054646 | 4/2012 |
| WO | WO 2012/112781 | 8/2012 |
| WO | WO 2013/026343 | 2/2013 |
| WO | WO 2013/126281 | 8/2013 |
| WO | WO 2014/008079 | 1/2014 |
| WO | WO 2014/008247 | 1/2014 |
| WO | WO 2014/150987 | 9/2014 |
| WO | WO 2015/184006 | 12/2015 |
| WO | WO 2018/175440 | 9/2018 |
| WO | WO 2018/208770 | 11/2018 |
| WO | WO 2019/006272 | 1/2019 |
| WO | WO 2019/040443 | 2/2019 |
| WO | WO 2019/050864 | 3/2019 |
| WO | WO 2019/079071 | 4/2019 |
| WO | WO 2019/125445 | 6/2019 |
| WO | WO 2019/169000 | 9/2019 |
| WO | WO 2022/026273 | 2/2022 |
| WO | WO 2022/031412 | 2/2022 |
| WO | WO 2022/032285 | 2/2022 |
| WO | WO 2022/072989 | 4/2022 |

OTHER PUBLICATIONS

Dimopoulou et al., "Mobile Anonymization and Pseudonymization of Structured Health Data for Research," 2022 Seventh International Conference on Mobile and Secure Services (MobiSecServ), 2022, pp. 1-6, doi: 10.1109/MobiSecServ50855.2022.9727206. (Year: 2022).*

Pervushin et al., "Determination of loss of information during data anonymization procedure," 2016 IEEE 10th International Conference on Application of Information and Communication Technologies (AICT), 2016, pp. 1-5, doi: 10.1109/ICAICT.2016.7991650. (Year: 2016).*

Kalam et al., "Personal data anonymization for security and privacy in collaborative environments," Proceedings of the 2005 International Symposium on Collaborative Technologies and Systems, 2005., 2005, pp. 56-61, doi: 10.1109/ISCST.2005.1553294. (Year: 2005).*

U.S. Appl. No. 16/012,681, filed Jun. 19, 2018, U.S. Pat. No. 10,699,028, Identity Security Architecture Systems and Methods.

U.S. Appl. No. 16/880,279, filed May 21, 2020, U.S. Pat. No. 11,157,650, Identity Security Architecture Systems and Methods.

U.S. Appl. No. 09/557,252, filed Apr. 24, 2000, Page.

U.S. Appl. No. 12/705,489, filed Feb. 12, 2010, Bargoli et al.

U.S. Appl. No. 12/705,511, filed Feb. 12, 2010, Bargoli et al.

"A New Approach to Fraud Solutions", BasePoint Science Solving Fraud, pp. 8, 2006.

(56) References Cited

OTHER PUBLICATIONS

Aad et al., "NRC Data Collection and the Privacy by Design Principles", IEEE, Nov. 2010, pp. 5.
Allard et al., "Safe Realization of the Generalization Privacy Mechanism", 2011 Ninth Annual International Conference on Privacy, Security and Trust, pp. 8.
"Arizona Company Has Found Key in Stopping ID Theft," PR Newswire, New York, Aug. 10, 2005 http://proquest.umi.com/pqdweb?did=880104711&SID=1&Fmt=3&clientId=19649&RQT=309&Vname=PQD.
ABC News Now:Money Matters, as broadcasted Nov. 15, 2005 with guest Todd Davis (CEO of Lifelock), pp. 6.
AlSalamah et al., "Security Risk Management in Online System", 2017 5th International Conference on Applied Computing and Information Technology/4th International Conference on Computational Science/Intelligence and Applied Informatics/2nd International Conference on Big Data, Cloud Computing, Data Science & Engineering, 2017, pp. 119-124.
Anonymous, "Feedback", Credit Management, ABI/Inform Global, Sep. 2006, pp. 6.
"Beverly Hills Man Convicted of Operating 'Bust-Out' Schemes that Caused More than $8 Million in Losses", Department of Justice, Jul. 25, 2006, 2 Pgs.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
"Bust-Out Schemes", Visual Analytics Inc. Technical Product Support, Newsletter vol. 4, Issue 1, Jan. 2005, pp. 7.
Chores & Allowances, "Do Kids Have Credit Reports?" Oct. 15, 2007, http://choresandallowances.blogspot.com/2007/10/do-kids-have-credit-reports.html, pp. 5.
Cowie, Norman, "Warning Bells & 'The Bust-Out'", Business Credit, Jul. 1, 2000, pp. 5.
Cullen, Terri; "The Wall Street Journal Complete Identity Theft Guidebook:How to Protect Yourself from the Most Pervasive Crime in America"; Chapter 3, pp. 59-79; Jul. 10, 2007.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Dealing with Measurement Noise (A Gentle Introduction to Noise Filtering)", Chemical and Process Engineering, University of Newcastle Upon Tyne, https://web.archive.org/web/20000418021742/http://lorien.ncl.ac.uk/ming/filter/filewma.htm, Archived Apr. 18, 2000, pp. 3.
EFunds Corporation, "Data & Decisioning: Debit Report" printed Apr. 1, 2007, http://www.efunds.com/web/industry-solutions/financial-services/frm-debit-report/htm in 1 page.
El Kalam et al., "Personal Data Anonymization for Security and Privacy in Collaborative Environments", 2005 IEEE, pp. 56-61.
Equifax; "Equifax Credit Watch"; https://www.econsumer.equifax.co.uk/consumer/uk/sitepage.ehtml, dated Jun. 27, 2007 on www.archive.org.
Experian Team, "Impact on Credit Scores of Inquiries for an Auto Loan," Ask Experian, Mar. 1, 2009, pp. 5.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
"Fighting the New Face of Fraud", FinanceTech, http://www.financetech.com/showArticle.jhtml?articleID=167100405, Aug. 2, 2005.

"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
"Fraud Alert | Learn How". Fight Identity Theft. http://www.fightidentitytheft.com/flag.html, accessed on Nov. 5, 2009.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
Haglund, Christoffer, "Two-Factor Authentication with a Mobile Phone", Fox Technologies, Uppsala, Department of Information Technology, Nov. 2, 2007, pp. 62.
Herzberg, Amir, "Payments and Banking with Mobile Personal Devices," Communications of the ACM, May 2003, vol. 46, No. 5, pp. 53-58.
"ID Analytics ID Network", from www.idanalytics.com, as retrieved from www.archive.org, dated Nov. 20, 2005 or earlier; attached as "ID Network (IDN)", pp. 8.
ID Cops, www.idcops.com; retrieved from www.archive.org any linkage Feb. 16, 2007.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
"Industry News, New Technology Identifies Mortgage Fraud: Basepoint Analytics Launches FraudMark", Inman News, American Land Title Association, Oct. 5, 2005, pp. 1.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
"Intersections, Inc. Identity Guard", from www.intersections.com and www.identityguard.com, as retrieved from Internet Archive, dated Nov. 25, 2005 or earlier; attached as "Identity Guard (IDG)", pp. 7.
Iovation, Device Identification & Device Fingerprinting, http://www.iovation.com/risk-management/device-identification printed Nov. 5, 2012 in 6 pages.
Jacob et al., A Case Study of Checking Account Inquiries and Closures in Chicago, The Center for Financial Services Innovation, Nov. 2006.
Jaeger, Herbert, "A Tutorial on Training Recurrent Neural Networks, Covering BPPT, RTRL, EKF and the 'Echo State Network' Approach", Fraunhofer Institute for Autonomous Intelligent Systems (AIS), International University Bremen, Oct. 2002, pp. 46.
Jin et al., "Network Security Risks in Online Banking", 2005 International Conference on Wireless Communications, Networking and Mobile Computing, Jan. 2005, vol. 2, pp. 1229-1234.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.

(56) References Cited

OTHER PUBLICATIONS

Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lamons, Bob, "Be Smart: Offer Inquiry Qualification Services," Marketing News, ABI/Inform Global, Nov. 6, 1995, vol. 29, No. 23, pp. 13.
Lee, Timothy B., "How America's Broken Tax System Makes Identity Theft Easy", http://www.vox.com/2014/4/14/5608072/how-americas-broken-tax-system-makes-identity-theft-easy, Apr. 14, 2014, pp. 10.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm DVD and Child Identification Kit", Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Quinn, Tom, "Low Credit Inquiries Affect Your Credit Score", Credit.com, May 2, 2011, pp. 2.
"Recurrent Neural Network", as downloaded from wikipedia.org <https://en.wikipedia.org/wiki/Recurrent_neural_network?oldid=717224329>, Apr. 2016, pp. 8.
Ribeiro et al., "Privacy Protection with Pseudonumization and Anonumization in a Health IoT System", Results from OCARIoT, 2019 IEEE, pp. 904-908.
Rivera, Barbara, "New Tools for Combating Income Tax Refund Fraud", https://gcn.com/Articles/2014/05/08/Insight-tax-fraud-tools.aspx?Page=1, May 8, 2014, pp. 3.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
ShoeBoxed, https://www.shoeboxed.com/sbx-home/ printed Oct. 16, 2012 in 4 pages.
Singletary, Michelle, "The Littlest Victims of ID Theft", The Washington Post, The Color of Money, Oct. 4, 2007.
Sumner, Anthony, "Tackling the Issue of Bust-Out Fraud", Retail Banker International, Jul. 24, 2007, pp. 4.
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", e-News, Experian: Decision Analytics, pp. 4, [Originally Published in Retail Banker International Magazine Jul. 24, 2007].
"The Return Review: Program Increases Fraud Detection; However, Full Retirement of the Electronic Fraud Detection System Will be Delayed", Treasury Inspector General for Tax Administration, Sep. 25, 2017, Reference No. 2017-20-080, pp. 27.
TheMorningCall.com, "Cheap Ways to Foil Identity Theft," www.mcall.com/business/columnists/all-karp.5920748jul01,0 . . . , published Jul. 1, 2007.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "Howto Handle ID Fraud's Youngest Victims," Nov. 21, 2008, http://news.cnet.com/8301-10789_3-10105303-57.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wilson, Andrea, "Escaping the Alcatraz of Collections and Charge-Offs", http://www.transactionworld.net/articles/2003/october/riskMgmt1.asp, Oct. 2003.
International Search Report and Written Opinion for Application No. PCT/US2007/06070, dated Nov. 10, 2008.
International Search Report and Written Opinion for Application No. PCT/US2008/064594, dated Oct. 30, 2008.
International Preliminary Report and Written Opinion in PCT/US2008/064594, dated Dec. 10, 2009.
International Search Report and Written Opinion for Application No. PCT/US09/37565, dated May 12, 2009.
Official Communication in Australian Patent Application No. 2012217565, dated May 12, 2017.
Official Communication in Australian Patent Application No. 2017203586, dated Jun. 18, 2019.
Official Communication in Australian Patent Application No. 2019279982, dated Dec. 19, 2019.

(56) References Cited

OTHER PUBLICATIONS

Official Communication in Canadian Patent Application No. 2,827,478, dated Jun. 29, 2017.
Official Communication in Canadian Patent Application No. 2,827,478, dated May 31, 2018.
Official Communication in Canadian Patent Application No. 2,827,478, dated Mar. 27, 2019.
Extended European Search Report for Application No. EP12747205, dated Sep. 25, 2014.
Supplementary European Search Report for Application No. EP12747205, dated Jun. 19, 2015.
Extended European Search Report for Application No. EP18748000, dated Dec. 13, 2018.
International Search Report and Written Opinion for Application No. PCT/US2012/025456, dated May 21, 2012.
International Preliminary Report on Patentability in Application No. PCT/US2012/025456, dated Aug. 21, 2013.
International Search Report and Written Opinion for Application No. PCT/US2011/033940, dated Aug. 22, 2011.
Gaudio, David, "Intelligent Adaptive Authentication: How 6 Workflow Steps Improve Customer Experience", OneSpan, https://www.onespan.com/blog/intelligent-adaptive-authentication-how-6-workflow-steps-improve-customer-experience, Jun. 22, 2020, pp. 6.
Lennox et al., "Tax Aggressiveness and Accounting Fraud", Journal of Accounting Research, 2013, pp. 40.
Torgler, Benno, "What Do We Know about Tax Fraud?: An Overview of Recent Developments", Social Research: An International Quarterly, vol. 74, No. 4, Winter 2008, pp. 1239-1270.

\* cited by examiner

Figure 4B:
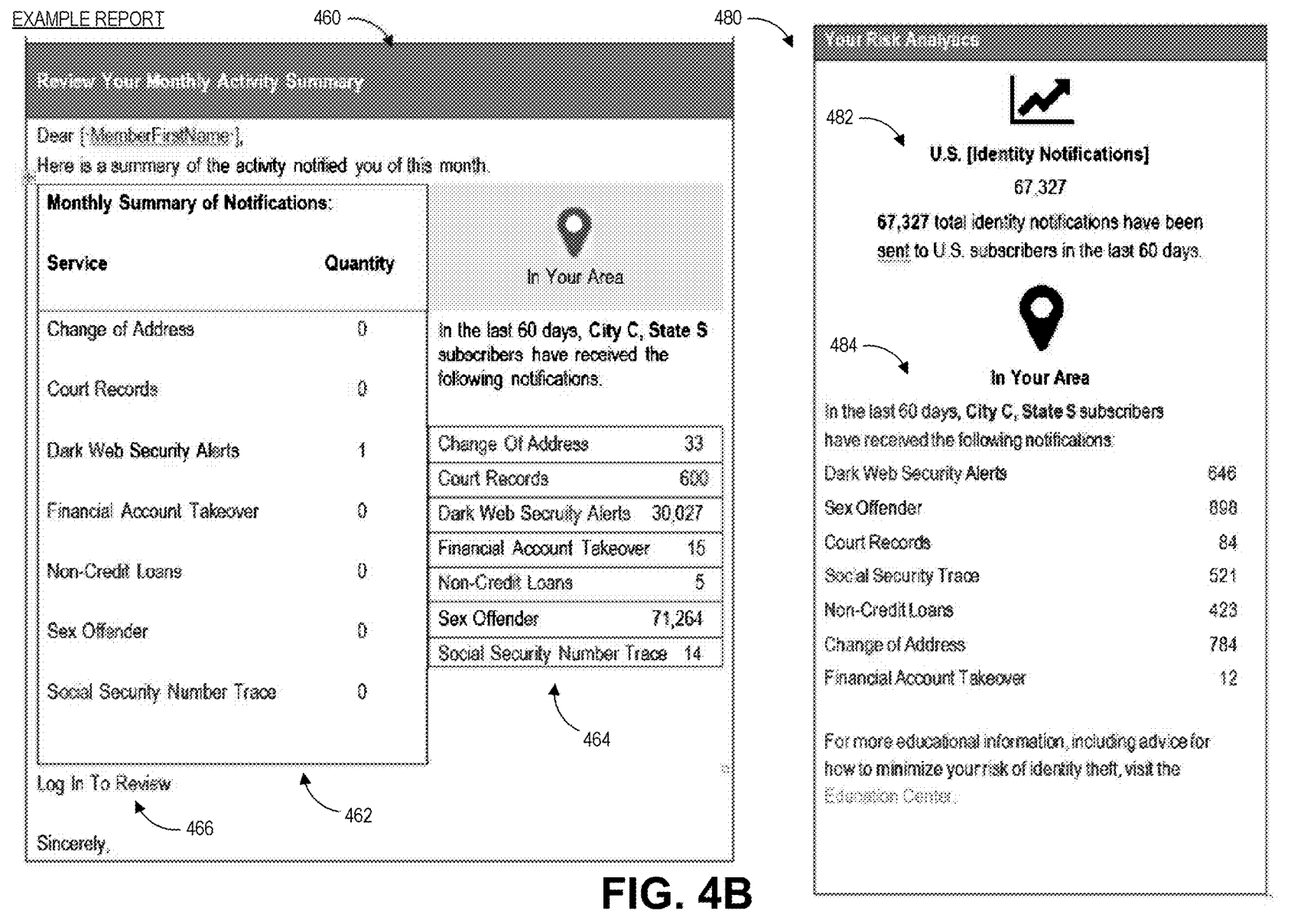

EXAMPLE REPORT

Protect Your Family Activity Summary

Dear [MemberFirstName],
Here is a summary of the activity notified you of this month.

Monthly Summary of Notifications:

| Service | Quantity |
|---|---|
| Change of Address | 0 |
| Court Records | 0 |
| Dark Web Security Alerts | 1 |
| Financial Account Takeover | 0 |
| Non-Credit Loans | 0 |
| Sex Offender | 0 |
| Social Security Number Trace | 0 |

In Your Area

In the last 60 days, City C, State S subscribers have received the following notifications.

| | |
|---|---|
| Change Of Address | 33 |
| Court Records | 600 |
| Dark Web Security Alerts | 30,027 |
| Financial Account Takeover | 15 |
| Non-Credit Loans | 5 |
| Sex Offender | 71,264 |
| Social Security Number Trace | 14 |

Log In To Review ← 466

Sincerely,

460 —
462
464

---

Identity Activity

U.S. [Identity Notifications]
67,327

67,327 total identity notifications have been sent to U.S. subscribers in the last 60 days.

In Your Area

In the last 60 days, City C, State S subscribers have received the following notifications

| | |
|---|---|
| Dark Web Security Alerts | 646 |
| Sex Offender | 898 |
| Court Records | 84 |
| Social Security Trace | 521 |
| Non-Credit Loans | 423 |
| Change of Address | 784 |
| Financial Account Takeover | 12 |

For more educational information, including advice for how to minimize your risk of identity theft, visit the Education Center.

IDENTITY SECURITY ARCHITECTURE SYSTEMS AND METHODS

PRIORITY CLAIM

This application is a continuation of U.S. patent application Ser. No. 16/880,279, filed May 21, 2020, which is a continuation of U.S. patent application Ser. No. 16/012,681, filed Jun. 19, 2018, now U.S. Pat. No. 10,699,028, issued Jun. 30, 2020, which claims the benefit of priority under 35 U.S.C. § 119(e) of U.S. Provisional Application No. 62/565,014, filed on Sep. 28, 2017, the entire contents of which are hereby incorporated by reference in their entirety herein and should be considered part of this specification.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE DISCLOSURE

The present disclosure generally relates to information security such as detecting and alerting an identity theft in a computer environment.

BACKGROUND OF THE DISCLOSURE

Identity theft is one of the largest and expanding forms of crime in the world. Identity theft is a crime in which an imposter obtains key pieces of information, such as social security numbers, driver's license numbers, email addresses, and so forth, and uses it for his or her improper personal gain. The imposters can obtain new accounts; re-direct the mail and telephone calls from existing accounts; sign up for unwanted and often expensive services; order subscriptions; order and take delivery of products; and otherwise "become" the individual whose identity has been stolen, minus the conscience and fiscal responsibility.

SUMMARY OF EXAMPLE EMBODIMENTS

Various systems and methods described herein provide a database analytics system which is configured to provide alerts to a user for personalized metrics related to potential identity theft incidents. The alerts can include user specific information on security breaches of the user's personal information as well as depersonalized statistics generated based on information of other users having one or more similar characteristics of the user.

In one embodiment, an identity security system comprises a non-transitory data storage configured to store computer executable instructions for an identity data analysis system; a dark web data store configured to store compromised data related to users' personal identifying information (PII) and aggregated statistics calculated based on the compromised data; a plurality of identity alerts data stores configured to store alerts sent to the users and metadata associated with the alerts; an identity metrics data store configured to store depersonalized summary statistics. The hardware processor can be programmed to execute the computer executable instructions in the non-transitory data storage to cause the identity security system to: receive an instruction to generate an alert comprising personalized metrics of a user, wherein the instruction comprises PII of the user; query a dark web data store with the PII of the user to acquire information on security compromises related to the PII of the user; query an identity alerts data store with geographic location information of the user to obtain report statistics associated with a geographic region of the user; query an identity metrics database to obtain the depersonalized summary statistics, wherein the depersonalized summary statistics are generated based on a group of individuals whose PIIs overlaps at least with a portion of the user's PII; generate an alert which comprises information on security compromises related to the PII of the user, report statistics associated with a geographic region of the user, and depersonalized summary statistics; and deliver the alert to a client computing device via a network.

In another embodiment, a method for protecting identity security can comprise: receiving an instruction to generate an alert comprising personalized metrics of a user, wherein the instruction comprises PII of the user; querying a dark web data store with the PII of the user to acquire information on security compromises related to the PII of the user; querying an identity alerts data store with geographic location information of the user to obtain report statistics associated with a geographic region of the user; querying an identity metrics database to obtain depersonalized summary statistics, wherein the depersonalized summary statistics are generated based on a group of individuals whose PIIs overlaps at least with a portion of the user's PII; generating an alert which comprises information on security compromises related to the PII of the user, report statistics associated with a geographic region of the user, and the depersonalized summary statistics; and delivering the alert to a client computing device via a network.

In yet another embodiment, non-transitory computer readable medium storing computer executable instructions thereon, the computer executable instructions when executed can cause an identity security system to: receive an instruction to generate an alert comprising personalized metrics of a user, wherein the instruction comprises PII of the user; query a dark web data store with the PII of the user to acquire information on security compromises related to the PII of the user; query an identity alerts data store with geographic location information of the user to obtain report statistics associated with a geographic region of the user; query an identity metrics database to obtain depersonalized summary statistics, wherein the depersonalized summary statistics are generated based on a group of individuals whose PIIs overlaps at least with a portion of the user's PII; generate an alert which comprises information on security compromises related to the PII of the user, report statistics associated with a geographic region of the user, and the depersonalized summary statistics; and deliver the alert to a client computing device via a network.

Although certain embodiments and examples are disclosed herein, the subject matter extends beyond the examples in the specifically disclosed embodiments to other alternative embodiments and/or uses, and to modifications and equivalents thereof. The systems, methods, and devices of the disclosure each have several innovative aspects, no single one of which is solely responsible for the desirable attributes disclosed herein.

BRIEF DESCRIPTION OF THE DRAWINGS

Throughout the drawings, reference numbers are re-used to indicate correspondence between referenced elements.

The drawings are provided to illustrate embodiments of the subject matter described herein and not to limit the scope thereof.

FIG. 4B illustrates example embodiments of reports delivered to a client computing device.

DETAILED DESCRIPTION OF VARIOUS EMBODIMENTS

Overview

Figure 1:
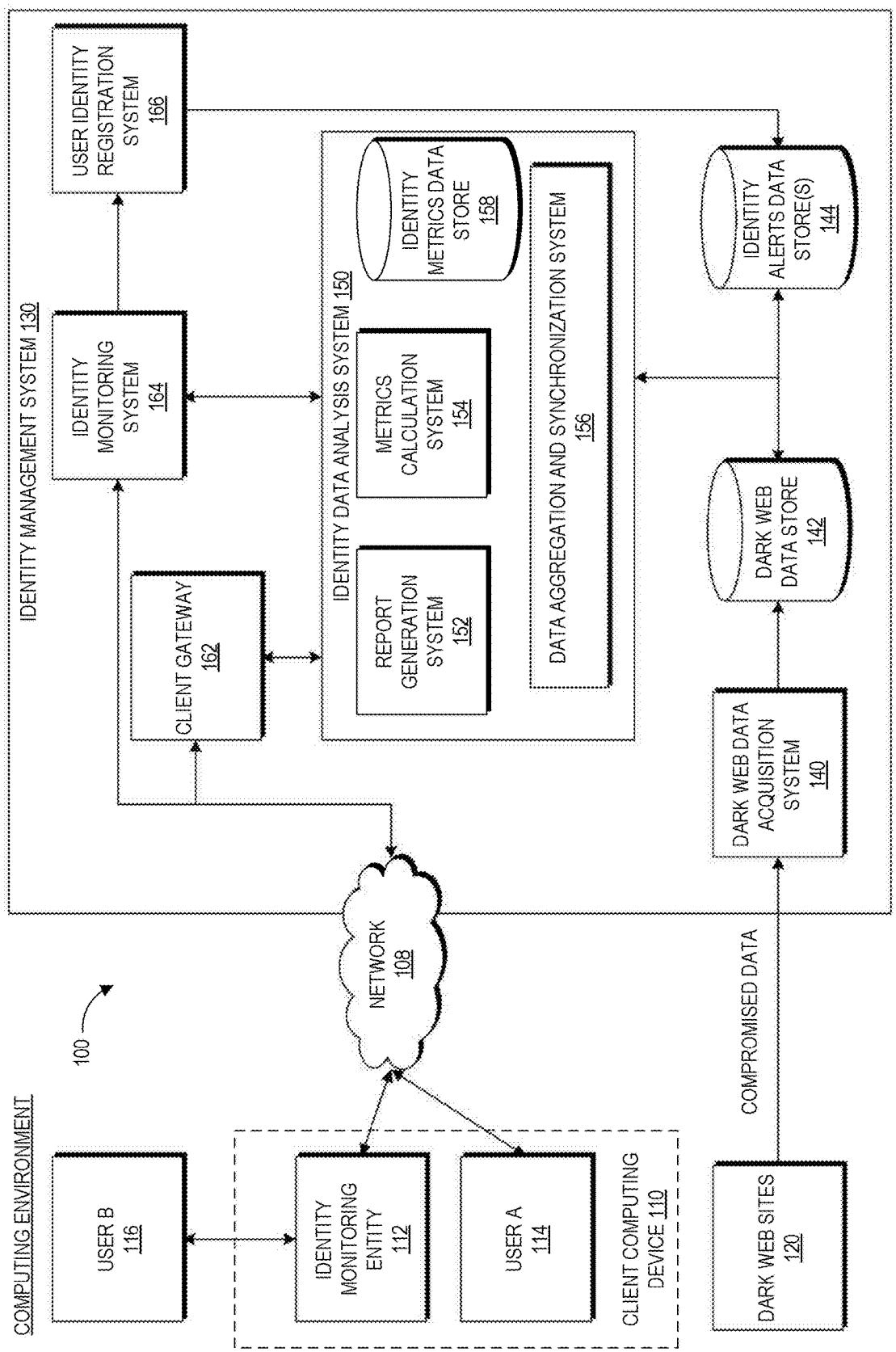
FIG. 1 illustrates an embodiment of a computing environment for an identity management system.

With the spread of computer and Internet usage, there is a growing concern about the increased risk of identity theft. Individuals often reveal their personally identifiable information (PII) on the Internet when conducting transaction or interacting with various websites. The PII can include information that can be used to uniquely identify, contact, or locate an individual person or can be used with other sources to uniquely identify, contact, or locate an individual person. PII may include, but is not limited to, social security numbers (SSN), bank or credit card account numbers, passwords, birth dates, and addresses. Imposters can acquire the PII from various sources, such as the Internet, and take advantage of sensitive personal information, such as, for example, by committing fraud with the stolen identity. As an example, it is commonplace for PII to be compromised and utilized for identity theft in a remote commercial transaction which involves little or no direct personal contact between a consumer and a goods or services provider.

Identity theft resulting from compromised PII (such as the PII obtained without proper authorization) is costly to victims and companies alike. The Identity Fraud Survey Report created by Javelin Strategy & Research reported that in 2009 victims averaged a personal cost of $373 and 21 hours of time to resolve identity-theft issues. The annual cost of identity theft currently exceeds $200 billion worldwide. In addition, as a result of new legislation and litigation resulting from compromised PII, companies stand to suffer from lower profit margins, damaged credibility due to negative customer experiences, and eroded brand value. Identity theft also looms as a threat to the advancement of promising consumer-driven, self-service, and cost-savings technologies.

Identity theft can be discovered using monitoring platforms which conduct automated inquiries and searches of a variety of third party sources to locate matches to a person's information and providing an automated alert if an anomaly is detected. For example, an identity management system can alert a user where suspicious use of its PII is discovered, and can allow them to remediate the damage of the stolen information if an identity theft occurs. However, the rate on how often a person receives the identity alert is typically low. For example, a person can subscribe to an identity monitoring service but only get one to two alerts during the entire subscription. As a result of the low alert frequency, the person may not know if there are no alerts or if their account has been compromised.

Thus, it is important that an identity monitoring service increases the frequency of the alerts but yet continues to provide relevant and valuable information in the alert without disclosing the PII of other persons. Advantageously, in some embodiments, the identity management system described herein can generate relevant alerts for a user more frequently. For example, the identity management system can utilize a web-based Application Programming Interface (API) to receive a user's personal and demographic information from a client computing device. The API can generate personalized metrics for the user and return an alert including the personalized metrics. The personalized metrics can include identity metrics specific to the user's PII, such as the number of hits found for user's PII in a security breach (for example, the number of hits of the user's email address in a search of dark websites). Advantageously, in some embodiments, the personalized metrics can also include depersonalized identity metrics such that the statistics of the identity metrics are based on a group of users whose identities are not revealed to the user. Some example of depersonalized identity metrics can include the number of alerts that have been generated for other monitored consumers with in the same geographical region of the user, the total number of compromised email addresses where the number of compromised email addresses matches the user's email address domain, the total number of compromised credit cards where the credit cards are from the same issuer as the user's credit card, the total number of comprised phone numbers having the same area code as the user's phone number, and so forth. The personalized metrics can be calculated over different time horizons. For example, the personalized metrics can be calculated based on historical total, last 5 days, last 60 days, last 3 months, or other time durations.

The personalized metrics can be calculated based on statistics generated using dark web data (which may include compromised personal information) and historical identity monitoring alerts associated with other individuals (and/or the user). The statistics can further be refined or filtered to generate personalized metrics based on the person's personal and demographic information. For example, the depersonalized statistics may be filtered to identify the number of notifications sent to users within the same geographic areas as the user whose identity metrics are calculated. Accordingly, a user can learn the likelihood that his personal information is stolen based on compromised data from similar individuals.

As will be appreciated by one skilled in the art, there are numerous ways of carrying out the examples, improvements, and arrangements of the identity management system in accordance with the embodiments disclosed herein. Although reference will be made to the illustrative embodiments depicted in the drawings and the following description, these embodiments are not meant to be exhaustive of the various alternative designs and embodiments that are encompassed by the disclosed embodiments. Those skilled in the art will readily appreciate that various modifications may be made, and various combinations can be made, without departing from the disclosure.

For purposes of this disclosure, certain aspects, advantages, and novel features of various embodiments are described herein. It is to be understood that not necessarily all such advantages may be achieved in accordance with any particular embodiment. Thus, for example, those skilled in the art will recognize that one embodiment may be carried out in a manner that achieves one advantage or group of advantages as taught herein without necessarily achieving other advantages as may be taught or suggested herein.

Computing Environment of Identity Management System

FIG. 1 illustrates an embodiment of a computing environment for an identity management system. The identity management system 130 can be in communication with a client computing device 110 via a network 108. For example, client computing device 110 can generate and send request messages to obtain a user's identity metrics or a request to monitor a user's identity metric to the identity management system 130. The identity management system 130 can calculate identity metrics for the user based on data associated with individuals similar to the user (such as, for example, data obtained from dark web sites) as well as data particular to the user's PII. The identity management system 130 can generate and return an encrypted report package which includes the identity metrics to the client computing device. To simplify discussion and not to limit the present disclosure, FIG. 1 illustrates only one client computing device 110 and one identity management system 130, though multiple systems may be used.

Client Computing Device

The illustrated client computing device 110 can implement a web portal or application to communicate with the identity management system 130. For example, the client computing system 110 can host a software application which includes an API for requesting and receiving a user's identity metrics. As another example, the client computing device 110 can communicate with the identity management system 130 via a browser application. The client computing device 110 can request and receive reports including identity metrics via HTTP protocols.

The client computing device 110 can be associated with an identity monitoring entity 112 or a user 114. The identity monitoring entity 112 may be a company or a software suite which offers identity monitoring or reporting to an individual. The identity monitoring entity 112 may also be an entity interested in obtaining another individual's information (such as for example, where a company runs a background check of an employee candidate). A user may be an individual whose identity metrics are calculated and reported.

In some embodiments, a user (for example, the user A 114) can send an electronic request for a report of his identity metrics. A user can communicate directly with the identity management system 130 to request a report. For example, as illustrated in FIG. 1, the user A 114 can request his identity metrics from the identity management system 130 via the network 108 or enroll in an identity monitoring service without going through the identity monitoring entity 112.

The identity monitoring entity 112 can act on behalf of a user to obtain the user's information. For example, the identity monitoring entity 112 can provide an online portal which allows the user B 116 to input his PII. The identity monitoring entity 112 can use the user B's PII to request personalized metrics for user B. Based on the PII provided by the identity monitoring entity 112, the identity management system 130 can return a report comprising the personalized metrics for user B 116. As further described with reference to FIGS. 4A and 4B, the personalized metrics may be generated based on data specific to the user's PII or data from individuals similar to the user B 116.

As another example, the identity monitoring entity 112 can subscribe on behalf of the user B 116 for monitoring the user B's 116 identity. Once the identity management system 130 receives the user B's PII, the identity management system 130 can register the user B's information and periodically sending personalized metrics to the identity monitoring entity 112 or directly to the user B. The personalized metrics may be delivered as an electronic alert (which is also referred to as a report), for example, via an email, a mobile application, a text message, and so on.

The client computing device 110 can implement one or more components of the computing system 600 as described with reference to FIG. 6. The modules 609 of FIG. 6 can include software executable code for receiving PII from a user (for example, user B 116 or user A 114), and for communicating to the identity management system 130 a request for a report or a request to enroll a user into periodic monitoring of the user's identity metrics. The software executable code can also include routines for delivering or displaying a report to a user (for example, user B 116).

Network

The network 108 can comprise one or more of local area network (LAN), wide area network (WAN), and/or the Internet, for example, via a wired, wireless, or combination of wired and wireless communication links. The network 108 may communicate with various computing devices and/or other electronic devices via wired or wireless communication links. The network 108 may be used to share resources and may be used for the analog and/or digital transfer of data and information. In some embodiments, the network 108 can be used to enable multiple devices access to a single system, enable file sharing across the network 108, share software programs on remote systems, or make information easier to access and maintain among network users.

A remote system or device may include data, objects, devices, components, and/or modules not stored locally, that are not accessible via the local bus. Thus, remote devices may include a device which is physically stored in the same room and connected to the user's device via a network. In other situations, a remote device may be located in a separate geographic area, such as, for example, in a different location, country, and so forth.

Although not specifically illustrated in FIG. 1, the user B 116 can also communicate with the identity monitoring entity 112 via the network 108 and the identity management system 130 can also acquire comprised data from the dark web sites 120 via the network 108.

Identity Management System

The identity management system 130 illustrated in FIG. 1 includes a client gateway 162, an identity monitoring system 164, a user identity registration system 166, an identity alerts data store 144, a dark web data store 142, a data acquisition system 130, and an identity data analysis system 150. In various embodiments, one or more of these systems may be combined into a single system or one or more systems may be part of another system. For example, the identity monitoring system 164 and the client gateway 162 may be combined as one system. As another example, the user identity registration system 166 may be part of the identity monitoring system 164. The identity management system 130 can also include other components not illustrated in FIG. 1. As an example, the identity management system 130 may include a report and alert data acquisition system 230 configured to calculate report statistics associated with reports sent to the users of the identity management system 130.

Client Gateway, Identity Monitoring System, and User Identity Registration System The client gateway 162 can be configured to receive a request for personalized metrics from the client computing device 110. The request may include PII of a user. The client gateway 162 can parse the request to extract PII and feed the PII into the identity data analysis system 150 to obtain a report comprising the personalized metrics for the user. The client gateway 162 can pass the report back to the client computing device 110 for delivery or display to a user. In some embodiments, the identity data analysis system 150 can pass the report directly back to the client computing device 110 via the network 108.

In some embodiments, the request from the client computing device 110 may be a subscription request which includes a request to subscribe a user to receiving periodic reports of the user's personalized metrics. The client gateway 162 can determine that the request includes a subscription request, such as by parsing the electronic request data package, and forward the request to the identity monitoring system 164 for further processing (such as storing the user's PII in a data store or registering the user to the period monitoring).

In some embodiments, if the client computing device 110 can send the subscription request directly to the identity monitoring system 164 without first routing through the client gateway 162. The identity monitoring system 164 can be configured to receive a subscription request for subscribing a user to a monitoring service where the identity management system 130 periodically calculates the personalized metrics for the user and delivers the personalized metrics to the user. For example, the identity monitoring system 164 can receive a request to subscribe a user from the client computing device 110. The request can include the user's PII. The identity monitoring system 164 can extract the PII from the request and pass the PII to the user identity registration system 166.

The user identity registration system 166 can initiate storage of the user's PII into the identity alerts data store or another data store configured to store subscribers' information. The user identity registration system 166 can further associate the user's PII with periodic monitoring and calculation of personalized metrics. The identity monitoring system 164 can periodically cause the identity data analysis system 150 to calculate personalized metrics and pass the periodic calculation to the client computing device as a report. For example, the identity monitoring system 164 can periodically send a request for a user's personalized metrics to the identity data analysis system 150. As another example, the identity monitoring system 164 can periodically send the request to the client gateway 162 which can pass the request to the identity data analysis system 150 for calculating the user's personalized metrics.

Although the identity monitoring system 164 and the user identity registration system 166 are illustrated as two separate blocks, the user identity registration system 166 may be part of the identity monitoring system 154. Thus, the identity monitoring system 164 can be configured to provide periodic monitoring service to the identity monitoring entity 112 and a user A 114, where the identity monitoring system 164 can subscribe a user to a periodic monitoring of his personalized metrics, periodically calculate the user's personalized metrics, and deliver the personalized metrics to the client computing device 110.

In some embodiments, the client gateway 162 and the identity monitoring system 164 may be combined to become one system which can be configured to handle requests from the client computing device 110 and provide reports to the client computing device 110. For example, the combined system may receive a request for personalized metrics or a request to subscribe a user to periodic alerts related to the personalize metrics. The combined system can pass the PII associated with the request to the identity data analysis system 150 to retrieve the personalized metrics. The combined system can also register a user for periodic monitoring related to his identity information and periodically communicate with the identity data analysis system 150 to retrieve the personalized metrics.

Dark Web Data Acquisition System

The illustrated dark web data acquisition system 140 can be configured to identify, acquire, and analyze data associated with PII that may be compromised. PII can be compromised in a myriad of ways. Record keeping for entities such as, for example, healthcare, governmental, financial, and educational institutions, is increasingly and sometimes exclusively electronic. Electronic record keeping introduces new risks for which the entities are frequently ill-equipped to handle. For example, PII is often compromised via stolen hardware, inadequate security procedures, security breaches, or employee carelessness or misconduct.

Another way that PII is frequently compromised is via phishing. Phishing is the process of attempting to acquire PII by masquerading as a trustworthy entity in an electronic communication. A common example of phishing is a fraudulent email that is made to appear as though it originates from a valid source such as, for example, a national bank. The fraudulent email may incorporate a uniform resource locator (URL) that re-directs its target to a false website that appears to be a legitimate website for the valid source. In actuality, the false website may be a front for stealing PII as part of a spurious transaction. For example, the false website may request a confirmation of PII such as, for example, a credit card number or a username and password. The PII may then be stored for later improper use such as, for example, identity theft in a remote commercial transaction.

The dark web data acquisition system 140 can acquire data associated with PII and determine whether the PII is compromised by scanning dark web sites. The data associated with compromised PII can also be referred to compromised data. The dark web data acquisition system 140 can utilize search engines, web spiders, keyword-matching features, data filters, and so forth to uncover information associated with PII. For example, the search engines and the web spiders may be utilized to collect identity-theft information, such as, for example, potential sources of compromised PII. The potential sources of compromised PII may include, for example, websites and forums that facilitate exchange of compromised PII (for example, by identity thieves). Further, keyword-matching features may be leveraged to analyze the potential sources of identity-theft information using, for example, identity-theft nomenclature.

Oftentimes, compromised PII is exchanged via chat rooms (for example, between identity thieves on Internet Relay Chat (IRC) channels). The dark web data acquisition system 140 can utilize an IRC bot to crawl the Internet in search of chat rooms (for example, IRC channels) that are frequented by identity thieves. The IRC bot can be operable to monitor such chat rooms for identity-theft nomenclature. Furthermore, the IRC bot 101 can be operable to identify and collect compromised PII, uniform resource locators (URLs), references to other IRC chat rooms, and other identity-theft information from such chat rooms.

In addition to or in alternative to scanning the dark websites, the dark web data acquisition system 140 can also acquire compromised PII from other sources. For example, individuals' PIIs may be compromised due to a security breach of an electronic commerce websites. The dark web data acquisition system 140 can acquire the compromised PIIs from the electronic commerce websites. As another example, a user may report an account as stolen to an account issuer. The account issuer can report the stolen account to the dark web data acquisition system 140 and the stolen account (as well as information associated with the stolen account) can thus be flagged as compromised PII.

The compromised PII may be parsed, analyzed, and stored into the dark web data store 142. For example, the identity-theft information collected from the dark websites 120 or other sources may be processed for compromised PII by one or more parsers that recognize common formats for PII (such as for example recognizing a list of text strings as email address or credit card numbers). Advantageously, in some embodiments, the dark web data acquisition system 140 can de-personalize the compromised data. For example, the data web data acquisition system 140 can calculate statistics based on the compromised data and store the statistics in the dark web data store 142 or another persistent storage location. In some embodiments, the statistics may be stored in dedicated lookup tables (as illustrated by aggregated statistics database 224). As an example, one of the statistics can be associated with email domains. The dark web data acquisitions system 130 can calculate the number of hits during a time period for a certain domain name (such as, for example, "email.exampledomain.com") as found in the data from the dark web sites 120. Advantageously, in some embodiments, such statistics are depersonalized such that they are not specific to a person's PII but nevertheless provide valuable information for the user based on the statistics of other individuals whose email addresses have the same domain name. As further described with reference to data aggregation and synchronizations system 156, in some embodiments, the process of calculating aggregated statistic and/or de-personalizing the compromised data may be performed by the data aggregation and synchronization system 156.

Identity Data Analysis System

The identity data analysis system 150 can include a data aggregation and synchronization system 156, a metrics calculation system 154, report generation system 152, and an identity metrics data store 158. The data aggregation and synchronization system 156 can be configured to acquire compromised PII or statistics (shown in FIG. 3A) stored in the dark web data store 142. The data aggregation and synchronization system 156 can also be configured to acquire report and alert data associated with users of the identity management system 130 by communicating with the identity alerts data store 144.

The data aggregation and synchronization system 156 can synchronize the data acquired from the dark web data store 142 and the identity alerts data store(s) 144 with the data in the identity metrics data store 158. The identity metrics data store 158 can be configured to store master statistics tables (such as, for example, the tables 342 and 344 shown in FIG. 3A) which can include statistics associated with various identity metrics. The identity metrics data store 158 can also be configured to store counterpart tables which correspond to tables in the dark web data store 142 and the identity alerts data store(s) 144. The data aggregation and synchronization system 156 can synchronize the counterpart tables may be synchronized with the corresponding tables in the dark web data store 142 and the identity alerts data store(s) 144. Data in the counterpart tables may be used to calculate statistics associated with various identity metrics and update the master statistics tables stored in the identity metrics data store 158.

Although not shown in FIG. 1, the data aggregation and synchronization system 156 can also be configured to aggregate and synchronize data from other data sources such as, a data store associated with one or more credit bureaus which can store a user's credit data.

The master statistics tables stored in the identity metrics data store 158 can be used by the metrics calculation system 154 to generate personalized metrics for a user. For example, the metrics calculation system can use PII of the user to determine a user's zip code. The metrics calculation system 154 can access the identity metrics data store 158 to determine the number of compromises of PIIs within the user's zip code. The metrics calculation system 154 can return the number of PIIs to the client computing device 110 (for example, via the report generation system 152), which may indicate a likelihood on whether the user is living in a region with a high risk of identity theft. In some embodiments, the metrics calculation system 150 can update the statistics in the identity metrics data store periodically based on the data synchronization with the dark web data store 142 and the identity alerts data store(s) 144. For example, the metrics calculation system 150 can re-calculate the number of compromised incidents for a given email domain after the metrics calculation system 150 receives an update from the data aggregation and synchronization system 158 for the latest data received from the dark web data store 142.

Figure 4A:
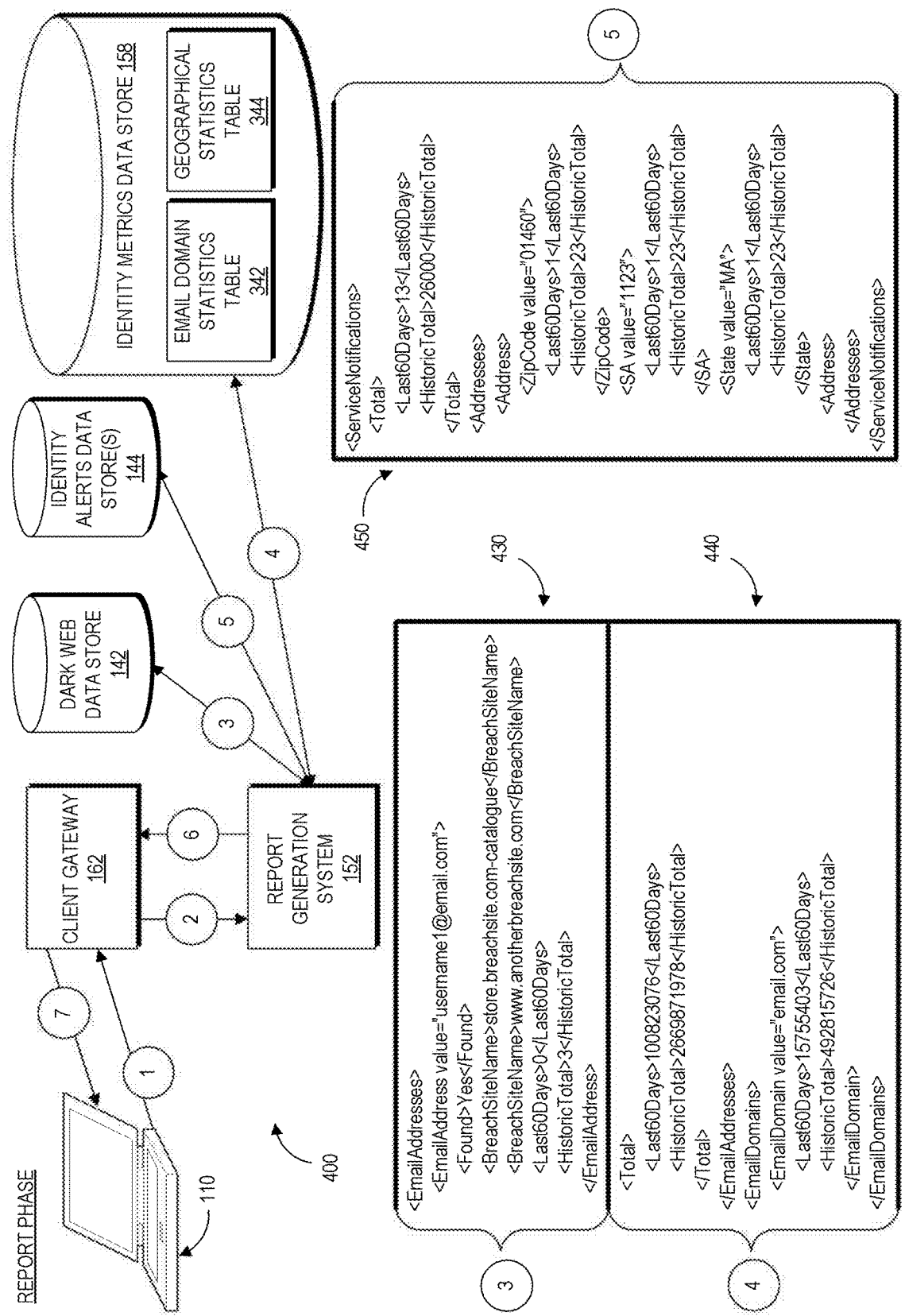
FIG. 4A illustrates an example embodiment of a data flow diagram for report generation.

As further described with reference to FIG. 4A, the report generation system 152 can be configured to acquire a report based on data from the dark web data store 142, the identity alerts data store(s) 144, and the identity metrics data store 158. For example, the report may include information on an email domain name and the site where the breach occurs, as well as the number of breaches identified for the same email domain name. The report generation system 152 can obtain the email domain name and the site of breach from the dark web data store 142 and obtain the number of breaches identified for the same email domain name from the identity metrics data store. The report can also include the number of notifications sent to people within the same zip code as the user. The report generations system 152 can obtain information on the number of notifications from the identity alerts data store(s) 144.

As further described with reference to FIGS. 4A and 4B, the report may be communicated to the client computing device 110 in various ways. For example, the report may be in an extensible markup language (XML) format and can be communicated to the client computing device 110 via an API. The report can also be a hypertext markup language (HTML) webpage which can be rendered by a browser of the client computing deice 110. In some embodiments, the client computing device 110, the client gateway 162, or the identity monitoring system 164, can automatically populate an HTML template for rendering of the XML report.

Although the report generation system is illustrated as a separate system from the metrics calculation system 154, the report generation system can also be part of the metrics calculation system 154. Further, as described with reference to FIG. 4A, the report generation system 152 can also be part of the client gateway 162.

The identity data analysis system 150 may also be used to perform analytics on the dark web data store 142 or data received from the dark web. For example, the identity data analysis system 150 may determine that there has been a spike in the number of compromised credentials related to a particular domain (for example, Company A), which could be used by the system to send an alert for a potential breach with Company A's data.

Dark Web Data Store and Identity Alerts Data Store(s)

Figure 2A:
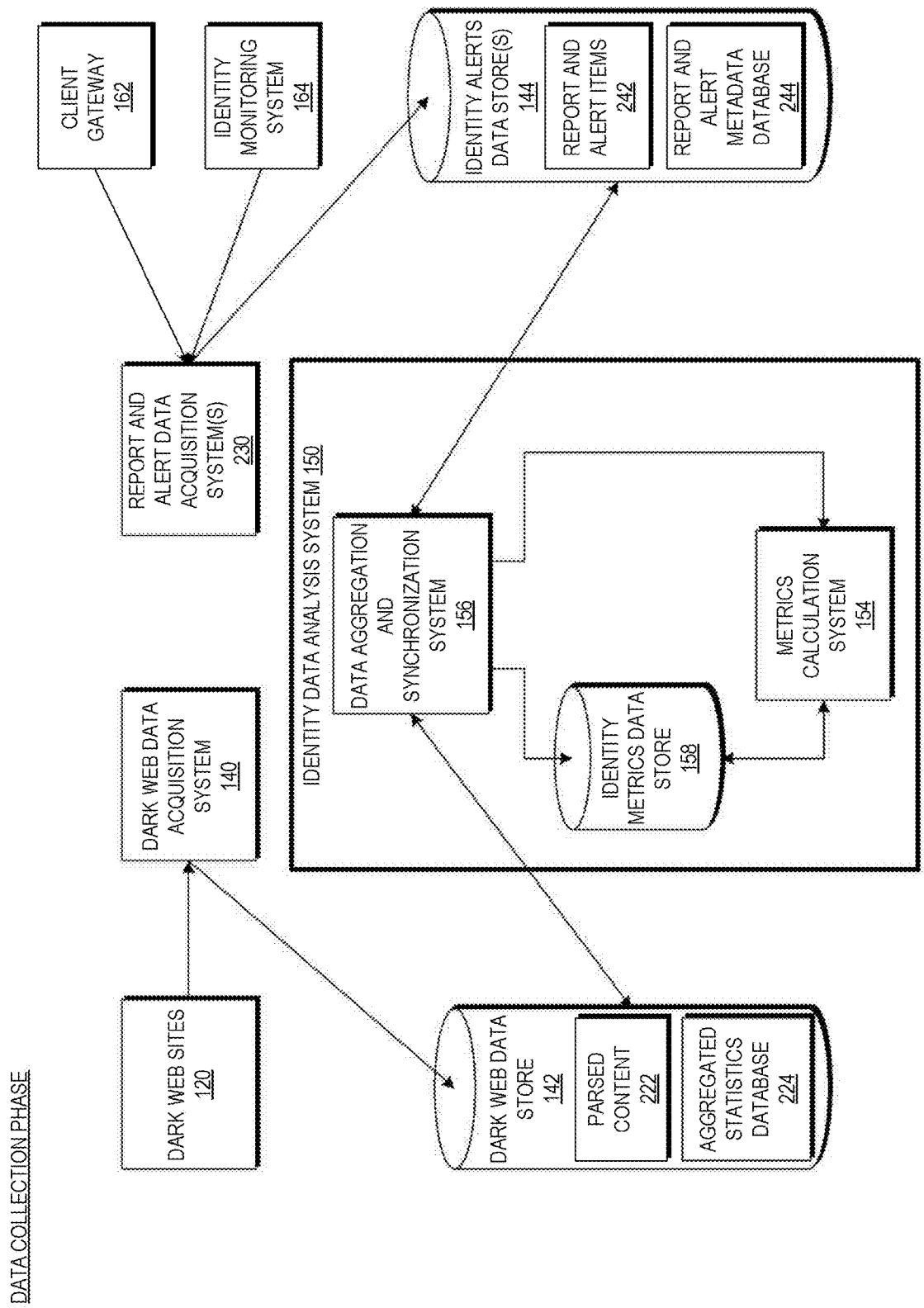
FIG. 2A illustrates an example embodiment of an identity management system for collecting data used to generate personalized metrics.
Figure 3A:
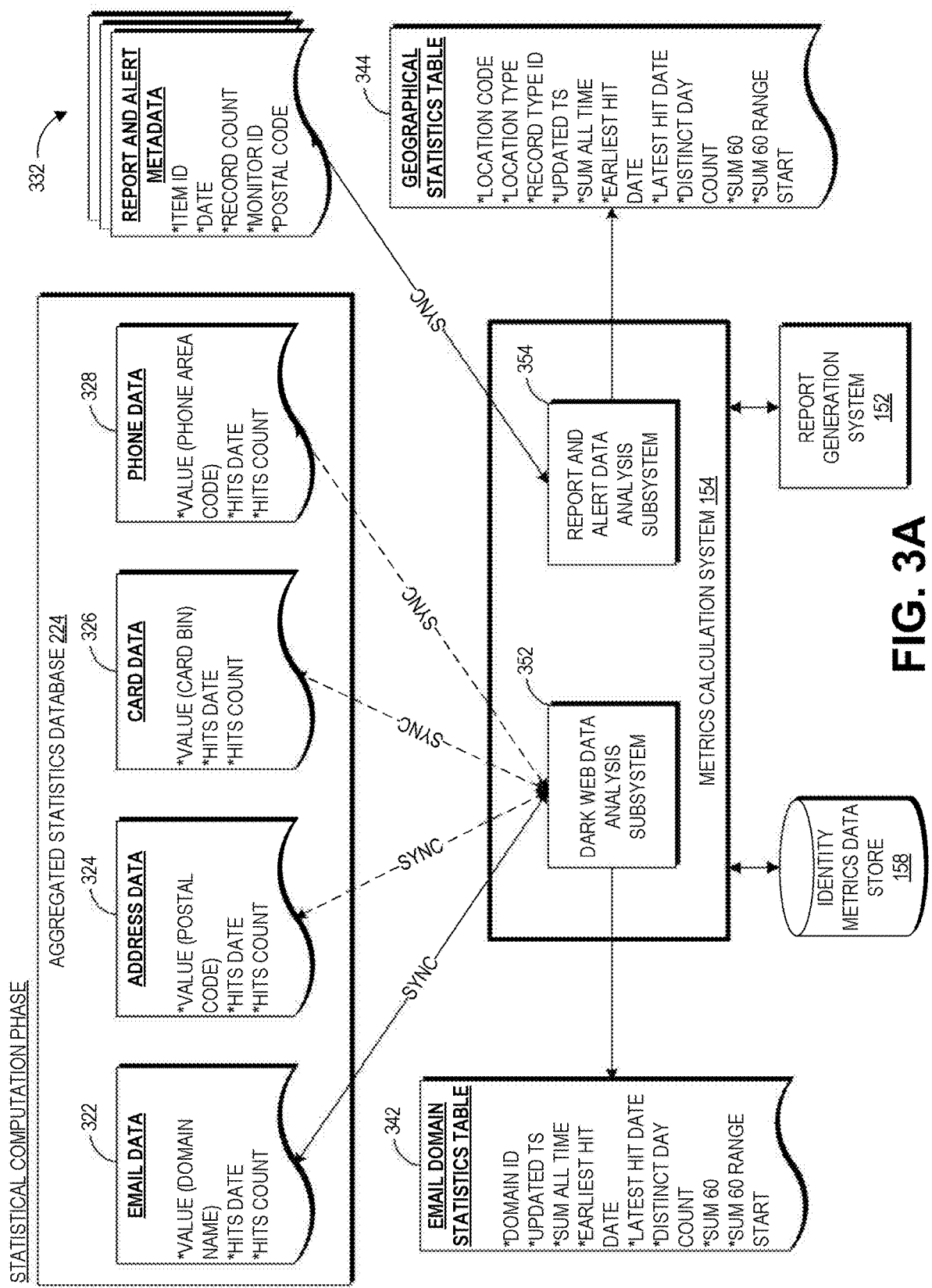
FIG. 3A illustrates an example embodiment of a metrics calculation system for generating personalized metrics of a user.

The dark web data store 142 can be configured to store data acquired from the dark web sites 120. The data from dark websites 120 may include information related to security breaches of one or more user's PII. For example, the dark web data store 142 can store chat logs from one or more chat rooms on the dark web. The dark web data store 142 can also be configured to store the results based on the analysis of data acquired from the dark websites 120. For example, with reference to FIG. 2A, the dark web data store 142 can store parsed content 222 (such as, for example, email address or breach site identified from the data acquired from dark web sites). As another example, the dark web data store 142 can include aggregated statistics database 224 configured to store various statistics calculated from dark web data, such as for example, the number of compromises associated with an email domain name, the number of compromises associated with a phone area code, the number of compromises associated with an issuer identification number (also referred to as BIN), or the number of hits associated with a postal code, so on, alone or in combination. Each type of the statistics may be stored in a dedicated look up table. For example, as shown in FIG. 3A, statistics related to emails are stored in the table 322, statistics related to address are stored in the table 324, statistics related to financial cards are stored in the table 326, and statistics related to phone numbers are stored in the table 328.

In addition to or in alternative to storing dark web data, the dark web data store 142 can also be configured to store data from other sources. For example, the dark web data store 142 can store the data relating incidents of security breaches of a user's PII acquired from an electronic commerce website.

The identity alerts data store(s) 144 can be configured to store users' information, such as for example, the user's PII, although in some embodiments, the user's PII may be stored in the dark web data store 142 in addition to or in alternative to the identity alerts data store(s) 144. The identity alerts data store(s) 144 can also be configured to store information associated with reports of the users, such as the content of the reports, the reports themselves, or the metadata of the reports. The metadata of the report can include report statistics. As shown in the report and alert metadata table 332 (in FIG. 3A), the report statistics can include a postal code, record counts for the postal code, the user identifier which the report was sent to, date, and so forth. As shown in FIG. 2A, the content of the reports and/or the reports themselves can be part of the report and alert items 242, while the metadata of the reports can be stored as part of the repot and alert metadata database 224.

Although the disclosures uses the words "data table" or "table", data stored in various data stores or databases are not limited to a tabular data structure and can include non-relational data stores as well. Other types of data structures, such as, for example, trees, hashes, graphs, blockchain structures, and so on, can also be used to store various data described herein.

Examples of Data Collection

FIG. 2A illustrates an example embodiment of an identity management system 130 for collecting data used to generate personalized metrics. FIG. 2A illustrates three main components: dark web data acquisition system 140, report and alert data acquisition system 230, and identity data analysis system 150 that are involved in the data collection process. These three components can be part of the identity management system 130, even though one or more of these components may be implemented by different computing devices. For example, the report and alert data acquisition system 230 may be implemented on a cloud platform while the dark web data acquisition system 140 and/or the identity data analysis system 150 may can be implemented on a separate platform with dedicated servers.

As described with reference to FIG. 1, the dark web data acquisition system 140 can be configured to scan and retrieve compromised data such as identity-theft information from dark web sites 120, parse the compromised data to generate the parsed content 222, compile aggregated statistics 222 based the compromised data, and insert the parsed content 222 and the aggregated statistics 224 into the dark web data store 142. The dark web data acquisition system 140 can implement the process 280 shown in FIG. 2B to obtain and analyze compromised data.

The report and alert data acquisition system 230 can be configured to access reports and store the reports into the identity alerts data store(s) 144. The reports can be received from client gateway 162 or the identity monitoring system 164. The reports can also be received from the report generation system 152. In some embodiments, the report generation system 152 may be part of the report and alert data acquisition system 230.

The report and alert data acquisitions system 230 can maintain the report and alert metadata database 244 which can be configured to store metadata 332 associated with reports (shown in FIG. 3A). The metadata can include report statistics such as the number of reports, the types of reports sent to the users in a geographic region. The report and alert data acquisition system 230 can implement the process 290 shown in FIG. 2B for gathering reports, storing the reports and metadata associated with the reports.

Although only one report and alert data acquisition system 230 is illustrated in FIG. 2A, the identity management system 130 may utilize multiple instances of the report and alert data acquisition system 230. Each report and alert data acquisition system 230 may be associated with a specific group of individuals who share certain demographic information or may be assigned to a certain geographic region. For example, each report and alert data acquisition system 230 may be associated with individuals having the same zip code. Each report and alert data acquisition system 230 can maintain its own a report and alert metadata database 244 specific to its group of individuals. For example, the report and alert metadata for a report and alert acquisition system 230 may include report statistics specific to the report and alert acquisition system 230. As an example, the report and alert metadata may include the number of reports delivered for a zip code assigned to a certain report and alert acquisition system 230.

In some situations, the report and alert metadata database 244 or the report and alert items 242 for respective report and alert data acquisition system 230 can be maintained without truncations, regardless of whether an individual is actively enrolled in monitoring its identity metrics. In some embodiments, each report and alert data acquisition system 230 can maintain its own identity alerts data store 144 which can include report and alert items 242 and report and alert metadata database 244 specific to the population group assigned to the report and alert data acquisition system 230. In other implementations, an identity alerts data store 144 can include a plurality of report and alert metadata databases 244 and/or report and alert items 242 (which are associated with their respective report and alert data acquisitions systems 230).

The identity data analysis system 150 can be configured to generate personalized metrics for a user based on data from the dark web data store 142 and the identity alerts data store(s) 144. As further described with reference to FIG. 3A, the data aggregation and synchronization system 156 can access data from the dark web data store 142, such as aggregated statistics database 224, and data from the identity alerts data store(s) 144, such as report and alert metadata 332. Such data access can occur on a periodic basis, such as for example, every day, every 12 hours, every week, every month, every two months, every year, and so on, and use either a push or pull technique. The data acquired by the data aggregation and synchronization system 156 can be stored in the identity metrics data store 158 and/or communicated to a metrics calculation system 154 which can statistics related to identity metrics. The statistics related to identity metrics can be calculated based on data in the identity metrics data store 158, the data recently acquired by the data aggregation and synchronization system 156, alone or in combination. The results from the calculation may be stored in the identity metrics data store 158 as part of one or more master statistics tables. The metrics calculation system 154 can retrieve the relevant statistics from the master statistics tables based on the PII of the user and communicate the relevant statistics to the report generation system 152 for inclusion in a report.

In addition to or in alternative to the dark web data store 142 and the identity alerts data store(s) 144, the identity data analysis system 150 can also generate reports based on data received from other sources. For example, the identity data analysis system 150 may receive credit reports from one or more credit bureaus' databases, calculate metrics based on the content of the credit reports, and include metrics calculated from such credit reports (or the content of the credit reports) to be part of the personalized metrics of a user.

Data Collection Processes

Figure 2B:
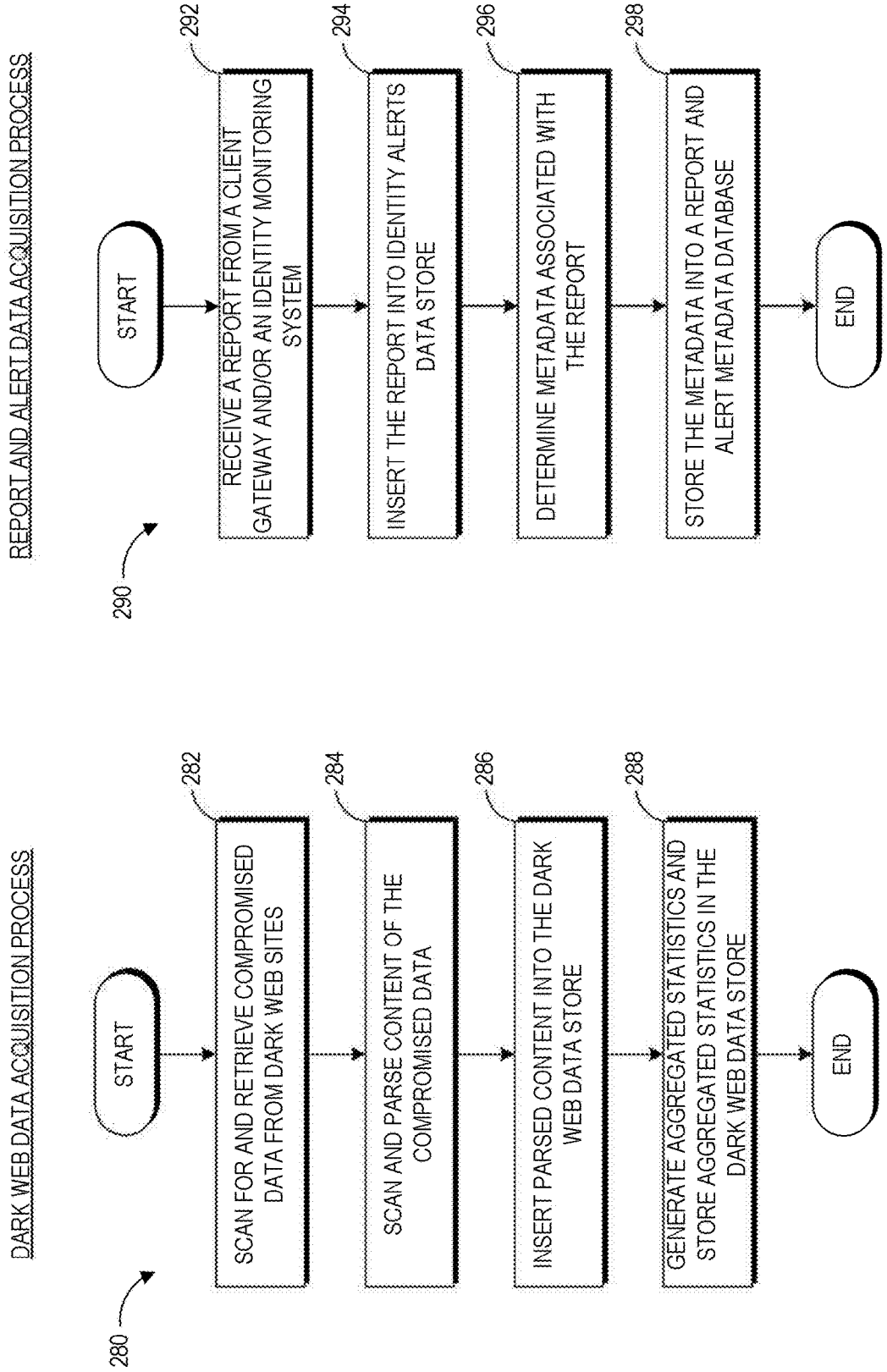
FIG. 2B illustrates example embodiments of data collection processes.

FIG. 2B illustrates example embodiments of data collection processes, which include a dark web data acquisition process 280 and a report and alert data acquisition process 290. The process 280 can be implemented by the dark web data acquisition system 140 and the process 290 can be implemented by the report and alert data acquisition system 230, but it is also recognized that the processes can be implemented by other systems.

Dark Web Data Acquisition Process

At block 282, the dark web data acquisition system can scan for and retrieve compromised data from dark webs sites. For example, the dark web data acquisition system can use search engines, web spiders, IRC bots, and key-word matching features to identify and collect identity-theft information, such as, for example, potential sources of compromised PII, the personal information in the compromised PII, etc.

At block 284, the dark web data acquisition system 140 can scan and parse content of the compromised data. For example, the collected identity-theft information may be processed for determining compromised PII by one or more parsers that recognize common formats for PII. A parser may identify token-separated data (for example, tab-delimited data). Similarly, a parser may determine a column type for columns lacking a column header, for example, by analyzing data that is present in particular columns (for example, recognizing a list of text strings as email addresses). Furthermore, a parser may identify multi-line labeled data such as, for example, "first name: John," and various other labels that may be associated with compromised PII (for example, recognizing "ccn," "cc" or "credit card" as possible labels for credit-card information). Additionally, by way of a further example, a parser may identify identity-theft information taken from encodings that may be present on cards such as, for example, credit cards, driver's licenses, and the like. The encodings may include, for example, track 1 and track 2 magnetic-stripe data.

Additionally, as part of the parsing process, rules may be enforced that require groups of fields to be present in particular compromised PII before allowing the particular compromised PII to be recorded in block 286. The requirement that groups of fields be present has the benefit of reducing "false positives" within compromised PII. False positives may be considered elements of compromised PII that are not deemed to be sufficiently private or sufficiently important to merit recordation. False positives may be removed from the collected identity-theft information. For example, an email address that is not accompanied by a password may be considered a false positive and not recorded. A rule may be established that requires, for example, a username or email address to be accompanied by a password in order to be recorded.

In some embodiments, a validation process may be implemented to analyze a source of the collected identity-theft information such as, for example, compromised PII, and to facilitate a determination on whether any elements of the compromised PII are false positives. For example, genealogy websites, phone/address lookup websites, and website log files are common sources of false positives. Compromised PII that is mined from such websites may be considered false positives and removed from the collected identity-theft information. Conversely, compromised PII mined, for example, from known hacker websites and websites replete with identity-theft nomenclature, in a typical embodiment, may be protected from identification as false positives.

The compromised data collected form the data websites can be normalized to ensures that the collected identity-theft information such as, for example, compromised PII, is stored (at block 286) according to a standardized format. For example, standardized data structures and attributes may be established for names, credit card numbers, and the like. The normalization process facilitates matching, for example, elements of compromised PII to particular individuals to whom the elements correspond. In that way, reports and alerts based on the compromised PII may be more efficiently and more accurately generated.

At block 286, the dark web data acquisition system 140 can insert parsed content into the dark web data store 142. In some embodiments, the parsed content can be added to the dark web data store after the validation process and the normalization process described above. As described with reference to FIG. 2A, the dark web data acquisition system 140 can also store the compromised data retrieved from the dark web site before the compromised data is parsed, validated, or normalized.

At block 288, the dark web data acquisition system 140 can generate aggregated statistics and store the aggregated statistics in the dark web data store 142. The aggregated statistics can include one or more statistics related to the identity metrics. The aggregated statistics may be specific to a user's PII, such as, for example, the number of hits found for a user's email address in a dark web search. The aggregated statistics may also be depersonalized, such as, for example, the number of hits found for a user's email domain name in a dark web search. The aggregated statistics may be stored in dedicated look up tables, such as, for example, tables storing email data 322, address data 324, card data 325, or phone data 328. In some embodiments, the aggregated statistics are stored in the identity metrics data store 158. Further, in various embodiments, the dark we data acquisition system or the metrics calculation system 154 may calculate the aggregated statics from the compromised data.

Report and Alert Data Acquisition Process

With reference to the process 290, report and alert data associated with a group of users can also be used to determine personalized statistics. The process 290 can be implemented by the report and alert data acquisition system 230 or another system to compile reports associated with a group of users (which may or may not including the user whose personalized metrics are requested).

At block 292, the report and alert data acquisition system 230 receives a report from a client gateway or an identity monitoring system. In some embodiments, the report can also be received from the report generation system 152. For example, the report generation system 152 can forward a copy of the report to the report and alert data acquisition system 230 before, during, or after sending the report to the computing device 110. The report may include personalized metrics generated for users who subscribed to the periodic monitoring service of their identity metrics. The report may also be created in response to a one time request for personalized metrics. In some embodiments, where multiple instances of report and alert data acquisition system 230 are initiated, the reports obtained by a report and alert data acquisition system may share similar characteristics. For example, the reports may be associated with users having the same geographic characteristics (for example, the same zip code, state, or city).

At block 294, the report and alert data acquisition system 230 can insert the report into an identity alerts data store(s) 144. For example, the report and alert data acquisition system 230 can store the reports sent to a group of individuals or at least a portion of the reports' content into the identity alerts data store(s) 144. As described with reference to FIG. 2A, identity alerts data store(s) 144 may retain its data for a long term (such as, for example, for permanent storage), even though some of the individuals in the group are no longer subscribed to the periodic monitoring of their identity metrics.

At block 296, the report and alert data acquisition system 230 can determine metadata associated with the report. The metadata can include report statistics based on the types of reports and the numbers of reports sent to the users of the identity management system 130. The report statistics may be depersonalized such that individual user's PII will not be revealed in the report sent to the user. Rather, the report statistics may include numbers pertaining to the group of individuals sharing similar characteristics as the user. For example the report statistics may include the number of notifications sent to the individuals in the same geographic area as the user. Some example fields of the metadata are also illustrated in FIG. 3A.

At block 298, the report and alert data acquisition system 230 can store the metadata into a report and alert metadata database. In some embodiments, the metadata may also be retained without truncation even though the individual (or the group of individuals) associated with the metadata is no longer actively subscribed to the identity management system 130.

The blocks in the processes 280 and 290 are for illustrative purposes. The processes 280 and 290 do not have to flow exactly in the order indicated by the arrows shown in FIG. 2B. For example, the process blocks 298 and 294 may be executed in parallel. As another example, the process block 288 may be executed before the process block 286. In various implementations, more or fewer blocks may also be implemented in the processes 280 and 290.

Examples of Statistical Computation for Personalized Metrics

As described herein, the identity data analysis system 150 can use data obtained from dark web data store 142, identity alerts data store(s) 144, and the identity metrics data store 158 to generate a report for personalized metrics of a user. FIG. 3A illustrates an example embodiment of a metrics calculation system for generating personalized metrics of a user. The metrics calculation system 154 shown in FIG. 3A can be part of the identity data analysis system 150.

Dark Web Data Analysis Subsystem

In FIG. 3A, the metrics calculation system 154 includes a dark web data analysis subsystem 352 and a report and alert data analysis subsystem 354. The dark web data analysis subsystem 352 can implement the dark web data analysis process 380 and the report and alert data analysis subsystem 354 can implement the report and alert data analysis process 390 shown in FIG. 3E. Although the dark web data analysis subsystem 352 and the report and alert data analysis subsystem 354 are illustrated as two separate blocks, in some embodiments, these two subsystems may be combined a same system within the metrics calculation system 154. Further, the metrics calculation system 154 may also include other systems (such as data aggregation or synchronization system 156), which are not illustrated in this figure.

The dark web data analysis subsystem 352 can be configured to receive synchronized data from the dark web data store 142. As an example of data synchronization, the identity metrics data store 158 can maintain one or more counterpart tables which correspond to the tables in the dark web data store 142. As shown in FIG. 3A, the dark web data store 142 can be configured to store four tables related to aggregated statistics 224: the email data table 322, the address data table 324, the card data table 326, and the phone data table 328. Each data table can include a respective value, such as email domain, postal code, card BIN, and phone area code. The data tables can further include hits information such as hits date and hits count based on searches and analysis of compromised data from the dark web sites. Although in this example, four data tables are illustrated, fewer or more tables may also exist based on the identity metrics that the metrics calculation system is configured to generate. For example, where the metrics calculation system 154 is configured to calculate metrics related to social security number, the aggregated statistics 224 can also include a data table related to social security number values and hits information. The identity metrics data store 158 can maintain one or more counterpart tables corresponding to the tables in the aggregated statistics database 224. The tables in the aggregated statistics database 224 and the tables in the identity metrics database do not always remain a one-to-one correspondence. For example, the email data table 322 can correspond to two counterpart tables in the identity metrics data store 158, such as, for example, an email domain value data table and an email domain hits table. For other tables, one data table in the aggregated statistics 224 table can correspond to one data table in the identity metrics data store 340, or multiple data tables in the aggregated statistics database 224 can correspond to one data table in the identity metrics data store 340. Further, not all data tables in the dark web data store 142 have a counterpart table in the identity metrics data store 158. For example, the address data table 324, the card data table 326, or the phone data table 328 may not have a counterpart table in the identity metrics data store 158. This may be because the metrics calculation system 154 may not generate personalized metrics using data one or more of these three tables.

The dark web data analysis system can synchronize updates to the aggregated statistics database 224 (as well as updates to individual data tables in the aggregated statistics database 224) periodically or in real-time as the updates occur. Although not shown in FIGS. 3A and 3C, in some embodiments, the data synchronization with the dark web data store 142 can be performed by the data aggregation and synchronization system 156.

The dark web data analysis subsystem 352 can be configured to analyze the synchronized data and compute one or more identity statistics based on the synchronized data. The identity statistics may be stored in corresponding summary identity statistics tables. For example, identity metrics data store 158 can maintain an email domain statistics table 342 which include summary statistics of the email domains. The dark web data analysis subsystem 352 can synchronize data in the email data table 322 (from the dark web data store 142) with the counterpart tables associated with email domains stored in the identity metrics data store 158. The dark web data analysis subsystem 352 can access data in the counterpart tables to calculate summary statistics associated with the email domains. The calculated statistics maybe used to update the email domain statistics table 342. As further described with reference to FIG. 4A, the email domain statistics table 342 may be accessed by the report generation system 152 to generate personalized metrics of a user.

Figure 3B:
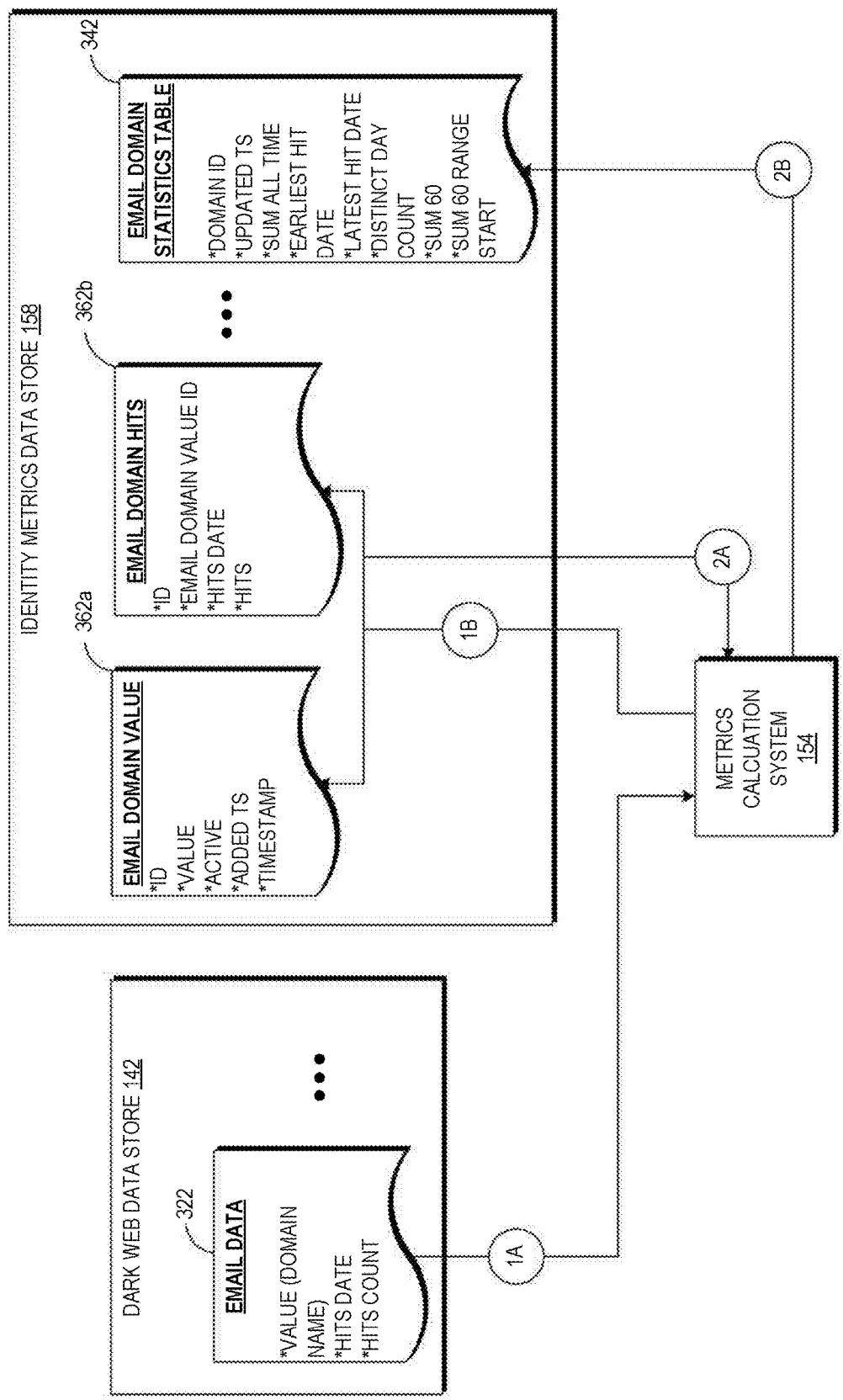
FIG. 3B illustrates an example embodiment of data synchronization between an identity metrics data store and a dark web data store.

FIG. 3B illustrates an example embodiment of data synchronization between an identity metrics data store and a dark web data store. In this example, the dark web data store 142 can include an email data table 322, among other data. The identity metrics data store 158 can include an email domain value table 362a and email domain hits table 362 which are counterpart tables of the email data table 322. The identity metrics data store can also include an email domain statistics table 342, among other data.

At (1), the metrics calculation system 154 (such as, for example the dark web data analysis subsystem 352) can synchronize data between email data table and its counterpart tables. For example, the metrics calculation system 154 can read data from the email data table 322 at (1A) and write data obtained from the email data table 322 into the email domain value table 362a and email domain hits table 362b at (1B). The metrics calculation system 154 can use a query in a Structured Query Language (SQL) and/or JOIN command to achieve the synchronization.

At (2), the metrics calculation system 154 can use data in the counterpart tables to update the email domain statistics table 342. For example, at (2A), the metrics calculation system 154 can read the data from the email domain value table 362a and the email domain hits table 362b. In some embodiments, (2A) may be performed using a GROUP BY and a SUM( ) function in SQL. At (2B), the metrics calculation system 154 can write the results obtained from (2A) into the email domain statistics table 342.

Figure 3C:
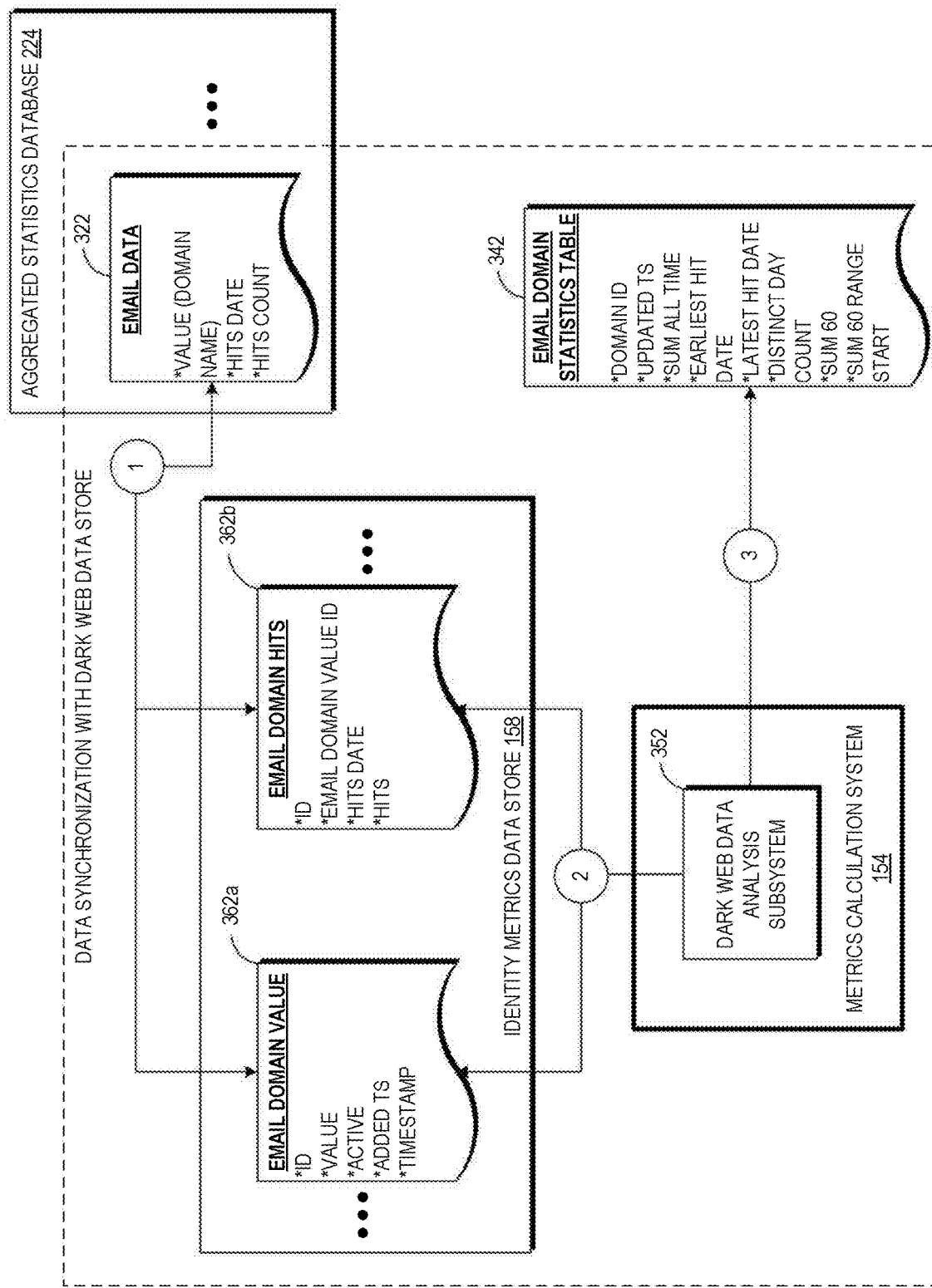
FIG. 3C illustrates an example embodiment of calculating identity statistics based on data from a dark web data store.

FIG. 3C illustrates an example embodiment of calculating identity statistics based on data from a dark web data store. As in FIG. 3B, the email data table 322 corresponds to two counterpart tables: email domain value table 362a and email domain hits table 362b in the identity metrics data store 158. In some embodiments, each top-level domain can be stored only once in the email domain value table 362 (such as, for example, "email.com" is stored only once under the "value" column of the email domain value table 362a).

At (1), the metrics calculation system 154 can synchronize email data table 322 with the email domain value table 362a and the email domain hits table 362b. For example, the domain name can be stored in the email domain value table 362a while the hits information (for example the hit date and hit counts) can be stored in the email domain hits table 362b. The email domain hits table 362 can link a hit with a domain name, such as, for example, by referring to the ID of the email domain value in the email domain value table 362a. In some embodiments, this synchronization process can be performed by the dark web data analysis subsystem 352 or by the data aggregation and synchronization system 156.

At (2), the metrics calculation system 154 can aggregate data stored in the identity metrics data store 158 and use the data in the identity metrics data store 158 to compute statistics related to an identity metric. For example, the dark web data analysis subsystem 352 can execute a process which uses a SQL JOIN command to combine the email domain value table 362a and the email domain hits table 362, as well as apply SUM( ) and GROUP BY functions to obtain the results.

At (3), the metrics calculation system 154 can insert or incorporate the computation from (2) into the email domain statistics table 342. The email domain statistics table 342 can be consulted by a report generation system 152 to generate a personalized metrics report for a user as described in FIG. 4A.

Report and Alert Data Analysis Subsystem

The metrics calculation system 154 can also include a report and alert data analysis subsystem 354. The report and alert data analysis subsystem 352 can be configured to synchronize data with identity alerts data store(s) 144, analyze report data, and compute identity statistics based on data acquired from the identity alerts data store(s).

The identity metrics data store 158 can include one or more counterpart table corresponding to data in the identity alerts data store(s). For example, the identity metrics data store 158 can include a geographic record which can be a counterpart table corresponding to the report and alert metadata in the identity alert data store 144. Where multiple instances of the report and alert data acquisitions system 230 are instantiated, there may be multiple identity alerts data store(s) 144 or multiple reports and alert metadata table 332, each corresponding to an instance of the report and alert data acquisition system 230. However, one geographic record table may be maintained in the identity metrics data store 158 which can be configured to synchronize data from different instances of the report and alert data acquisition system 230. The report and alert data analysis subsystem 354 can update the one or more counterpart table periodically or in real time as updates in the identity alerts data store(s) 144 occur, and can use similar techniques as the dark web data analysis subsystem 352 to perform the synchronization. Although not shown in FIG. 3A, in some embodiments, the data synchronization with the identity alerts data store(s) 144 can be performed by the data aggregation and synchronization system 156.

The report and alert data analysis subsystem 354 can be configured to analyze the synchronized data and compute one or more notification related statistics based on the synchronized data. The report statistics may be stored in a corresponding summary report statistics table. For example, identity metrics data store 158 can maintain a geographical statistics table 344 which can include summary statistics related to report statistics for various geographic locations. The report and alert data analysis subsystem 354 can synchronize data in report and alert metadata tables 332 (from various instances of the identity alerts data store(s) 144) with the counterpart table (for example, the geographic record table) stored in the identity metrics data store 158. The report and alert data analysis subsystem 354 can access the data in the counterpart table to calculate summary report statistics associated with geographic regions. The calculated statistics may be used to update the geographical statistics table 344. In some embodiments, the metrics calculation system 154 can use a portion of the information the counterpart table to calculate summary report statistics. For example, the identity metrics data store 158 can maintain a zip code records table which serves as a counterpart table to the report and alert metadata tables 332 associated with respective instances of the report and alert data acquisition systems 230. The zip code records table can include a column on instance identifier (ID). The instance ID can keep track the report and alert acquisition system 230 from which the metadata is acquired. However, when computing the summary report statistics associated with the geographic regions, the metrics calculations system 154 can ignore the data in instance id column so that the statistics across multiple regions can be summed together. As further described with reference to FIG. 4A, the geographical statistics table 344 may be accessed by the report generation system 152 to show identity theft related statistics in the user's geographical region.

Figure 3D:
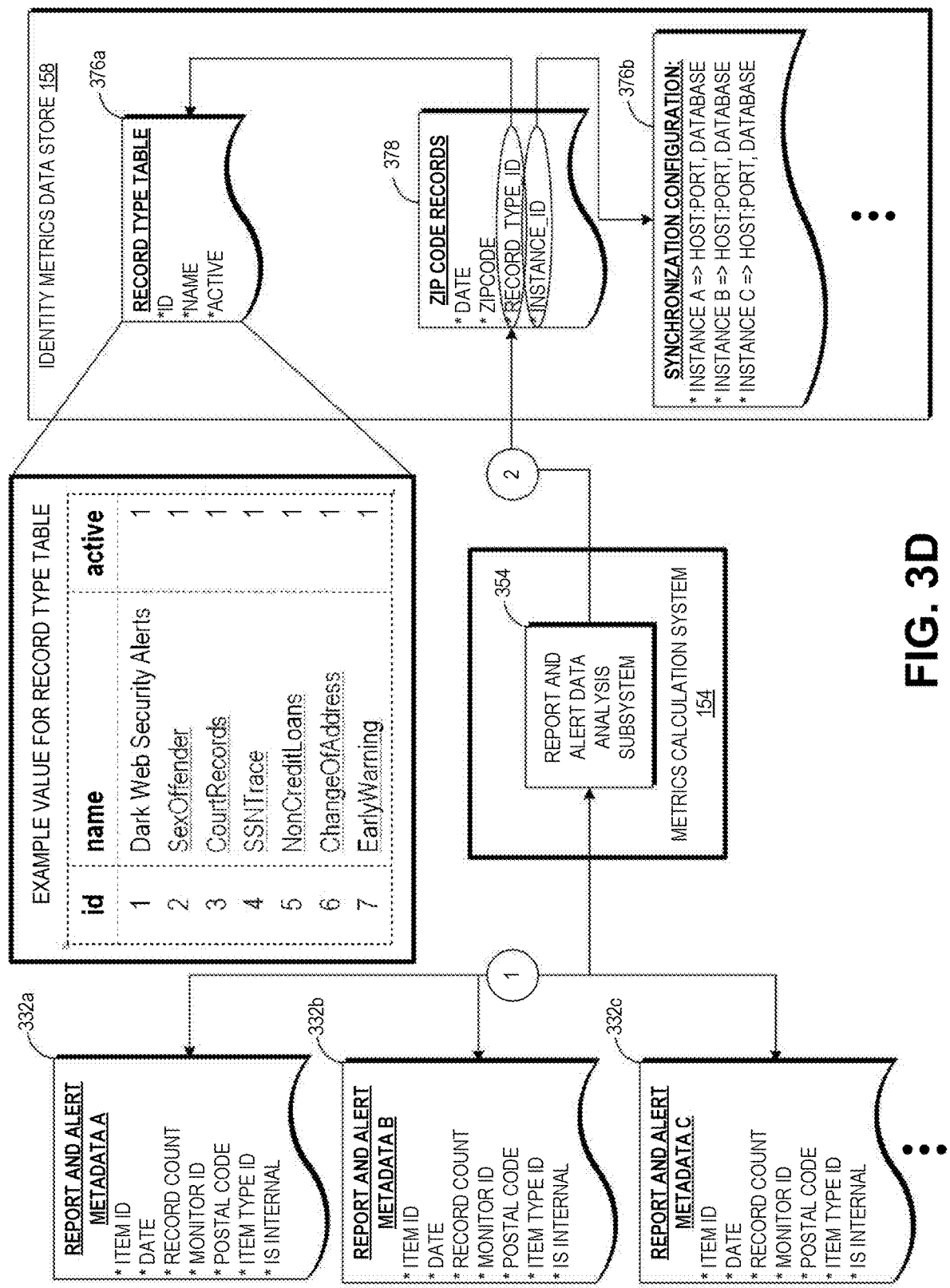
FIG. 3D illustrates an example embodiment of synchronizing the identity metrics database with a plurality of report and alert metadata databases.

FIG. 3D illustrates an example embodiment of synchronizing the identity metrics database with a plurality of report and alert metadata databases. In this example, the zip code records table 378 in the identity metrics data store 158 can be a counterpart table of a plurality of report and alert metadata tables 332 (for example, the report and alert metadata table A 332a, the report and alert metadata table B 332b, and the report and alert metadata table C 332c, and so on). The report and alert metadata tables 332a-332c can be stored in respective report and metadata database 224 where each report and metadata database 224 can correspond to a report and alert data acquisition system 230.

The zip code records table 372 can include fields such as, for example, date, zip code, record type ID, and instance ID. The record type ID can indicate the type of record. The record type ID can be linked to the ID in the record type table 376a. Some example types of records can include dark web security alerts, sex offender notifications, court records notifications, SSN trace notification, non-credit loan notification, change of address notification, and early warning alerts. These record types can be used to generate personalized metrics which include statistics in one or more types of the records (as shown in FIG. 4B). The instance ID field in the zip code records table 378 can be derived from a synchronization configuration file 376b. The synchronization configuration file can set forth the instance information for the identity alerts data store(s) 144 or the report and alert data acquisition system(s) 230. Some example configuration can include which host and port number an instance of the identity alerts data store(s) 144 or the report and alert data acquisition system(s) 230 is corresponding to.

In some embodiments, the record type ID values and the instance ID field in the zip code records table can be obtained at the initialization phase, such as, for example, during the initialization of the zip code records table 378, the identity metrics data store 158, the metrics calculation system 154, the identity data analysis system 150, the identity management system 130, the identity alerts data store(s) 144, or other components of the identity management system 130, alone or in combination.

At (1), the metrics calculation system 154 can synchronize with each instance of the report and alert metadata tables 332. The synchronization process can be performed, for example, using SQL (such as the SUMO and GROUP By function).

At (2), the result obtained from each instance can be written to the zip code records table 378 for storage. The zip code table 378 can be accessed by the metrics calculation system 154 for generating report statistics which can be stored into the geographical statistics table 344. The geographical statistics table 344 can be accessed by the report generation system 152 to generate a personalized metrics report including report statistics in a user's geographic region.

In some embodiments, the synchronization in (1) and (2) can be performed by the data aggregation and synchronization system 156. Although various examples in FIGS. 3B-3D refer to SQL commands or functions, the various methods and steps in these figures do not have to be performed by SQL. Other languages, such as Java, Ruby, Hypertext Pre-Processor (PHP), C++, or any language supported by the dark web data store 142, the identity alerts data store(s) 144, or the identity metrics data store 158, can also be used to implement the techniques described herein.

Statistical Computation Processes

Figure 3E:
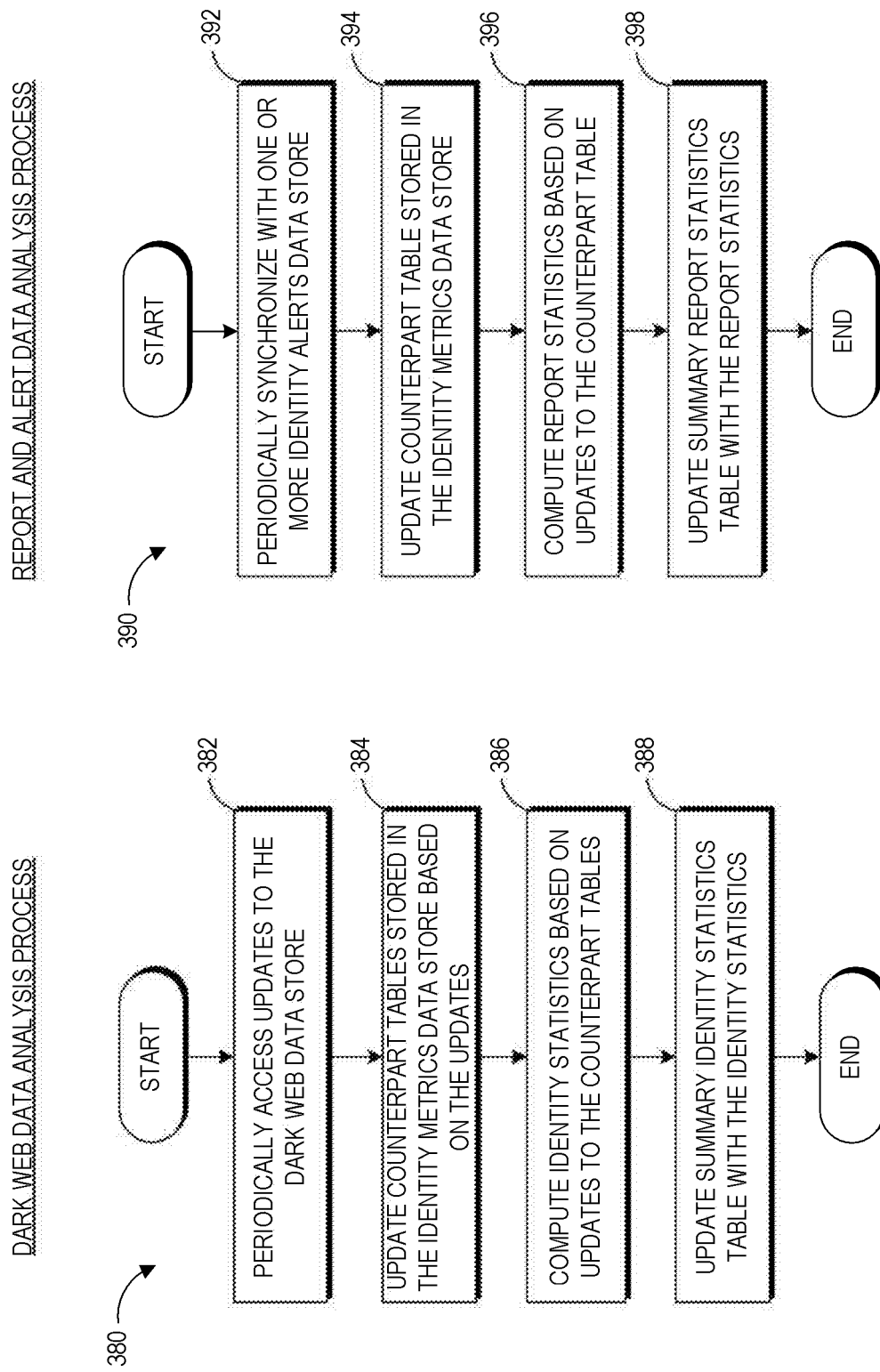
FIG. 3E illustrates example embodiments of statistical computation processes.

FIG. 3E illustrates example embodiments of statistical computation processes, which include a dark web data analysis process 380 and a report and alert data analysis process 390. The process 380 can be implemented by the dark web data analysis subsystem 352 and the process 290 can be implemented by the report and alert data analysis subsystem 354, but could also be implemented by other systems.

Dark Web Data Analysis Process

With reference to the dark web data analysis process 380, at block 382, the dark web data analysis subsystem 352 can periodically synchronize with the dark web data store 142. For example, the dark web analysis subsystem can synchronize various aggregated statistics tables (for example, tables 322, 324, 326, 328) with the counterpart tables in the identity metrics data store 158. For example, the dark web data analysis subsystem 352 can periodically synchronize the email data table 322 stored in the dark web data store 142 with its counterparts tables (for example, email domain value table and email domain hits table) stored in the identity metrics data store 158.

At block 384, the dark web data analysis subsystem 352 updates the counterpart tables stored in the identity metrics data store based on the updates. For example, the updates may include updates to aggregated statistics due to analysis (for example, by the dark web data acquisition system 140) of recently acquired compromised data. In some embodiments, the updates may be appended to one or more counterpart tables. With reference to the example in the preceding paragraph, the dark web data analysis subsystem 352 can append new email domain names (acquired from updates to the email data table 322) to the email domain value table.

At block 386, the dark web data analysis subsystem 352 can compute identity statistics. The identity statistics can be calculated based on data in the counterpart tables or updates received from the dark web data store 142. Continuing with the above-mentioned example, one of the identity statistics may be email domain statistics, which can include the hit date of a domain name (for example, found in compromised data), the total number of hits historically or within a certain time period (for example, within the past 60 days), the number of distinct days where hits are found, and so on.

At block 388, the dark web data analysis subsystem 352 can update a summary identity statistics table (such as the email domain statistics table 342) with the computed identity statistics. For example, the number of hits in the past 60 days of an email domain name in the email domain statistics table may be updated to reflect the most recent calculation occurred at the block 386.

Report and Alert Data Analysis Process

With reference to the report and alert data analysis process 390, at block 392, the report and alert data analysis subsystem 354 can periodically synchronize with one or more identity alerts data store(s). For example, there may be multiple instances of the report and alert data acquisition system 230 and thus there may be multiple identity alerts data stores 144 or report and alert metadata databases 244. For example, each report and alert metadata database 244 may maintain a report and alert metadata table 332 corresponding to statistics associated with a particular report and an alert data acquisition system 230.

The report and alert data analysis subsystem 354 can acquire updates to the one or more alerts data store and update counterpart table stored in the identity metrics data store at block 394. For example, even though there may be multiple identity alerts data stores or report and alert metadata tables, there may be one counterpart table corresponding to these identity alerts data stores or report and alert metadata tables. Thus, the report and alert data analysis subsystem 354 can combine data from the multiple identity alerts data stores or report and alert metadata tables and update the counterpart table accordingly. In some implementations, the report and alert data analysis system 354 can append updates to the counterpart table.

At block 396, the report and alert data analysis subsystem 354 can compute report statistics. The report statistics can be calculated based on the data in the counterpart table or updates received from the one or more identity alerts data store. As an example, the report statistics may be based on geographic regions, which can include the number of hits found for a geographic location, earliest hit date or latest hit date, the total number of hits historically or within a certain time period (for example, within the past 60 days), and so on.

At block 398, the report and alert data analysis subsystem 354 can update a summary report statistics table (such as the geographical statistics table 344) with the computed report statistics. For example, the number of hits or reports delivered historically for a zip code stored in the geographical statistics table 344 may be updated to reflect the most recent calculation occurred at the block 396.

Examples of Report Generation

As described with reference to FIG. 1, the identity management system 130 can receive a request from a client computing device 110 and return a report comprising personalized identity metrics to the client computing device 110. FIG. 4A illustrates an example embodiment of a data flow diagram for report generation. The example data flow diagram 400 can involve a client computing device 110, a client gateway 162, a report generation system 152, a dark web data store 142, an identity alerts data store 144, and an identity metrics data store 158.

At (1), the client computing device 110 can send a request to the client gateway 162 for a report of a user's personalized metrics. The request can include the user's PII such as, for example, one or more of the user's email addresses (for example, "username1@email.com" and "username2@anotheremail.com"), zip codes associated with the user's addresses (for example, the user's address in the past 2 years), the user's phone numbers (for example, the user's work phone and home phone numbers), and the financial card's BIN numbers (for example, the first five or six digits of a user's credit card numbers). The request may be in an XML format, although other formats such as, for example, txt or HTML are also possible. In some implementations, the request may also include authentication mechanisms such as password and username to increase the security of the user's personalized metrics.

The client gateway 162 can parse the request to extract the user's PII. At (2), the client gateway 162 can communicate the request to a report generation system 152 for generating a report based on the user's PII. Although in this example, the client gateway 162 communicates the request for report to the report generation system 152, in various implementations, the client gateway 162 can also communicate the request to other components of the identity data analysis system 150.

At (3), the report generation system 152 can communicate with the dark web data store 142 to obtain information specific to the user. For example, the report generation system 152 can use the received PII to obtain a report from the dark web data store 142. As the example shown in the code block 430, the report can include whether the user's email address was found on websites which had security breaches and the number of hits (for example, found in dark web sites 120) over a certain time period (for example, last 60 days or since when the user is subscribed to the identity management system 130).

At (4), the report generation system 152 can communicate with the identity metrics data store 158 to obtain summary statistics based on the user's PII. For example, as shown in the code block 440, the summary statistics can include total number of hits for all of the user's email addresses found in dark web data. Some of the summary statistics can be depersonalized, which can be calculated based on data for users having similar PIIs. For example, the report generation system 152 can include summary statistics related to the number of security breaches associated with an email domain over a time period. As shown in the example code block 440, the historical total number of hits for the email domain name "email.com" is around 500 million and the total number of hits in the past 60 days for "email.com" is about 15 million. These total numbers of hits can include hits associated with other user's email addresses having the same email domain name. The report generation system 152 can query the email domain statistics table 342 to obtain the summary statistics related to the email domain.

At (5), the report generation system 152 can communicate with the identity alerts data store(s) 144 to retrieve report statistics. As an example, the code block 450 shows that total number of reports sent to all users as well as the number of reports sent to users within a given zip code or a given state in the past 60 days and historically. As further described with reference to FIG. 4B, the report generation system 152 can also obtain statistics related to other types of notifications from the identity alerts data store(s) 144. Some example types of notifications include: criminal records, non-credit loans, change of address, financial account takeover, dark web related breaches, and so forth. These statistics can also be broken down by geographic regions. Although in this example, the report generation system 152 obtains report statistics from the identity alerts data store(s) 144, in some implementations, the report generation system 152 can also communicate with the identity metrics data store 158 to obtain at least a portion of the report statistics. For example, the report generation system 152 can obtain report statistics specific to user's geographic region by consulting the geographic statistics table 344 in the identity metrics data store 158 while obtain national report statistics from the identity alerts data store(s).

The report generation system 152 can generate the report compiling data obtained from (3) through (5). The report may be in an XML format (or any other suitable format). At (6), the report generation system 152 can provide the report to the client gateway 162 which, at (7), will pass the report to the client computing device 110 for display to a user. The report can be delivered in an email, a text message, or other types of messaging system. The report can also be rendered on a web portal.

Examples of Reports

FIG. 4B illustrates example embodiments of reports delivered to a client computing device. FIG. 4B illustrates two user interface screens 460 and 480. The user interface screen 460 may be part of an email message while the user interface screen 480 may be a user interface element (for example, a widget or a banner) displayed on a web portal.

The user interface screen 460 shows a monthly report. This monthly report may be generated as a result of a user's subscription to an identity monitoring service offered by the identity management system 130. For example, the report generation system 152 can automatically gather user specific data, summary identity statistics, and summary report statistics every month and deliver a monthly report to the user.

The monthly report in the user interface screen 460 shows a monthly summary of notifications (shown by the user interface element 462) which may include the number of notifications delivered by the identity management system 130 to the user. The monthly report can also include report statistics associated with the user's geographic region. As shown by the user interface element 464, report statistics can include the number of notifications related to the change of addresses, court records (for example, filings of court cases), dark web security alerts (for example, alerts regarding unauthorized use of the user's PII or potential breach of the user's PII), financial account takeovers, non-credit loans, sex offenders (for example, sex offenders identified as associated with the user's geographic region), and/or social security number traces.

Once receiving the report, the user can actuate the user interface element 466 to review further information of the report on a web portal. The user interface element 480 shows a user interface element on a web portal. This user interface element 480 shows summary statistics (as indicated by the arrow 482) related to the total number of notifications sent to all U.S. subscribers of the identity management system 130 in the past 60 days. The user interface element 480 also shows the summary report statistics (as shown by the arrow 484) in the user's city.

Example Processes for Generating and Monitoring Identity Metrics

The identity data management system 130 may implement processes for identity metrics analysis as well as an identity monitoring process.

Identity Metrics Analysis Process

Figure 5A:
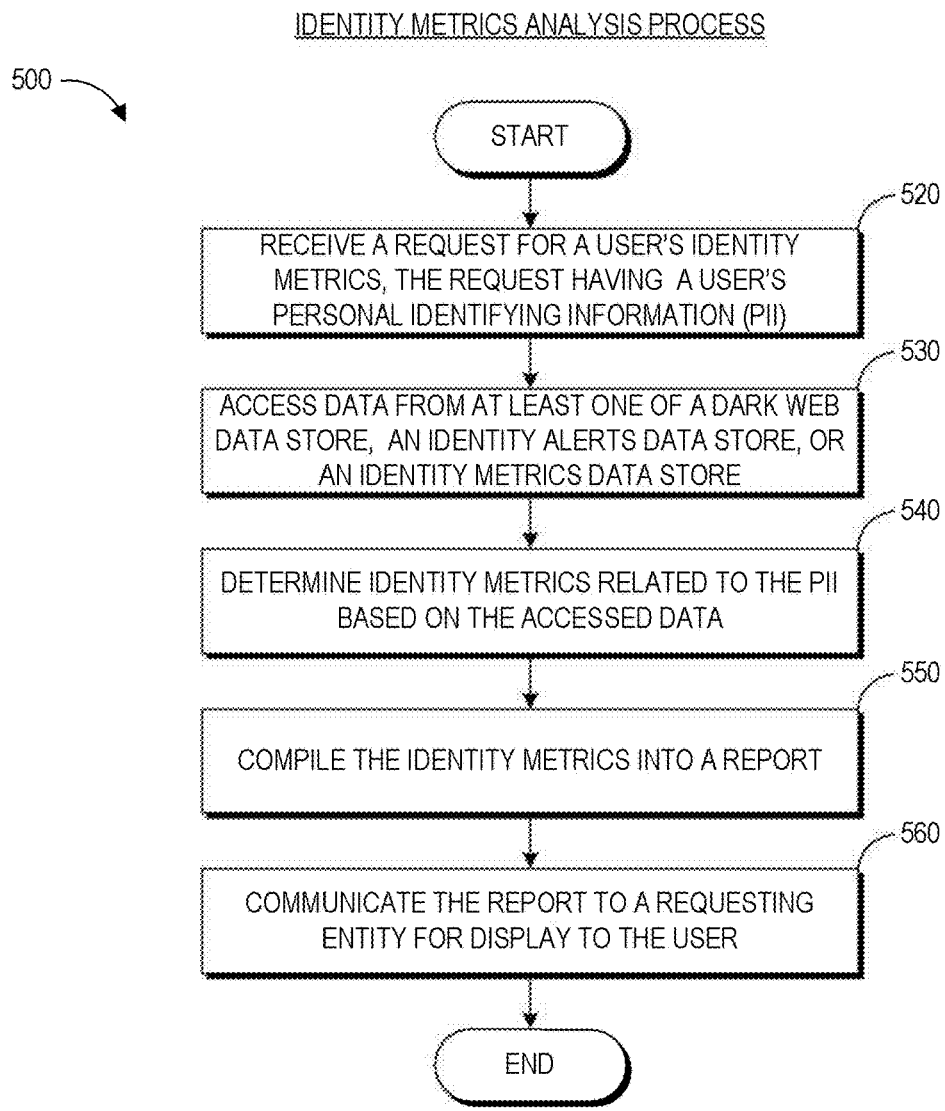
FIG. 5A illustrates an example embodiment of an identity metrics analysis process.

FIG. 5A illustrates an example embodiment of an identity metrics analysis process. The process 500 can be performed by the identity data analysis system 150 described herein.

At block 520, the identity data analysis system 150 can receive a request for a user's identity metrics. The identity metrics may include personalized metrics associated with a user's PII. The personalized metrics information specific to user's PII or depersonalized statistics based on information from a group of users. The request may be received from a client gateway 162, an identity monitoring system 164, or directly from a client computing device 110. The request may include a user's PII which the identity data analysis system can use to generate personalized metrics.

At block 530, the identity data analysis system 150 can access data from at least one of a dark web data store, an identity alerts data store 144, or an identity metrics data store 158. In some implementations, the identity metrics data store 158 can periodically synchronize with the dark web data store 142 and the identity alerts data store(s) 144 to include data in the dark web data store 142 and the identity alerts data store 144. Thus, the identity data analysis system 150 can communicate with the identity metrics data store 158 to acquire compromised PII, reports information, as well as aggregated statistics. In other implementations, the identity data analysis system 150 can communicate with the dark web data store 142 to acquire compromised PII, communicate with one or more identity alerts data store 144 to acquire information of various reports, and communicate with the identity metrics data store to retrieve aggregated statistics. In some situations, a request for user's identity metrics can cause the identity data analysis system 150 to synchronize the data in the identity metrics data store 158 with the dark web data store 142 and one or more identity alerts data store 144. For example, the request may trigger the data aggregation and synchronization system 156 to access an identity alerts data store report information of those individuals having similar demographic characteristics as the user.

At block 540, the identity data analysis system 150 can determine identity metrics related to the PII based on the accessed data. For example, the identity data analysis system 150 can determine the email domain associated with the user's email address. The identity data analysis system can find the number of compromises associated with the same email domain. As another example, the identity data analysis system can find the number of reports sent to users in the same geographical area. In some embodiments, the operations in the blocks 530 and 540 may be combined. For example, the identity data analysis system (or the metric calculation system 154 of the identity data analysis system 150) can execute a query including a portion of the PII and to retrieve the identity metrics associated with the user. For example, the identity data analysis system can query the identity metrics data store 340 for the statistics associated with the user's geographical region.

At block 550, the identity data analysis system 150 can compile the identity metrics into a report. The report may include various sections, such as a user specific section, a statistics section, a geographically related alerts section, and so on. Compromised data from the dark web may be used to populate the user specific section. For example, if the user's email address is flagged as compromised based on the analysis of the dark web data, the identity data analysis system can input the user's email address as well as the site where the compromise was discovered into the user specific portion of the report. As another example, the aggregated statistics may be accessed form the identity metrics data store 158 and populate the statistics section of the report. For example, statistics regarding the number of compromised email address having the same domain name as the user's email address may be added to the statistics portion of the report. The geographically related alerts section may be populated based on data from the identity alerts data store. Some example, data may include the number of notifications provided by the identity management system 130 to people in the same city as the user. As described with reference to FIG. 4A, the report generation system 152 of the identity data analysis system 150 may be configured to perform the process at block 550.

At block 560, the report can be communicated to a requesting entity for display to the user. As described with reference to FIG. 1, the requesting entity may be an identity monitoring service, a company or a person interested in learning a user's identity metrics (for example, an employer), or the user himself. The report may be in an XML format and may be communicated via an API. The identity data analysis stem 150 can communicate the report to the requesting entity via a client gateway 162, an identity monitoring system 164 or directly to the client computing device 110.

Identity Monitoring Process

Figure 5B:
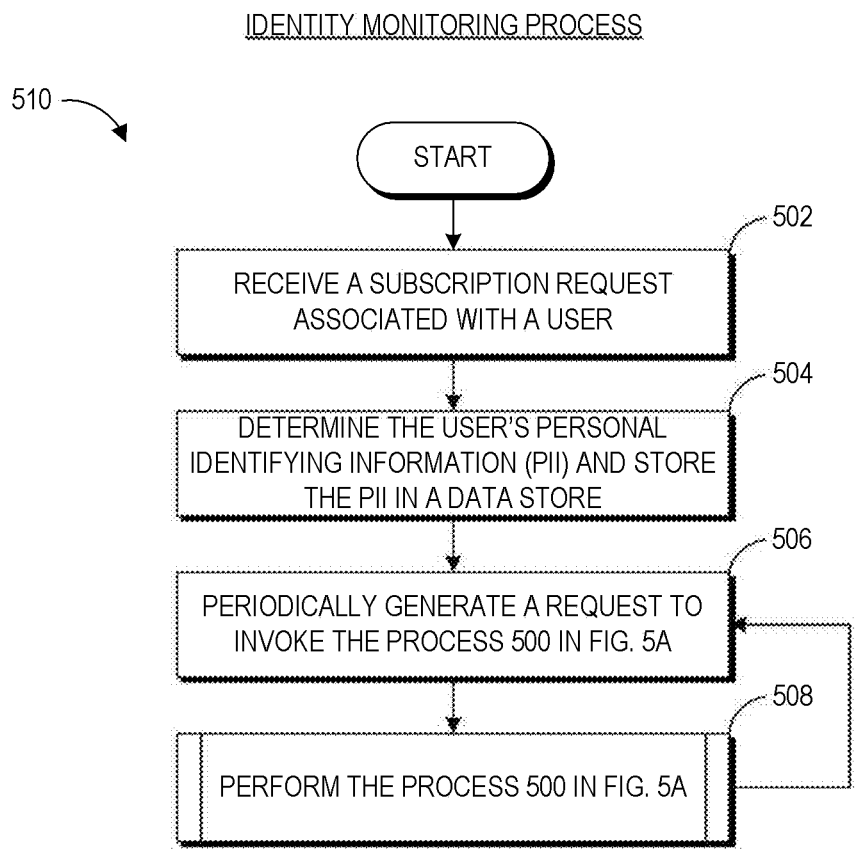
FIG. 5B illustrates an example embodiment of an identity monitoring process.

FIG. 5B illustrates an example embodiment of an identity monitoring process. The process 510 may be performed by the identity monitoring system 164 alone or in combination with user identity registration system 166 or the identity data analysis system 150, as well as another system.

At block 502, the identity monitoring system 164 can receive a subscription request associated with a user. The subscription request may include a request to enroll a user into a periodic monitoring service of the user's identity metrics.

At block 504, the identity monitoring system 164 can determine the user's PII and store the PII in a data store. For example, the subscription request may include a user's PII and the identity monitoring system can parse the request to identify the user's PII and store the identified PII into a data store (such as, for example, the identity alerts data store 144). In some embodiments, the identity monitoring system can acquire additional PII based on the PII in the user's request. For example, the PII in the user's request may include the user's name and the social security number, the identity monitoring system can use this PII in the user's request to obtain the user's financial account information, the user's phone number, or the address information by communicating with another database (such as, for example, a database associated with a credit bureau). The additional PII can also be stored in the data store together with the PII received in the subscription request.

At block 506, the identity monitoring system 164 can periodically generate a request to invoke the process 500 in FIG. 5A. For example, the identity monitoring system can periodically request identity metrics using the user's PII (which can include the PII received form the subscription request alone or in combination with the additional PII acquired). In some embodiments, once the user is subscribed to the periodic monitoring service, identity data analysis system can periodically generate a report in the form of an alert for the user. For example, for every two months, the identity data analysis system can send a report including personalized metrics in the past 60 days. This alert may be automatically generated without the performing the process block 506.

Example Computing System Implementation and Architecture

Figure 6:
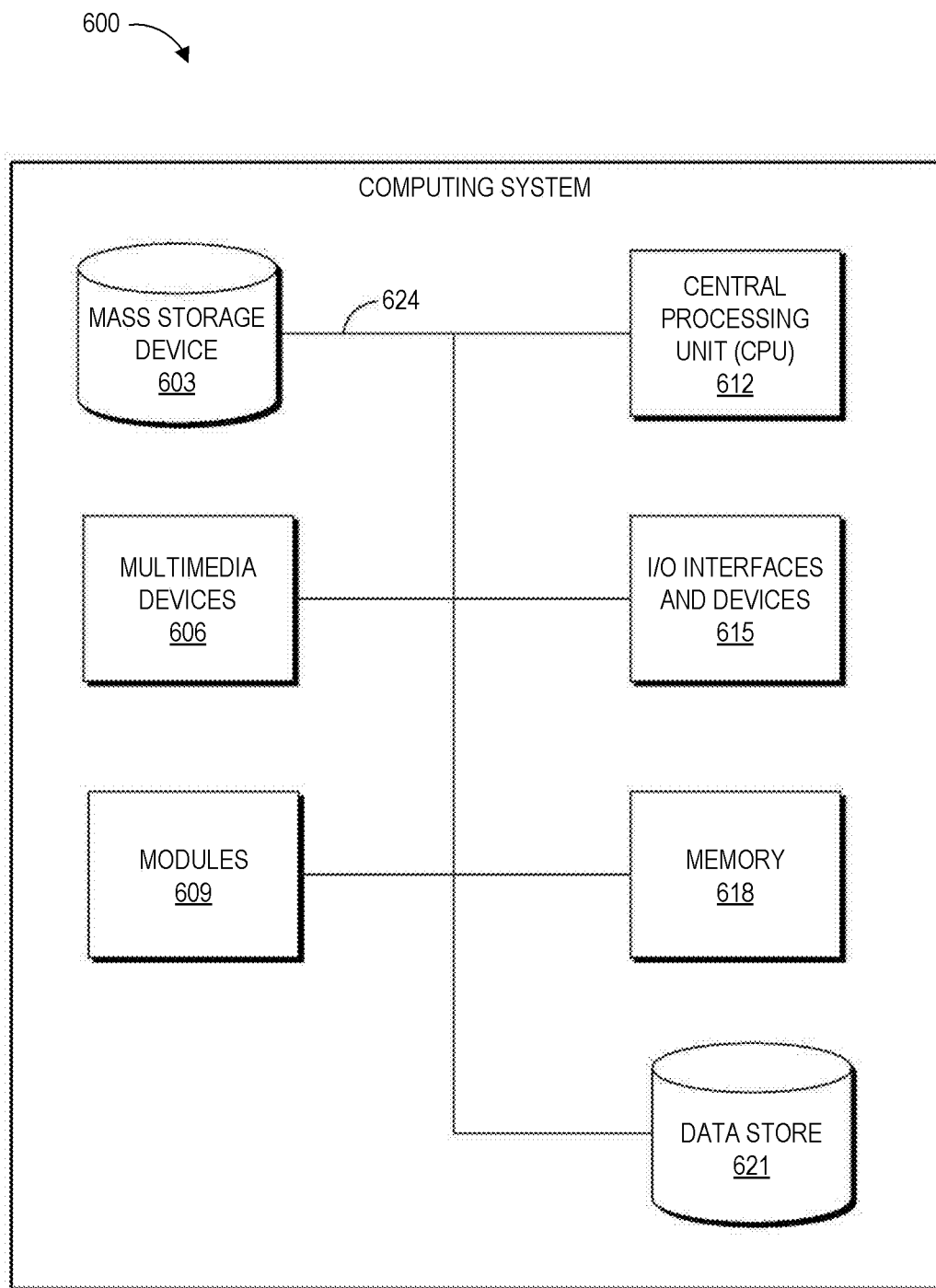
FIG. 6 illustrates an embodiment of a computing system which may implement example embodiments of an identity management system.

FIG. 6 illustrates a general architecture of a computing system for processing attributes and implementing various other aspects of the present disclosure. Many or all of the components of the computing system shown in FIG. 6 may be included in the various computing devices and systems discussed herein. The computing system may include, for example, a personal computer (such as, for example, IBM, Macintosh, Microsoft Windows compatible, OS X compatible, Linux/Unix compatible, or other types of computing systems, alone or in combination), a server, a workstation, a laptop computer, a smart phone, a smart watch, a personal digital assistant, a kiosk, a car console, a tablet, or a media player. In one embodiment, the computing system's processing system 600 includes one or more central processing units (CPU) 612, which may each include a conventional or proprietary microprocessor specially configured to perform, in whole or in part, one or more of the features described above. The processing system 600 further includes one or more memory 618, such as random access memory (RAM) for temporary storage of information, one or more read only memory (ROM) for permanent storage of information, and one or more mass storage device 603, such as a hard drive, diskette, solid state drive, or optical media storage device. A data store 621 may also be included. In some implementations, the data store 621 may be designed to handle large quantities of data and provide fast retrieval of the records. To facilitate efficient storage and retrieval, the data store 621 may be indexed using one or more of compressed data, identifiers, or other data, such as that described above.

Typically, the components of the processing system 600 are connected using a standards-based bus system 624. In different embodiments, the standards-based bus system 624 could be implemented in Peripheral Component Interconnect (PCI), Microchannel, Small Computer System Interface (SCSI), Industrial Standard Architecture (ISA) and Extended ISA (EISA) architectures, for example. In addition, the functionality provided for in the components and modules of processing system 600 may be combined into fewer components and modules or further separated into additional components and modules.

The processing system 600 is generally controlled and coordinated by operating system software, such as Windows XP, Windows Vista, Windows 7, Windows 8, Windows 10, Windows Server, Unix, Linux, SunOS, Solaris, iOS, MAC OS X, Blackberry OS, Android, or other operating systems. In other embodiments, the processing system 600 may be controlled by a proprietary operating system. The operating system is configured to control and schedule computer processes for execution, perform memory management, provide file system, networking, I/O services, and provide a user interface, such as a graphical user interface (GUI), among other things. The GUI may include an application interface and/or a web-based interface including data fields for receiving input signals or providing electronic information to the user in response to any received input signals. A GUI may be implemented in whole or in part using technologies such as HTML, Flash, Java, .net, web services, and RSS. In some implementations, a GUI may be included in a stand-alone client (for example, thick client, fat client) configured to communicate (for example, send or receive data) in accordance with one or more of the aspects described.

The processing system 600 may include one or more commonly available input/output (I/O) devices and interfaces 615, such as a keyboard, stylus, touch screen, mouse, touchpad, and printer. In one embodiment, the I/O devices and interfaces 615 include one or more display devices, such as a monitor, that allows the visual presentation of data to a user. More particularly, a display device provides for the presentation of GUIs, application software data, and multimedia presentations, for example. The processing system 600 may also include one or more multimedia devices 606, such as speakers, video cards, graphics accelerators, and microphones, for example.

In the embodiment of FIG. 6, the I/O devices and interfaces 615 provide a communication interface to various external devices. The processing system 600 may be electronically coupled to one or more networks, which comprise one or more of a LAN, WAN, cellular network, satellite network, and/or the Internet, for example, via a wired, wireless, or combination of wired and wireless communication link. The networks communicate with various computing devices and/or other electronic devices via wired or wireless communication links.

In some embodiments, information may be provided to the processing system 600 over a network from one or more data sources. The data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, a non-relational database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the processing system 600, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules. They may be represented in hardware or firmware. Generally, the modules described herein refer to logical modules that may be combined with other modules or divided into sub-modules despite their physical organization or storage.

In the example of FIG. 6, the modules 609 may be configured for execution by the CPU 612 to perform, in whole or in part, any or all of the process discussed above, such as those shown in FIGS. 2B, 3E, 5A, and 5B. The processes may also be performed by one or more virtual machines. For example, the processes may be hosted by a cloud computing system. In some embodiments, one or more components of the processing system 600 may be part of the cloud computing system. Additionally or alternatively, the virtualization may be achieved at the operating system level. For example, the one or more processes described herein may be executed using application containerization. The one or more processes may also be implemented on a Lambda architecture designed to handle mass quantities of data by taking advantage of the batch processing and the stream processing.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. In some embodiments, at least some of the processes may be implemented using virtualization techniques such as, for example, cloud computing, application containerization, or Lambda architecture, etc., alone or in combination. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a virtual machine, a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
one or more hardware processors programmed to execute computer executable instructions to cause the identity security system to:
receive or access a request to generate a personalized electronic report package comprising personalized metrics for a first user, wherein the personalized metrics are based at least in part on personalized identity metrics and depersonalized identity metrics;
determine personalized identity metrics specific to personalized identity information (PII) of the first user and based at least in part on dark web data including compromised PII of the first user;
determine depersonalized identity metrics that are based at least in part on a group of users with unrevealed identities;
generate the personalized electronic report package based at least in part on the personalized identity metrics and the depersonalized identity metrics; and
provide access to the personalized electronic report package comprising the personalized metrics for the first user based at least in part on the request,
wherein the personalized identity metrics includes a number of hits found for the PII of the first user in one or more security breaches.

2. The system of claim 1, wherein the one or more hardware processors are programmed to:
generate and store master statistics tables which include statistics that are associated with various identity metrics, wherein the master statistics tables are based at least in part on aggregated data dark web data and historical data associated with identity alerts that were sent to the first user or other users.

3. The system of claim 2, wherein the aggregated data dark web data and historical data associated with identity alerts that were sent to the first user or other users are periodically synchronized with data in one or more data stores.

4. The system of claim 1, wherein the personalized electronic report package comprising personalized metrics for a first user pertains to data or events occurring over a specified time period.

5. The system of claim 1, wherein the at least a portion of the PII of the first user includes an email address associated with the first user, and wherein the email address is found on dark web sites using one or more automated data collection processes.

6. The system of claim 1, wherein the depersonalized identity metrics includes one or more of: a number of alerts that have been generated for other monitored users different than the first user within the same geographical region of the first user; a total number of compromised email addresses that include an email address domain that is the same as an email address domain associated with an email address for the first user; a total number of compromised credit cards that are from the same issuer as a credit card associated with the first user; and a total number of compromised phone numbers having the same area code as a phone number associated with the first user.

7. A method comprising:
receiving or accessing a request to generate a personalized electronic report package comprising personalized metrics for a first user, wherein the personalized metrics are based at least in part on personalized identity metrics and depersonalized identity metrics;
determining personalized identity metrics specific to personalized identity information (PII) of the first user and based at least in part on dark web data including compromised PH of the first user;

determining depersonalized identity metrics that are based at least in part on a group of users with unrevealed identities;

generating the personalized electronic report package based at least in part on the personalized identity metrics and the depersonalized identity metrics; and providing access to the personalized electronic report package comprising the personalized metrics for the first user based at least in part on the request, wherein the personalized identity metrics includes a number of hits found for the PII of the first user in one or more security breaches.

8. The method of claim 7, further comprising:

generating and storing master statistics tables which include statistics that are associated with various identity metrics, wherein the master statistics tables are based at least in part on aggregated data dark web data and historical data associated with identity alerts that were sent to the first user or other users.

9. The method of claim 8, wherein the aggregated data dark web data and historical data associated with identity alerts that were sent to the first user or other users are periodically synchronized with data in one or more data stores.

10. The method of claim 7, wherein the personalized electronic report package comprising personalized metrics for a first user pertains to data or events occurring over a specified time period.

11. The method of claim 7, wherein the at least a portion of the PII of the first user includes an email address associated with the first user, and wherein the email address is found on dark web sites using one or more automated data collection processes.

12. The method of claim 7, wherein the depersonalized identity metrics includes one or more of: a number of alerts that have been generated for other monitored users different than the first user within the same geographical region of the first user; a total number of compromised email addresses that include an email address domain that is the same as an email address domain associated with an email address for the first user; a total number of compromised credit cards that are from the same issuer as a credit card associated with the first user; and a total number of compromised phone numbers having the same area code as a phone number associated with the first user.

13. Non-transitory computer readable medium storing computer executable instructions thereon, the computer executable instructions when executed cause an identity security system to:

receive or access a request to generate a personalized electronic report package comprising personalized metrics for a first user, wherein the personalized metrics are based at least in part on personalized identity metrics and depersonalized identity metrics;

determine personalized identity metrics specific to personalized identity information (PII) of the first user and based at least in part on dark web data including compromised PIT of the first user;

determine depersonalized identity metrics that are based at least in part on a group of users with unrevealed identities;

generate the personalized electronic report package based at least in part on the personalized identity metrics and the depersonalized identity metrics; and provide access to the personalized electronic report package comprising the personalized metrics for the first user based at least in part on the request, wherein the personalized identity metrics includes a number of hits found for the PII of the first user in one or more security breaches.

14. The non-transitory computer readable medium of claim 13, further comprising:

generate and store master statistics tables which include statistics that are associated with various identity metrics, wherein the master statistics tables are based at least in part on aggregated data dark web data and historical data associated with identity alerts that were sent to the first user or other users.

15. The non-transitory computer readable medium of claim 14, wherein the aggregated data dark web data and historical data associated with identity alerts that were sent to the first user or other users are periodically synchronized with data in one or more data stores.

16. The non-transitory computer readable medium of claim 13, wherein the personalized electronic report package comprising personalized metrics for a first user pertains to data or events occurring over a specified time period.

17. The non-transitory computer readable medium of claim 13, wherein the depersonalized identity metrics includes one or more of: a number of alerts that have been generated for other monitored users different than the first user within the same geographical region of the first user; a total number of compromised email addresses that include an email address domain that is the same as an email address domain associated with an email address for the first user; a total number of compromised credit cards that are from the same issuer as a credit card associated with the first user; and a total number of compromised phone numbers having the same area code as a phone number associated with the first user.

* * * * *

UNITED STATES PATENT AND TRADEMARK OFFICE
CERTIFICATE OF CORRECTION

PATENT NO. : 11,580,259 B1  
APPLICATION NO. : 17/447909  
DATED : February 14, 2023  
INVENTOR(S) : Adam Kennedy Page 1 of 1

It is certified that error appears in the above-identified patent and that said Letters Patent is hereby corrected as shown below:

On the Title Page

At Page 11, Column 2 (Other Publications), Line 11, delete "Pseudonumization" and insert --Pseudonymization--.

At Page 11, Column 2 (Other Publications), Line 12, delete "Anonumization" and insert --Anonymization--.

At Page 11, Column 2 (Other Publications), Line 49, delete "Howto" and insert --How to--.

In the Specification

At Column 11, Line 3, delete "deice" and insert --device--.

At Column 15, Line 19, delete "we data" and insert --web data--.

At Column 15, Line 21, delete "statics" and insert --statistics--.

At Column 20, Line 21, delete "SUMO" and insert --SUM( )--.

In the Claims

At Column 30, Line 67, In Claim 7, delete "PH" and insert --PII--.

At Column 32, Line 6, In Claim 13, delete "PIT" and insert --PII--.

Signed and Sealed this  
Eighteenth Day of July, 2023

Katherine Kelly Vidal  
*Director of the United States Patent and Trademark Office*